US007209296B2

(12) United States Patent
Mihara et al.

(10) Patent No.: US 7,209,296 B2
(45) Date of Patent: Apr. 24, 2007

(54) ZOOM LENS, AND ELECTRONIC IMAGING SYSTEM INCORPORATING THE SAME

(75) Inventors: Shinichi Mihara, Tama (JP); Shinya Takahashi, Hino (JP); Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/186,775

(22) Filed: Jul. 22, 2005

(65) Prior Publication Data

US 2006/0077563 A1 Apr. 13, 2006

(30) Foreign Application Priority Data

Aug. 3, 2004 (JP) ............................ 2004-226425
Sep. 28, 2004 (JP) ............................ 2004-280931
Oct. 1, 2004 (JP) ............................ 2004-289786

(51) Int. Cl.
*G02B 15/14* (2006.01)

(52) U.S. Cl. ...................................... 359/676; 359/689

(58) Field of Classification Search ........ 359/676–692, 359/831–838, 438
See application file for complete search history.

(56) References Cited

U.S. PATENT DOCUMENTS 6,025,961 A 2/2000 Kohno et al. ............... 359/691
6,124,984 A 9/2000 Shibayama ................. 359/689
6,850,373 B2 * 2/2005 Mihara et al. .............. 359/676
6,927,920 B2 * 8/2005 Nagata ........................ 359/677
6,975,462 B2 * 12/2005 Mihara ........................ 359/687
2002/0057502 A1 5/2002 Ishii et al. .................. 359/687
2003/0103157 A1 6/2003 Watanabe et al. ........... 348/360
2003/0160902 A1 8/2003 Mihara et al. .............. 348/676

FOREIGN PATENT DOCUMENTS

JP 09-033810 2/1997

* cited by examiner

*Primary Examiner*—Timothy Thompson
*Assistant Examiner*—M. Hasan
(74) *Attorney, Agent, or Firm*—Kenyon & Kenyon LLP

(57) ABSTRACT

The invention relates to a zoom lens wherein the total of lens components is reduced as much as possible and image-formation capability is enhanced far more stably over the entire zoom range, so that a lot more thickness reductions are achievable upon received at a lens mount, and an electronic imaging system that incorporates it. The electronic imaging system of the invention comprises a zoom lens having a plurality of lens groups G1 and G2 with a variable space between adjacent lens groups during zooming or focusing, wherein the lens group G1 nearest to the object side of the zoom lens comprises two components consisting of a negative lens component and a positive lens component, each having an aspheric surface, and an electronic image pickup device located on an image side of the zoom lens. Image data obtained by taking an image is processed to produce image data with shape changes as an output. The zoom lens satisfies condition (1) that defines the degree of barrel distortion at a zoom wide-angle end.

54 Claims, 23 Drawing Sheets

ZOOM LENS, AND ELECTRONIC IMAGING SYSTEM INCORPORATING THE SAME

This application claims benefit of Japanese Application No. 2004-226425 filed in Japan on Aug. 3, 2004, No. 2004-280931 filed in Japan on Sep. 28, 2004 and No. 2004-28978 filed in Japan Oct. 1, 2004, the contents of which are incorporated by this reference.

BACKGROUND OF THE INVENTION

The present invention relates generally to a zoom lens and an electronic imaging system that incorporates it, and more particularly to a zoom lens that is much more reduced in depth dimension upon received in place, and an electronic imaging system that incorporates it.

In recent years, attentions have been directed to digital (electronic) cameras as the next-generation ones, an alternative to silver-halide 35 mm film (usually called Leica format) cameras. The digital cameras are now broken down in a broader range of some categories from a business-application, multifunction type to a portable low-end type.

The chief bottleneck to slimming down a camera in its depth direction is the thickness of an optical system in general, and a zoom lens system in particular, from the surface nearest to the object side to an image pickup plane. Recently, the use of a so-called collapsible lens mount, wherein an optical system is put out of a camera body during taking and folded down into the camera body during carrying-along, has been in vogue.

Depending on the lens type and filter used, however, there is a large difference in the thickness of the optical system upon received at a collapsible lens mount. Especially to set the specifications for zoom ratios, F-numbers, etc. higher, there need be a so-called zoom lens type with positive power at the front, wherein the lens group nearest to the object side has positive refracting power. However, a problem with this type is that its thickness is not that much reduced upon received at a collapsible lens mount, because each lens element is thick with a large dead space (see patent publication 1). A zoom lens of the type that has negative power at the front and comprises two or three lens groups is favorable in this regard. Again, a problem with this type is that its thickness is not reduced upon received at the lens mount even when the lens nearest to the object side is a positive lens, because each lens group comprises more lenses and each lens element is thick (see patent publication 2).

Some zoom lenses now known to be suitable for use with electronic image pickup devices, have good image-formation capabilities inclusive of zoom ratios, angles of view and F-numbers, and have possibilities of making their thickness upon received at a collapsible lens mount thinnest, for instance, are set forth in patent publications 3 and 4.

A conventional zoom lens with a bent optical path (see patent publication 5, etc.) comprises at least one lens group B having positive refracting power and operable to move monotonously toward its object side upon zooming from its wide-angle end to its telephoto end, and a lens group A that includes on an image side with respect to the lens group B a reflecting optical element having negative refracting power and operable to bend an optical path and remains fixed in place during zooming. With this type, the depth dimension of a camera casing could be diminished. For the reason of restrictions on a paraxial refracting power profile and an entrance pupil position imposed by the optical path-bending reflecting optical element located in the lens group A, it is difficult to improve on zoom magnification, and for the reason of restrictions on correction of aberrations, it is difficult to cut back on the number of lenses. Unless an aperture stop becomes an integral part of the lens group B that moves during zooming, then any pertinent light quantity can never be obtained; a lens shutter, too, must be operable to move together with the lens group B, rendering the mechanism involved likely to become complex and bulky.

Some zoom lenses now known to be suitable for use with electronic image pickup devices, have good image-formation capabilities inclusive of zoom ratios, angles of view and F-numbers, have a minimum number of lenses and have possibilities of making their thickness upon received at a collapsible lens mount thinnest, for instance, are set forth in patent publications 3 and 6. As the entrance pupil of the first lens group is located at a sallow position, it may allow the first lens group itself to become thin, because of a decrease in its diameter. To this end, however, the magnification and, hence, the refracting power, of the second lens group must be increased; there is no option but to sacrifice image-formation capability or use a lot more lenses at the cost of depth dimension reductions.

There are some conventional zoom lenses with their optical paths bent, wherein a fixed lens group having a reflecting surface is fixed in position relative to an image plane, too.

The zoom optical system comprising a fixed lens group having a reflecting surface works for reductions in its whole size, because, as described above, the optical path is turned back such that an entrance-side optical path overlaps a reflection-side optical path. This optical system is also favorable for reducing the whole size of an imaging system in its thickness direction.

Patent Publication 1
JP(A)11-258507
Patent Publication 2
JP(A)11-52246
Patent Publication 3
JP(A)9-33810
Patent Publication 4
JP(A)11-142734
Patent Publication 5
JP(A)2003-43354
Patent Publication 6
JP(A)11-142734

Depending on the lens type and filter used, however, there is a large difference in the thickness of the optical system upon received at a collapsible lens mount. Especially to intend to set the specifications for zoom ratios, F-numbers, etc. higher, there need be a so-called zoom lens type with positive power at the front, wherein the lens group nearest to the object side has positive refracting power. However, a problem with this type is that its thickness is not that much reduced upon received at a collapsible lens mount, because each lens element is thick with a large dead space (see patent publication 1). A zoom lens of the type that has negative power at the front and comprises two or three lens groups is favorable in this regard. Again, a problem with this type is that its thickness is not reduced upon received at the lens mount even when the lens nearest to the object side is a positive lens, because each lens group comprises more lenses and each lens element is thick (see patent publication 2).

Some zoom lenses now known to be suitable for use with electronic image pickup devices, have good image-formation capabilities inclusive of zoom ratios, angles of view and F-numbers, and have possibilities of making their thickness upon received at a collapsible lens mount thinnest, for instance, are set forth in patent publications 3 and 4.

Referring to each of the optical systems set forth in the above patent publication, as the entrance pupil position of the first lens group shallows, it may allow the first lens group itself to become thin, because of a decrease in its diameter. To this end, however, the magnification and, hence, the refracting power, of the second lens group must be increased; there is no option but to sacrifice image-formation capability or use a lot more lenses at the cost of depth dimension reductions.

Further, such optical systems referred to as the prior art much each have a plurality of lens groups in addition to the fixed lens group having a reflecting surface, resulting in a lot more lens groups. Otherwise, it would be required to place some limitations on the range of movement of a lens group in front of, or in the rear of, the fixed lens group having a reflecting surface, working against high zoom ratios.

In view of such problems with the prior art as described above, one object of the invention is to provide a zoom lens that is reduced as much as possible in the depth direction thickness upon received at a collapsible lens mount with image-formation capability enhanced far more stably over all the zoom range, and an electronic imaging system that incorporates it.

Another object of the invention is to provide an electronic imaging system that incorporates a zoom lens in which, in order to reduce as much as possible the depth direction thickness of the lens upon received at a collapsible lens mount, contrivances are provided to the movement of lens groups that form the zoom lens and image processing techniques are sophisticatedly harnessed, thereby reducing the total of lens components as much as possible and enhancing image-formation capability far more stably over all the zoom range.

Yet another object of the invention is to provide an electronic imaging system that can cut back on the number of lens groups even with the use of a fixed lens having an optical path-reflecting surface, and works reasonably for higher zoom ratios.

SUMMARY OF THE INVENTION

According to the first aspect of the invention, there is provided an electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on an image side of the zoom lens, wherein an image formed through the zoom lens can be produced as an image data output wherein image data obtained by picking up the image at the electronic image pickup device are processed to change shape, characterized in that the zoom lens satisfies the following condition (1):

$$0.7<y_{0.8}^*/(f_W \tan \omega_{08W})<0.96 \quad (8)$$

where $y_{08}^*=0.8y_{10}^*$ provided that $y_{10}^*$ is a distance from a center to a farthest point in an effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

According to another aspect of the invention, there is provided an electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on an image side of the zoom lens, wherein an image formed through the zoom lens can be produced as an image data output wherein image data obtained by picking up the image at the electronic image pickup device are processed to change shape, characterized in that the zoom lens satisfies the following condition (1) upon focusing on any object distance that is at least 50 times as long as $f_W$:

$$0.7<y_{0.8}^*/(f_W \tan \omega_{08W})<0.96 \quad (8)$$

where $y_{08}^*=0.8y_{10}^*$ provided that $y_{10}^*$ is a distance from a center to a farthest point in an effective image pickup plane (capable of picking up an image) of the electronic image pickup device, and $\omega_{0.8W}$ is an angle at a wide-angle end of the zoom lens of an object point with respect to an optical axis of the zoom lens, wherein the object point corresponds to an image point of connecting a center on the image pickup plane with a $y_{08}^*$ position.

According to yet another aspect of the invention, there is provided a zoom lens characterized by comprising, in order from an object side of the zoom lens, a first lens group comprising a negative 1-1 lens component B11 and a positive 1-2 lens component B12 and having negative refracting power, and a second lens group comprising a positive 2-1 lens component B21 and a negative 2-2 lens component B22 and having positive refracting power, and satisfying the following conditions (21) and (22):

$$-1.2<f_W/r_{22R}<0.9 \quad (21)$$

$$0.17<(D_{12W}-D_{12T})/(f_W\gamma^2)<0.33 \quad (22)$$

where $r_{22R}$ is an axial radius of curvature of the lens surface located in, and nearest to an image side of, the 2-2 lens component, $D_{12W}$ is an axial distance at a wide-angle end between a vertex of a lens surface located, and nearest to an image side of, the first lens group and an vertex of a lens surface located in, and nearest to an object side of the second lens group, $D_{12T}$ is an axial distance at a telephoto end between the vertex of the lens surface located in, and nearest to the image side of, the first lens group and the vertex of the lens surface located in, and nearest to the object side of, the second lens group, $f_W$ is a focal length of the zoom lens system at the wide-angle end, and $\gamma$ is $f_T/f_W$ where $f_T$ is a focal length of the zoom lens system at the telephoto end. Note here that the “lens component” refers to a single lens, a cemented lens or a composite lens such as one wherein a resin or the like is cured on a lens surface while they are in close contact; the number of a medium boundary surface is the number of the lens plus 1.

According to a further aspect of the invention, there is provided an electronic imaging system comprising:

a zoom lens comprising a plurality of lens groups wherein zooming is implemented by varying a space sandwiched between the plurality of lens groups, an electronic image pickup device located on an image side of the zoom lens, and an imaging system body, wherein:

the zoom lens comprises a deflector element for deflecting an optical axis of the zoom lens, wherein the deflector element is a first lens group that is one lens group in the plurality of lens groups and remains fixed to the imaging system body during the zooming, wherein:

the first lens group is a transmission type lens group having no reflecting surface, is located on an object side with respect to the deflector element, and changes during the zooming in terms of a distance with respect to the deflector element, and wherein:

the electronic image pickup device changes during the zooming in terms of a distance with respect to the deflector element.

According to a further aspect of the invention, there is provided an electronic imaging system comprising:

a zoom lens system for forming a subject image, a photoelectric converter device located on an image side of the zoom lens system to convert an image formed by the zoom lens system into an electric signal, and an imaging system body, wherein:

the zoom lens system comprises a fixed lens group wherein the fixed lens group has an finite focal length and comprises a reflecting surface remaining fixed to the imaging system body during zooming, and at least one movable lens group wherein the movable lens group is located on an entrance side or exit side of the fixed lens group, has a finite focal length, and changes in relative position relation to the fixed lens group for implementing zooming, and wherein:

the photoelectric converter device changes in relative position relation to the fixed lens group in association with movement of an image by zooming of the zoom lens system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
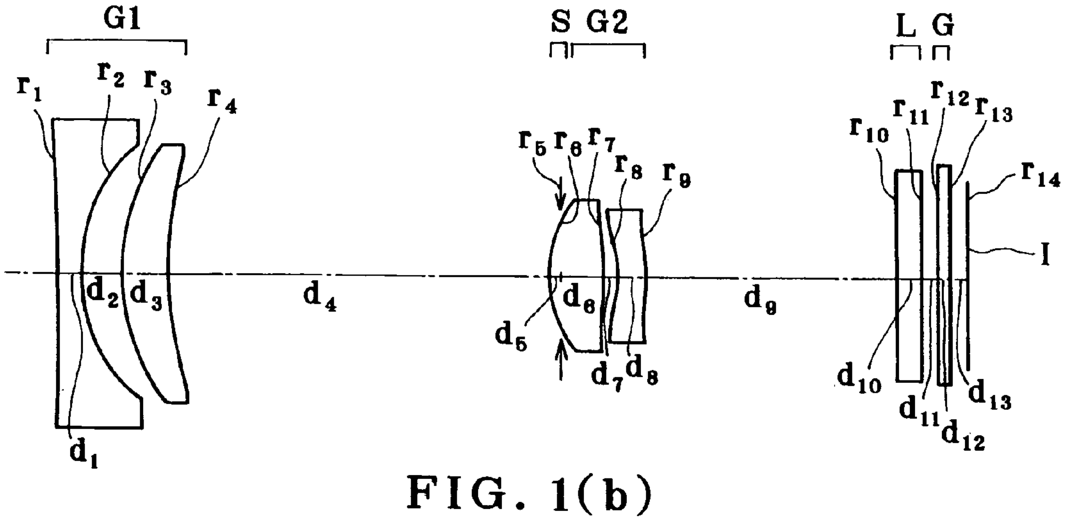
FIG. 1 is illustrative in lens arrangement section of Example 1 of the zoom lens according to the invention at a wide-angle end (a), in an intermediate setting (b) and at a telephoto end, respectively, upon focusing on an infinite object point.

Possible arrangements of the zoom lens and electronic imaging system according to the invention will first be explained, and then embodiments or examples thereof will be described.

First of all, the electronic imaging system according to one aspect of the invention is explained.

According to the first aspect of the invention, there is provided an electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on the image side of the zoom lens, wherein an image formed through the zoom lens can be produced as an image data output wherein image data obtained by picking up the image at the electronic image pickup device are processed to change shape, characterized in that the zoom lens satisfies the following condition (1):

$$0.7<y_{0.8}^*/(f_W \tan \omega_{08W})<0.96 \quad (1)$$

where $y_{08}^*=0.8y_{10}^*$ provided that $y_{10}^*$ is the distance from the center to the farthest point in the effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

According to another aspect of the invention, there is provided an electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on an image side of the zoom lens, wherein an image formed through the zoom lens can be produced as an image data output wherein image data obtained by picking up the image at the electronic image pickup device are processed to change shape, characterized in that the zoom lens satisfies the following condition (1) upon focusing on any object distance that is at least 50 times as long as $f_W$:

$$0.7<y_{0.8}^*/(f_W \tan \omega_{08W})<0.96 \quad (1)$$

where $y_{08}^*=0.8y_{10}^*$ provided that $y_{10}^*$ is the distance from the center to the farthest point in the effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

According to yet another aspect of the invention, there is provided a zoom lens characterized by comprising, in order from an object side of the zoom lens, a first lens group comprising a negative 1-1 lens component B11 and a positive 1-2 lens component B12 and having negative refracting power, and a second lens group comprising a positive 2-1 lens component B21 and a negative 2-2 lens component B22 and having positive refracting power, and satisfying the following conditions (21) and (22):

$$-1.2<f_W/r_{22R}<0.9 \quad (21)$$

$$0.17<(D_{12W}-D_{12T})/(f_W\gamma^2)<0.33 \quad (22)$$

where $r_{22R}$ is an axial radius of curvature of a lens surface located in the 2-2 lens component and nearest to an image side thereof, $D_{12W}$ is an axial distance at a wide-angle end of the zoom lens between a vertex of a lens surface located in the first lens group and nearest to an image side thereof and a vertex of a lens surface located in the second lens group and nearest to an object side thereof, $D_{12T}$ is an axial distance at a telephoto end of the zoom lens between a vertex of a lens surface located in the first lens group and nearest to an image side thereof and a vertex of a lens surface located in the second lens group and nearest to an object side thereof, $f_W$ is a focal length of a zoom lens system, and $\gamma$ is $f_T/f_W$ where $f_T$ is a focal length of the zoom lens system at the telephoto end.

Note that the "lens component" used herein refers to a single lens, a cemented lens or a composite lens such as one wherein a resin or the like is cured on a lens surface while they are in close contact. In other words, the number of a medium boundary surface is the number of the lens plus 1.

The advantages of, and the requirements for, the arrangements set up to the first and second aspects of the invention are now explained.

The first lens group located nearest to the object side of the zoom lens is likely to become largest in diameter. With this in mind, large barrel distortion is intentionally produced at the focal length of the zoom lens near the wide-angle end. In this state, as an image is formed on the electronic image pickup device, it enables the effective diameter of the lens group G1 nearest to the object side to be decreased. As a result, the zoom lens itself can be slimmed down. Consider here the case where the lens group G1 is composed of only two components consisting of a negative lens component and a positive lens component. For correction of distortion in this case, a certain or longer distance must be set between the two lens components. If the amount of distortion is acceptable, however, that distance need not be that long. Here again, some contributions to thickness reductions are obtainable. Incidentally, an image distorted in barrel form is photoelectrically converted at the image pickup device into image data. The image data are then electrically processed at a signal processing system in the electronic image pickup device. This processing is tantamount to shape changes. By such processing, image data are finally produced from the electronic image pickup device. The image data, when reproduced through any display device, are corrected for distortion. In other words, there is obtained an image substantially similar to the shape of the subject.

The greatest aim of the technique of intentionally producing distortion at the optical system to take a distorted image at the electronic image pickup device, and thereafter electrically processing that distorted image to correct it for distortion is to reduce the size of the optical system or configure the optical system as a wide-angle arrangement (having a distortion-introduced angle of view of 38° or greater in the vertical direction).

When an image taken of an object at infinity is free of distortion, there is:

$$f=y^*/\tan \omega=y/\tan \omega$$

where $y^*$ is the height of an image point from an optical axis, y is the height of an ideal image point (that is obtained when there is no distortion in an optical system) from the optical axis, f is the focal length of an image-formation system, and $\omega$ is the angle with respect to the optical axis of the direction of an object point corresponding to an image point of connecting the center on an image pickup plane with the position of $y^*$.

When there is barrel distortion in an image-formation system, there is:

$$f>y^*/\tan \omega$$

It follows that if f and y remain constant, $\omega$ will then have a large value.

Condition (1) is provided to define the degree of barrel distortion at the zoom wide-angle end. Exceeding the upper limit of 0.96 will make size and thickness reductions difficult. As the lower limit of 0.7 is not reached, it causes the enlargement factor of the peripheral portion of an image in the radial direction to become too high, when image distortion due to distortion at the optical system is corrected by image processing. This will result in noticeable deterioration in the sharpness of the peripheral portion of the image.

More preferably, $$0.75<y_{0.8}^*/(f_W \tan \omega_{08W})<0.94 \tag{1)'$$

Most preferably, $$0.80<y_{0.8}^*/(f_W \tan \omega_{08W})<0.92 \tag{1)''$$

In this conjunction, an actual image height y* becomes a function of the ideal image height y. Here, at a local y where its differential value dy*/dy becomes greater than a certain value, a local enlargement factor during correction of distortion becomes too high. Therefore, it is difficult to obtain a given resolving power at that site. It is thus more preferable to satisfy:

$$0.4<(dy^*/dy)_{y08^*}/(dy^*/dy)_{y00^*}<0.9 \tag{1-2}$$

where $(dy^*/dy)_{y08^*}$ is dy*/dy at $y_{08}^*=0.8_{y10}^*$, and $(dy^*/dy)_{y00^*}$ is dy*/dy at $y_{00}^*=0.0_{y10}^*$.

As the lower limit of 0.4 to condition (1-2) is not reached, it causes the local enlargement factor during correction of distortion becomes too high to obtain the given resolving power at that site. Exceeding the upper limit of 0.9 will make it impossible to attain the objects of the invention.

More preferably, $$0.5<(dy^*/dy)_{y08^*}/(dy^*/dy)_{y00^*}<0.85 \tag{1-2)'$$

It is more preferable to satisfy at least the following condition (1-2)".

$$0.55<(dy^*/dy)_{y08^*}/(dy^*/dy)_{y00^*}<0.8 \tag{1-2)''$$

Note here that the image-formation capability of the above zoom lens is compatible with an electronic imaging system that satisfies the following condition (2).

$$1.2<y_{10}^*/a<6.0 \tag{2}$$

Here, $y_{10}^*$ is the distance (maximum image height) in mm from the center to the farthest point in the effective image pickup plane (capable of picking up an image) of the electronic image pickup device, and a is the pixel-to-pixel distance in μm in the long-side direction of the electronic image pickup device.

To slim down the zoom lens, it is desirable to avoid use of an optical low-pass filter as much as possible. It is thus preferable to satisfy the following condition (3).

$$F_W \geqq 1.1a(\mu m) \tag{3}$$

Here, $F_W$ is a full-aperture F-number at the wide-angle end, and a is the pixel-to-pixel distance in μm in the long-side direction of the electronic image pickup device.

This harnesses the fact that as pixel size is smaller than a certain size, there is no component having a frequency greater than Nyquist frequency under the influence of diffraction. When condition (3) is not satisfied, some optical low-pass filter is needed.

If this condition is satisfied, aliasing distortion is then acceptable, even in the absence of any optical low-pass filter. Note that to get hold of image quality, it is preferable to place an aperture stop at a full-aperture state alone, or it is not preferable to stop down the aperture stop. Thus, any stop-down mechanism is dispensed with and, accordingly, size and thickness reductions are achievable.

More preferably, $$F_W \geqq 1.2a(\mu m) \tag{3)'$$

Most preferably, $$F_W \geqq 1.3a(\mu m) \tag{3)''$$

As already stated, it is preferable to set up the zoom lens for an electronic imaging system while distortion is more or less acceptable. It is then preferable to satisfy the following condition (4) with respect to the axial air separation d1 between the negative lens component and the positive lens component in the lens group G1 nearest to the object side.

$$0.3<d1/y_{10}^*<0.6 \tag{4}$$

Here, $y_{10}^*$ is the distance (maximum image height) from the center to the farthest point in the effective image pickup plane (capable of picking up an image) of the electronic image pickup device, given by $0<y_{10}^*<6$ (mm).

As d1 is decreased for the purpose of thickness reductions, it causes the optimum principal point positions of the lens group G1 to shift toward the image side. An effort to get this shift back causes the curvature of the surface of the negative lens component nearest to its object side to move in the negative direction (for instance, that surface takes a meniscus form convex on its image side), causing distortion or astigmatism to become worse. Therefore, the distortion is configured in such a barrel form as to be corrected by image processing. However, as d1 is less than the lower limit of 0.3, distortion becomes too large at the time of correction of astigmatism. In this case, it is difficult to get hold of the resolution of the peripheral portion of a screen even with correction of such large distortion by image processing. Exceeding the upper limit of 0.6 will make it difficult to reduce the whole thickness of the lens system, as is the case with the prior art.

More preferably, $$0.33<d1/y_{10}^*<0.55 \tag{4)'$$

Most preferably, $$0.36<d1/y_{10}^*<0.5 \tag{4)''$$

Alternatively, it is preferable for the negative lens component and the positive lens component in the lens group G1 nearest to the object side to satisfy the following condition (5). This makes it easy to decrease d1.

$$0.55<R_{11R}/R_{12F}<0.95 \tag{5}$$

Here, $R_{11R}$ is the axial radius of curvature of the surface located in, and nearest to the image side of, the negative lens component in the lens group G1 nearest the object side, and $R_{12F}$ is the axial radius of curvature of the surface located in, and nearest to the object side of, the positive lens component in the lens group G1 nearest the object side.

As the upper limit of 0.95 to condition (5) is exceeded, distortion becomes too large at the time of correction of astigmatism, rendering it difficult to get hold of the resolution of the peripheral portion of the screen even with correction of the distortion by image processing. As the lower limit of 0.55 is not reached, it makes it difficult to reduce the thickness of the whole lens system as is the case with the prior art.

More preferably, $$0.6<R_{11R}/R_{12F}<0.9 \tag{5)'$$

Most preferably, $$0.65<R_{11R}/R_{12F}<0.85 \tag{5)''$$

From another angle of view, it is also preferable for the negative lens in the lens group G1 nearest to the object side to satisfy the following two conditions (6) and (7) with respect to its shape factor and medium refractive index.

$$0.0<(R_{11F}+R_{11R})/(R_{11F}-R_{11R})<1.5 \quad (6)$$

$$1.55<n1 \quad (7)$$

Here, $R_{11F}$ is the axial radius of curvature of the surface located in, and nearest to the object side of, the negative lens component in the lens group G nearest the object side, $R_{11R}$ is the axial radius of curvature of the surface located in, and nearest to the image side of, the negative lens component in the lens group G1 nearest the object side, and n1 is the refractive index of a center lens element of the negative lens component having the largest thickness.

As the lower limit of 0.0 to condition (6) is not reached, distortion becomes too large at the time of correction of astigmatism, rendering it difficult to get hold of the resolution of the peripheral portion of the screen even with correction of the distortion by image processing. As the upper limit of 1.5 is exceeded, it makes it difficult to reduce the thickness of the whole lens system as is the case with the prior art. Note here that unless the refractive index of the center lens element of the negative lens component in the lens group G1, which has the larges thickness, is greater than a certain value within the range of condition (7), it will be difficult to get hold of the desired resolution even with the satisfaction of condition (6).

More preferably, $$0.3<(R_{11F}+R_{11R})/(R_{11F}-R_{11R})<1.2 \quad (6)'$$

$$1.60<n1 \quad (7)'$$

Most preferably, $$0.5<(R_{11F}+R_{11R})/(R_{11F}-R_{11R})<0.9 \quad (6)''$$

$$1.65<n1 \quad (7)''$$

Alternatively, it is preferable to satisfy the following condition with respect to the axial thickness t1 of the lens group G1 nearest to the object side from the surface nearest to the object side to the surface nearest to the image side.

$$0.7<t1/y_{10}^*<1.35 \quad (8)$$

Here, $y_{10}^*$ is the distance (maximum image height) from the center to the farthest point in the effective image pickup plane (capable of picking up an image) of the electronic image pickup device, given by $0<y_{10}^*<6$ (mm).

As t1 is less than the lower limit of 0.7 to condition (8), distortion becomes too large at the time of correction of astigmatism. In this case, it is difficult to get hold of the resolution of the peripheral portion of a screen even with correction of that large distortion by image processing. Exceeding the upper limit of 1.35 will make it difficult to reduce the thickness of the whole lens system, as is the case with the prior art.

More preferably, $$0.8<t1/y_{10}^*<1.3 \quad (8)'$$

Most preferably, $$0.85<t1/y_{10}^*<1.25 \quad (8)''$$

Note here that the aforesaid lens group G1 nearest to the lens group G1 could consist of, in order from its object side, only two lens elements consisting of a negative lens and a positive lens.

Referring then to the lens group G2 adjacent to the image side of the lens group G1 nearest to the object side, it always moves toward the object side upon zooming from the wide-angle side to the telephoto side, and satisfies the following condition (9).

$$1.3<-\beta_T<2.1 \quad (9)$$

Here, $\beta_T$ is the transverse magnification of the lens group G2 at the telephoto end. Here again, $y_{10}^*$ is the distance (maximum image height) from the center to the farthest point in the effective image pickup plane (capable of picking up an image) of the electronic image pickup device, given by $0<y_{10}^*<6$ (mm).

For reducing the size and thickness of the lens group G1, it is effective to decrease its effective diameter; however, the transverse magnification of the lens group G2 becomes important to this end. As the lower limit of 1.3 to condition (9) is not reached, the total length of the lens system becomes long at the wide-angle end. This will in turn render the mechanism for receiving the lens groups at a collapsible lens mount complicate and bulky. What is more, the effective diameter of the lens group G1 becomes large, often offering an obstacle to thickness reductions. As the upper limit of 2.1 is exceeded, it will be difficult to get hold of the desired resolution unless the second lens group G2 is composed of a lot more lenses.

More preferably, $$1.35<-\beta_T<2.0 \quad (9)'$$

Most preferably, $$1.4<-\beta_T<1.9 \quad (9)''$$

It is preferable for the lens group G2 adjacent to the image side of the lens group G1 nearest to the object side always move toward the object side upon zooming from the wide-angle side to the telephoto side and satisfy the following condition.

$$0.7<t2/y_{10}^*<1.6 \quad (10)$$

Here, t2 is the axial distance of the lens group G2 from the surface nearest to the object side to the surface nearest to the image side, and $y_{10}^*$ is the distance (maximum image height) from the center to the farthest point in the effective image pickup plane (capable of picking up an image) of the electronic image pickup device, given by $0<y_{10}^*<6$ (mm).

As the lower limit of 0.7 to condition (10) is not reached, it is difficult to implement correction of astigmatism all over the zoom range. As the upper limit of 1.6 is exceeded, on the other hand, the use of a lot more aspheric surfaces in the lens group G2 for the purpose of reducing the number of lenses will count for nothing.

More preferably, $$0.8<t2/y_{10}^*<1.5 \quad (10)'$$

Most preferably, $$0.9<t2/y_{10}^*<1.4 \quad (10)''$$

It is preferable to satisfy the following condition with respect to how to move the lens group G2. This works favorably for reducing the thickness of the lenses upon received at a collapsible lens mount.

$$0.10<D_{12T}/y_{10}^*<0.7 \quad (11)$$

Here, $D_{12T}$ is the axial distance from the surface located in, and nearest to the image side of, the lens group G1 to the surface located in, and nearest to the object side of, the lens group G2 at the telephoto end and upon focusing at an infinite object point, and $y_{10}$* is the distance (maximum image height) from the center to the farthest point in the effective image pickup plane (capable of picking up an image) of the electronic image pickup device, given by $0<y_{10}^*<6$ (mm).

As the upper limit of 0.7 is exceeded, the size of the optical system is likely to become large. In other words, the whole optical system becomes thick contrary to the objects of the invention. As the lower limit of 0.10 is not reached, it enables the total thickness of a lens portion at the telephoto end to become small, making it easy to reduce the thickness of the lenses upon received at a collapsible lens mount. However, the lens groups are likely to interfere mechanically during zooming.

Note here that an aperture stop is adjacent to the object side of the lens group G2, and moves together with it. As $D_{12T}$ becomes small, therefore, it offers an obstacle. However, the surface located in, and nearest to the object side of, the lens group G2 is convex on its object side. Therefore, if the aperture stop is located such that the lens surface penetrates through its internal diameter portion, that obstacle will then be removed.

For the electronic imaging system of the invention, it is unnecessary to stop down the stop in consideration of deterioration by diffraction, because of a small pixel pitch. That is, it is preferable to satisfy the following condition.

$$-0.7<ds/y_{10}^*<0 \qquad (12)$$

Here, ds is the distance between the point of intersection of a plane including an aperture site (internal diameter portion) of the aperture stop that determines the farthest axial light ray with the optical axis and the vertex of the surface located in, and nearest to the object side of, the lens group G2. The distance ds has a negative value when the latter is positioned on an object side with respect to the former.

If condition (12) is satisfied, then it is easier to satisfy condition (11). As the upper limit of 0 is exceeded, difficulty is involved in satisfying condition (11). Being shy of the lower limit of −0.7 is useless, because the satisfaction of condition (11) counts for nothing.

More preferably, $$0.15<D_{12t}/y10^*<0.6 \qquad (11)'$$

$$-0.6<ds/y_{10}^*<-0.05 \qquad (12)'$$

Most preferably, $$0.20<D_{12t}/y10^*<0.5 \qquad (11)''$$

$$-0.5<ds/y_{10}^*<-0.1 \qquad (12)''$$

As already described, the lens group nearest to the object side is likely to become large. One significant factor for determining the size of the lens group G1 is the position of the aperture stop as viewed from the surface located in, and nearest to the object side of, the lens group G1. It is preferable for the aperture stop to satisfy the following condition while lying on the image side of the lens group G1.

$$4.0<P_W/y_{10}^*<6.5 \qquad (13)$$

Here, $P_W$ is the axial distance from the surface located nearest to the object side at the wide-angle end to the position of the aperture stop, and $y_{10}$* is the distance (maximum image height) from the center to the farthest point in the effective image pickup plane (capable of picking up an image) of the electronic image pickup device, given by $0<y_{10}^*<6$ (mm).

Being short of the lower limit of 4.0 to condition (13) may work for reducing the size of the lens group G1; however, it applies a lot more loads on the lens group G2 (refracting power), often resulting in deterioration in image-formation capability. As the upper limit of 6.5 is exceeded, it renders the lens group likely to become bulky.

More preferably, $$4.2<P_W/y_{10}^*<6.0 \qquad (13)'$$

Most preferably, $$4.4<P_W/y_{10}^*<5.5 \qquad (13)''$$

It is noted that the lens group G2 adjacent to the image side of the lens group G1 nearest to the object side could be composed of only two lens components consisting of, in order from its object side, a positive lens component and a negative lens component or, alternatively, it could be composed of only two lens elements consisting of a positive lens and a negative lens. It is then preferable for the negative lens component or negative lens to satisfy the following condition (14) with respect to their shape.

$$-10<(R_{22F}+R_{22R})/(R_{22F}-R_{22R})<0.5 \qquad (14)$$

Here, $R_{22F}$ is the axial radius of curvature of the surface located in, and nearest to the object side of, the negative lens component in the lens group G2, and $R_{22R}$ is the axial radius of curvature of the surface located in, and nearest to the image side of, the negative lens component in the lens group G2.

Exceeding the upper limit of 0.5 to condition (16) may make it easy to decrease the amount of movement of the lenses upon received at a collapsible lens mount; however, it renders coma, etc. likely to become worse. Being short of the lower limit of −10 renders the amount of movement of the lenses upon received at the collapsible lens mount likely to become large.

More preferably, $$-8<(R_{22F}+R_{22R})/(R_{22F}-R_{22R})<-0.5 \qquad (14)'$$

Most preferably, $$-6<(R_{22F}+R_{22R})/(R_{22F}-R_{22R})<-2 \qquad (14)''$$

Regarding the aforesaid conditions (1) to (14), two or more of them or their narrower conditions could be applied in combination.

According to the above aspect of the invention, it is possible to obtain an electronic imaging system that incorporates a zoom lens wherein its image-formation capability is very stably enhanced all over the zoom range, even when the total of lenses is reduced down to a minimum of four so as to reduce the depth direction thickness of the lenses upon received at a collapsible lens mount as much as possible.

According to another aspect of the invention, there is provided a zoom lens, characterized by comprising a first lens group having negative refracting power and a second lens group having positive refracting power, wherein the first lens group consists of a negative 1-1 lens component B11 and a positive 1-2 lens component B12 and the second lens group consists of a positive 2-1 positive lens component B21 and a negative 2-2 lens component B22, and satisfying the following conditions:

$$-1.2<f_W/r_{22R}<0.9 \qquad (21)$$

$$0.17<(D_{12W}-D_{12T})/(f_W\cdot\gamma^2)<0.33 \qquad (22)$$

Here, $r_{22R}$ is the axial radius of curvature of the lens surface located in, and nearest to the image side of, the 2-2 lens component, $D_{12W}$ is the axial distance between the vertex of the lens surface located in, and nearest to image side of, the first lens group and the vertex of the lens surface located in, and nearest to the object side of, the second lens group upon focusing on the farthest object point at the wide-angle end of the zoom lens, $D_{12T}$ is the axial distance between the vertex of the lens surface located in, and nearest to the object side of, the first lens group and the vertex of the lens surface located in, and nearest to the object side of, the second lens group upon focusing on the farthest object point at the telephoto end of the zoom lens, $f_W$ is the focal length of the zoom lens system at the wide-angle end, and γ is $f_T/f_W$ where $f_T$ is the focal length of the zoom lens system at the telephoto end. Note here that the "lens component" refers to a single lens, a cemented lens or a composite lens such as one wherein a resin or the like is cured on a lens surface while they are in close contact. In other words, the number of a medium boundary surface is the number of the lens plus 1.

The advantage of, and the requirement for, the above zoom lens arrangement according to this aspect is now explained.

The zoom lens of the invention could be composed of only two lens groups consisting of the first lens group and the second lens group, and each lens component could be composed of a single lens. Here, if the zoom lens satisfies the following conditions (21) and (22), it can be more slimmed down in its depth direction.

As the upper limit of 0.9 to condition (21) is exceeded, the thickness of the zoom lens upon received at a collapsible lens mount, that is, the thickness defined by the distance between the lens surface nearest to the object side and the lens surface nearest to the image side, becomes small on the optical axis but becomes large at the peripheral portion, winding up a failure in slimming down the zoom lens upon received at the lens mount. For correction of aberrations, the lens surface located in, and nearest to the image side of, the 2-2 lens component B22 is preferably configured in such an aspheric shape that its central portion near the optical axis is in a convex form on its image side so as to implement correction of astigmatism and its peripheral portion is in a concave form on its image side so as to implement correction of spherical aberrations and coma. A problem with this case is, however, that the decentration sensitivity of that lens surface relative to the lens surface located in, and nearest to the object side of, the 2-2 lens component B22 is susceptible to become high. Therefore, it is preferable that astigmatism is corrected at the first lens group in such a way as to satisfy at least the lower limit of −1.2 to condition (21).

Exceeding the upper limit of 0.33 to condition (22) may work for correction of aberrations; however, it causes off-axis light rays through the first lens group to gain height at the wide-angle end. This in turn renders the diameter of the first lens group likely to become large, and makes each lens component thick contrary to the objects of the invention. Falling short of the lower limit of 0.17 may work for thickness reductions; however, it requires for both the first and second lens groups to have increased refracting power, which combines with fewer lenses, posing problems such as difficulty in correction of each aberration and an increased sensitivity to decentration.

More preferably, $$-1.1<f_W/r_{22R}<0.7 \qquad (21)'$$

$$0.19<(D_{12W}-D_{12T})/(f_W\cdot\gamma^2)<0.30 \qquad (22)'$$

Most preferably, $$-1<f_W/r_{22R}<0.5 \qquad (21)''$$

$$0.21<(D_{12W}-D_{12T})/(f_W\cdot\gamma^2)<0.27 \qquad (22)''$$

For the zoom lens, it is even more preferable to satisfy the aforesaid conditions (21) and (22) and, consequently, satisfy the following condition (23).

$$1.0<\Sigma D_T/f_W<2.2 \qquad (23)$$

Here, $\Sigma D_T$ is the distance at the telephoto end from the vertex of the lens surface nearest to the object side to the vertex of the lens surface nearest to the image side.

When the upper limit of 2.2 to condition (23) is exceeded, the thickness of the zoom lens upon received at the lens mount is still insufficient. As the lower limit of 1.0 is not reached, it renders the formation of a lens component having given refracting power difficult.

More preferably, $$1.2<\Sigma D_T/f_W<2.0 \qquad (23)'$$

Most preferably, $$1.4<\Sigma D_T/f_W<1.8 \qquad (23)''$$

If the zoom lens satisfies the following condition (24) as another condition, it is then easy to satisfy conditions (21), (22) and (23).

$$0.1<f_W/f_{22}|<1 \qquad (24)$$

Here, $f_{22}$ is the composite focal length of the 2-2 lens component.

Especially if the satisfaction of condition (22) is taken into account, it is then preferable to allow the second lens group to have some or larger refracting power. In other words, it is preferable that the composite focal length of the 2-2 lens component acting to cancel out the refracting power of the second lens group is short. As the upper limit of 1 to condition (24) is exceeded, it causes the refracting power of the second lens group to become weak, or poses problems such as degradation of aberrations and sensitivity to decentration, because the refracting power sharing of the 2-1 lens component increases. As the lower limit of 0.1 is not reached, it often results in undercorrection of each aberration (especially longitudinal chromatic aberration).

More preferably, $$0.2<f_W/f_{22}|<0.8 \qquad (24)'$$

Most preferably, $$0.3<f_W/f_{22}|<0.6 \qquad (24)''$$

Therefore, it is preferable for the zoom lens to have satisfied the following condition (25).

$$35<\nu_{21}-\nu_{22}<95 \qquad (25)$$

Here, $\nu_{21}$ is the Abbe constant of the 2-1 lens component, and $\nu_{22}$ is the Abbe constant of the 2-2 lens component, each on a d-line basis.

Exceeding the upper limit of 95 to condition (25) poses no problem in conjunction with aberrations, but there are no such optical media. Being short of the lower limit of 35 will render longitudinal chromatic aberration likely to become worse.

More preferably, $$40<\nu_{21}-\nu_{22}<85 \qquad (25)'$$

Most preferably, $$45<\nu_{21}-\nu_{22}<80 \qquad (25)''$$

The following conditions (26), (27), (28) and (29), too, are favorable for slimming down the zoom lens upon received at the lens mount; it is preferable for the zoom lens to have satisfied any one of them.

$$0.7 < f_W/r_{11F} < 0.2 \quad (26)$$

$$0.6 < t_1/t_2 < 1.4 \quad (27)$$

$$0.1 < d_{11}/f_W < 0.5 \quad (28)$$

$$0.5 < R_{11R}/R_{12F} < 1 \quad (29)$$

Here, $r_{11F}$ is the axial radius of curvature of the lens surface located in, and nearest to the object side of, the 1-1 lens component, $t_1$ is the axial thickness of the first lens group from the surface nearest to its object side and the surface nearest to its image side, $t_2$ is the axial thickness of the second lens group from the surface nearest to its object side and the surface nearest to its image side, $d_{11}$ is the axial air separation between the negative 1-1 lens component and the positive 1-2 lens component in the first lens group, $R_{11R}$ is the axial radius of curvature of the surface located in, and nearest to the image side of, the negative 1-1 lens component in the first lens group, and $R_{12F}$ is the axial radius of curvature of the surface located in, and nearest to the image side of, the positive 1-2 lens component in the first lens group.

As the lower limit of −0.7 to condition (26) is not reached, the thickness of the zoom lens upon received at a collapsible lens mount (that is, the thickness defined by the distance between the lens surface nearest to the object side and the lens surface nearest to the image side) becomes small on the optical axis but becomes large at the peripheral portion, winding up a failure in slimming down the zoom lens upon received at the lens mount. As the upper limit of 0.2 is exceeded, it renders correction of astigmatism difficult.

As the upper limit of 1.4 to condition (27) is exceeded, the sensitivity to relative decentration is likely to increase when each lens surface in the second lens group is formed of an aspheric surface. When the lower limit of 0.6 is not reached, astigmatism is likely to become worse.

As the axial air separation $d_{11}$ between the negative 1-1 lens component and the positive 1-2 lens component in the first lens group is decreased for the purpose of thickness reductions, it causes the optimum principal point positions of the lens group to shift toward the image side. An effort to get this shift back causes the curvature of the surface of the negative lens component nearest to its object side to move in the negative direction, causing barrel distortion or astigmatism to become worse. Here, if the distortion is intentionally produced, it can then be corrected by image processing. However, as d1 is less than the lower limit of 0.1 to condition (28), distortion becomes too large at the time of correction of astigmatism. In this case, it is difficult to get hold of the resolution of the peripheral portion of a screen even with correction of such large distortion by image processing. Exceeding the upper limit of 0.5 to condition (28) will make it difficult to reduce the thickness of the whole lens system, as is the case with the prior art.

Alternatively, if distortion is acceptable, it is then easy to decrease $d_{11}$ by allowing the negative lens component and the positive lens component in the first lens group of the zoom lens to satisfy condition (29). As the upper limit of 1 to condition (29) is exceeded, it causes distortion to become too large at the time of correction of astigmatism. In this case, it is difficult to get hold of the resolution of the peripheral portion of a screen even with correction of such large distortion by image processing. Being shy of the lower limit of 0.5 to condition (29) will make it difficult to reduce the thickness of the whole lens system, as is the case with the prior art.

Regarding conditions (26), (27), (28) and (29), it is more preferable to satisfy the following narrower conditions:

$$-0.5 < f_W/r_{11F} < 0.15 \quad (26)'$$

$$0.7 < t_1/t_2 < 1.3 \quad (27)'$$

$$0.15 < d_{11}/f_W < 0.4 \quad (28)'$$

$$0.55 < R_{11R}/R_{12F} < 0.95 \quad (29)'$$

Regarding conditions (26), (27), (28) and (29), it is most preferable to satisfy the following much narrower conditions:

$$-0.3 < f_W/r_{11F} < 0.1 \quad (26)''$$

$$0.8 < t_1/t_2 < 1.2 \quad (27)''$$

$$0.2 < d_{11}/f_W < 0.3 \quad (28)''$$

$$0.6 < R_{11R}/R_{12F} < 0.9 \quad (29)''$$

An electronic imaging system to which the inventive zoom lens is applied, specifically, a camera with an electronic image pickup device mounted on the image side of such a zoom lens as described above is now explained. In order for such an electronic imaging system to implement correction of image distortion due to distortion, it is preferable to process image data obtained by picking up an image by the electronic image pickup device to produce the image data as an image data output having changed in shape. In this case, it is preferable to have determined the acceptable level of the distortion of the zoom lens. In other words, it is preferable to satisfy the following condition upon focusing on any object distance that is at least 50 times as long as $f_W$.

$$0.7 < y_{08}^*/(f_W \tan \omega_{08W}) < 0.96 \quad (30)$$

Here, $y_{08}^* = 0.8 y_{10}^*$ provided that $y_{10}^*$ is the distance (maximum image height) from the center to the farthest point in the effective image pickup plane (capable of picking up an image) of the electronic image pickup device, and $\omega_{08W}$ is the angle at the wide-angle end of the direction of an object point with respect to the optical axis, wherein the object point corresponds to an image point of connecting the center on the image pickup plane with a $y_{08}^*$ position.

As an image with large barrel distortion intentionally introduced in it is formed on the electronic image pickup device at a focal length near the wide-angle end of the zoom lens, it enables the effective diameter of the first lens group likely to become largest in diameter to be decreased. As a result, the first lens group itself can be slimmed down. Further, when the first lens group is composed of only two components consisting of a negative lens and a positive lens, a certain or longer distance must be set between the two lens components for correction of distortion. If the amount of distortion is acceptable, however, that distance need not be that long. Here again, some contributions to thickness reductions are obtainable. This is also favorable for correction of astigmatism.

An image distorted in barrel form is photo-electrically converted at the image pickup device into image data. The image data are then subjected to processing corresponding to an electrical shape change at a signal processing system in the electronic image pickup device. By such processing, the ensuing image data are finally produced out of the electronic image pickup device. The image data, when reproduced through any display device, are already corrected for distortion. In other words, there is obtained an image substantially similar to the shape of the subject.

When an image taken of an object at infinity is free of distortion, there is:

$$f=y^*/\tan\omega=y/\tan\omega$$

where y* is the height of an image point from the optical axis, y is the height of an ideal image point (that is obtained when there is no distortion in an optical system) from the optical axis, f is the focal length of an image-formation system, and ω is the angle with respect to the optical axis of the direction of an object point corresponding to an image point of connecting the center on the image pickup plane with the position of y*.

When there is barrel distortion in the image-formation system, there is:

$$f>y^*/\tan\omega$$

It follows that if f and y remain constant, ω will then have a large value.

Condition (30) is provided to define the degree of barrel distortion at the wide-angle end of the zoom lens. Exceeding the upper limit of 0.96 will make size and thickness reductions difficult. As the lower limit of 0.7 is not reached, it causes the enlargement ratio of the peripheral portion of an image in a radial direction to become too high, when image distortion due to distortion at the optical system is corrected by image processing. This will result in noticeable deterioration in the sharpness of the peripheral portion of the image.

The greatest aim of the technique of intentionally producing distortion at the optical system to pick up a distorted image at the electronic image pickup device, and thereafter electrically processing that distorted image to correct it for distortion is to reduce the size of the optical system or configure the optical system as a wide-angle arrangement (having a distortion-introduced angle of view of 38° or greater in the vertical direction).

More preferably, $$0.75<y_{08}^*/(f_W\cdot\tan\omega_{08W})<0.95 \quad (30)'$$

Most preferably, $$0.80<y_{08}^*/(f_W\cdot\tan\omega_{08W})<0.94 \quad (30)''$$

In this conjunction, an actual image height y* becomes a function of the ideal image height y. Here, at a local y where its differential value dy*/dy becomes greater than a certain value, a local enlargement factor during correction of distortion becomes too high. Therefore, it is difficult to obtain a given resolving power at that site. It is thus more preferable to satisfy:

$$0.4<(dy^*/dy)_{y08*}/(dy^*/dy)_{y00*}<0.9 \quad (30\text{-}2)$$

where $(dy^*/dy)_{y08*}$ is dy*/dy at $y_{08}^*=0.8_{y10*}$, and $(dy^*/dy)$ $y_{00*}$ is dy*/dy at $y_{00}^*=0.0_{y10}^*$.

As the lower limit of 0.4 to condition (30-2) is not reached, it causes the local enlargement factor during correction of distortion becomes too high to obtain the given resolving power at that site. Exceeding the upper limit of 0.9 will make it impossible to attain the objects of the invention.

More preferably, $$0.5<(dy^*/dy)_{y08*}/(dy^*/dy)_{y00*}<0.87 \quad (30\text{-}2)'$$

It is most preferable to satisfy at least the following condition (30-2)".

$$0.55<(dy^*/dy)_{y08*}/(dy^*/dy)_{y00*}<0.84 \quad (30\text{-}2)''$$

Note here that the image-formation capability of the above zoom lens is compatible with an electronic imaging system that satisfies the following condition (31).

$$1.2<y_{10}^*/a<6.0 \quad (31)$$

Here, $y_{10}^*$ is the distance (maximum image height) in mm from the center to the farthest point in the effective image pickup plane (capable of picking up an image) of the electronic image pickup device, and a is the pixel-to-pixel distance in μm in the long-side direction of the electronic image pickup device.

To slim down the zoom lens, it is desirable to avoid use of an optical low-pass filter as much as possible. It is thus preferable to satisfy the following condition (32).

$$F_W \geqq 1.1a(\mu m) \quad (32)$$

Here, $F_W$ is a full-aperture F-number at the wide-angle end, and a is the pixel-to-pixel distance in μm in the long-side direction of the electronic image pickup device.

Unless this condition (32) is satisfied, it is then necessary to use an optical low-pass filter.

More preferably, $$F_W \geqq -1.2a(\mu m) \quad (32)'$$

Most preferably, $$F_W>1.3a(\mu m) \quad (32)''$$

This harnesses the fact that as pixel size is smaller than a certain size, there is no component having a frequency greater than Nyquist frequency under the influence of diffraction. When condition (32) is not satisfied, some optical low-pass filter is needed. Therefore, it is preferable to place an aperture stop at a full-aperture state alone, or it is not preferable to stop down the aperture stop. Thus, any stop-down mechanism is dispensed with and, accordingly, size and thickness reductions are achievable.

According to the above aspect of the invention, it is possible to obtain an electronic imaging system that incorporates a zoom lens wherein its image-formation capability is very stably enhanced all over the zoom range, even when the total of lenses is reduced down to a minimum of four so as to reduce the depth direction thickness of the lenses upon received in place (at a collapsible lens mount) as much as possible.

An electronic imaging system according to a further aspect of the invention could have such arrangements as described below.

The first electronic imaging system according to the further aspect of the invention comprises:

a zoom lens comprising a plurality of lens groups wherein zooming is implemented by varying a space or space sandwiched between the plurality of lens groups, and an electronic image pickup device located on an image side of the zoom lens, characterized in that:

the zoom lens comprises a deflector element for deflecting an optical axis, wherein the deflector element remains fixed to an imaging system body during the zooming, a first lens group that is one lens group in the plurality of lens groups is a transmission type lens group having no reflecting surface, is located on an object side with respect to the deflector element, and changes during zooming in terms of a distance with respect to the deflector element, and the electronic image pickup device changes during zooming in terms of a distance with respect to the deflector element.

The advantage of, and the requirement for, the above first electronic imaging system arrangement is now explained.

A prior art zoom lens with a bent optical path (for instance, patent publication 1) comprises at least one lens group B that has positive refracting power and moves monotonously toward the object side upon zooming from the wide-angle end to the telephoto, and a lens group A located on an object side with respect to the lens group B, wherein the lens group A has negative refracting power, includes a reflecting optical element for bending an optical path and remains fixed during zooming. With this type, the depth dimension of a camera casing may be slimmed down, but it is difficult to improve on the zoom magnification by the lens group B or a composite system comprising it and the following lens group(s), because the optical path bending reflecting optical element is included in the lens group A. Further, it is difficult to achieve any wide-angle arrangement, implement correction of aberrations and cut down on the number of lenses.

According to the further aspect of the invention, therefore, the deflector element is fixed to the system body, and on an object side with respect to it there is located a lens group that is movable during zooming. This movable lens group is configured as a transmission type lens group having no reflecting surface, and having adjacent transmitting surfaces coming close to each other. This arrangement works for correction of aberrations without increasing the size of the lens group.

Further, the reflecting surface is fixed and the electronic image pickup device positioned on the image side thereof is moved during zooming, so that the thickness of the whole lens system can be reduced at the time of taking.

With the invention wherein the optical path-bending optical element (that has an optical path-bending function) is fixedly provided to the second lens group on an electronic image pickup device side with respect to the first lens group, the above problem can be solved.

The second electronic imaging system according to the further aspect of the invention is characterized in that in the first electronic imaging system, the deflector element is a mirror.

Referring now to the advantage of, and the requirement for, the above second electronic imaging system arrangement, the mirror is used as the optical element having a bending function (deflector element) to reduce as much as possible the depth dimension of the lens system housed in the camera casing (upon received at a so-called collapsible lens mount). That mirror is positioned while its normal is inclined with respect to the entrance side optical axis (the optical axis of the first lens group) so as to bend the optical path at the time of zooming. For instance, if that mirror is movable at the time of receiving the optical system at the lens mount in the camera casing and it is housed together with the second lens group in the camera casing in such a way that it is substantially vertical to or substantially parallel with the optical axis of the first lens group or the normal to the effective image pickup plane of the electronic image pickup device, then depth dimensions are much more reduced.

The third electronic imaging system according to the further aspect of the invention is characterized in that in the first electronic imaging system, the deflector element is a prism.

Referring now to the advantage of, and the requirement for, the above third electronic imaging system arrangement, instead of the mirror, the prism could be used as the optical element (deflector element) having a bending function. This arrangement, because of ensuring a lot longer optical path, is superior to the second arrangement in view of getting hold of back focus and implement correction of aberrations. Further, if any lens in the second lens group is integral with that prism, then depth dimensions are much more reduced.

The fourth electronic imaging system according to the further aspect of the invention is characterized in that, in the first electronic imaging system, the deflector element is located between the first lens group and the second lens group.

Referring now to the advantage of, and the requirement for, the above fourth electronic imaging system arrangement, the deflector element could be provided independently from the first lens group and the second lens group and located between them.

The fifth electronic imaging system according to the further aspect of the invention is characterized in that in the first electronic imaging system, the deflector element is located in the second lens group.

Referring now to the advantage of, and the requirement for, the above fifth electronic imaging system arrangement, it is especially preferable to fixedly locate the optical element (deflector element) having a bending function in the second lens group. Especially for correction of astigmatism, it is preferable to set a bit longer axial distance between the lens surface located in, and nearest to the object side of, the second group and the lens surface located in, and nearest to the image side of, the second lens group; however, this is in a direction contrary to the objects of the invention. In view of efficiency, it is thus preferable that the optical element, for which a certain optical path length is needed, for instance a mirror or a prism, is located in the second lens group.

The sixth electronic imaging system according to the further aspect of the invention is characterized in that in the first electronic imaging system, the deflector element is located on an image side with respect to the second lens group.

The advantage of, and the requirement for, the above sixth electronic imaging system arrangement is now explained. Even when, in view of getting hold of paraxial quantity or correction of aberrations, there must be some or wider space between the deflector element and the lens group adjacent to the image side of the second lens group or the electronic pickup device all over the zoom rage, it is more efficient to locate the optical element, for which a certain optical path length is needed, like a mirror or a prism, on the image side of the second lens group.

The seventh electronic imaging system according to the further aspect of the invention is characterized in that in the first electronic imaging system, the zoom lens is mounted on the electronic imaging system, the electronic imaging system has a finder function (of the display or other mode), and a finder viewing plane and the second lens group remain invariable in position during zooming.

Note here that by the “finder viewing plane” is intended a display plane for the image being viewed, the display plane of a display device, the field frame of a real image finder, a ground glass plane, etc.

The advantage of, and the requirement for, the above seventh electronic imaging system arrangement is now explained. If the finder viewing plane and the second lens group are designed to remain invariable in position during zooming, it is then unnecessary to move the positions of a shutter, the optical element (deflector element) having a bending function, and so on. This in turn allows for mechanical simplifications, and reductions in the size and thickness of the casing of the electronic imaging system.

The eighth electronic imaging system according to the further aspect of the invention is characterized in that any one of the 1st to the 7th electronic imaging system is operable to process image data obtained by picking up an image at the electronic image pickup device wherein the image is formed through the zoom lens, thereby producing the image data as an image data output having changed in shape, and satisfies the following condition upon focusing on any object distance that is at least 50 times as long as $f_W$.

$$0.7<y_{08}^*/(f_W \tan \omega_{08W})<0.96 \quad (41)$$

Here, $f_W$ is the focal length of the whole zoom lens system at the wide-angle end, $y_{08}^*=0.8y_{10}^*$ provided that $y_{10}^*$ is the distance (maximum image height) from the center to the farthest point in the effective image pickup plane (capable of picking up an image) of the electronic image pickup device, and $\omega_{08W}$ is the angle at the wide-angle end of the direction of an object point with respect to the optical axis, wherein the object point corresponds to an image point of connecting the center on the image pickup plane with a $y_{08}^*$ position.

The advantage of, and the requirement for, the above eighth electronic imaging system arrangement is now explained.

The electronic imaging system of the invention, that is, a camera comprising an electronic image pickup device on the image side of the zoom lens, is preferably operable to process image data obtained by picking up an image at the electronic image pickup device wherein the image has been formed through the zoom lens, and produce the ensuing image data having changed in shape for the purpose of correcting image distortion due to distortion. In this case, it is preferable to has determined the level of distortion acceptable as the zoom lens. In other words, it is preferable to satisfy condition (41) upon focusing on any object distance that is at least 50 times as long as $f_W$.

An image distorted in barrel form is photo-electrically converted at the image pickup device into image data. The image data are then subjected to processing corresponding to an electrical shape change at a signal processing system in the electronic image pickup device. By such processing, the ensuing image data are finally produced out of the electronic image pickup device. The image data, when reproduced through any display device, are already corrected for distortion. In other words, there is obtained an image substantially similar to the shape of the subject.

When an image taken of an object at infinity is free of distortion, there is:

$$f=y^*/\tan \omega=y/\tan \omega$$

where y* is the height of an image point from the optical axis, y is the height of an ideal image point (that is obtained when there is no distortion in an optical system) from the optical axis, f is the focal length of an image-formation system, and ω is the angle with respect to the optical axis of the direction of an object point corresponding to an image point of connecting the center on the image pickup plane with the position of y*.

When there is barrel distortion in the image-formation system, there is:

$$f>y^*/\tan \omega$$

It follows that if f and y remain constant, ω will then have a large value.

Condition (41) is provided to define the degree of barrel distortion at the wide-angle end of the zoom lens. Exceeding the upper limit of 0.96 will make size and thickness reductions difficult. As the lower limit of 0.7 is not reached, it causes the enlargement factor of the peripheral portion of an image in the radial direction to become too high, when image distortion due to distortion at the optical system is corrected by image processing. This will result in noticeable deterioration in the sharpness of the peripheral portion of the image.

The greatest aim of the technique of intentionally producing distortion at the optical system to pick up a distorted image at the electronic image pickup device, and thereafter electrically processing that distorted image to correct it for distortion is to reduce the size of the optical system or configure the optical system as a wide-angle arrangement (having a distortion-introduced angle of view of 38° or greater in the vertical direction) More preferably, $$0.75<y_{08}^*/(f_W \tan \omega_{08W})<0.95 \quad (41)'$$

Most preferably, $$0.80<y_{08}^*/(f_W \tan \omega_{08W})<0.94 \quad (41)''$$

The ninth electronic imaging system according to the further aspect of the invention is characterized in that any one of the 1st to the 8th electronic imaging system satisfies the following condition.

$$1.2<y_{10}^*/a<6.0 \quad (42)$$

Here, $y_{10}^*$ is the distance (maximum image height) in mm from the center to the farthest point in the effective image pickup plane (capable of picking up an image) of the electronic image pickup device, and a is the pixel-to-pixel distance in μm in the long-side direction of the electronic image pickup device.

The advantage of, and the requirement for, the above ninth electronic imaging system arrangement is now explained. The image-formation capability of the zoom lens is well compatible with the electronic imaging system that satisfies this condition (42).

The 10th electronic imaging system according to the further aspect of the invention is characterized in that any one of the 1st to the 9th electronic imaging system satisfies the following condition.

$$F_W \geqq 1.1a(\mu m) \quad (43)$$

Here, $F_W$ is the full-aperture F-number of the zoom lens at the wide-angle end, and a is the pixel-to-pixel distance in μm in the long-side direction of the electronic image pickup device.

The advantage of, and the requirement for, the above 10th electronic imaging system arrangement is now explained.

To slim down the zoom lens, it is desirable to avoid use of an optical low-pass filter as much as possible. To this end, it is preferable to satisfy the above condition (43). If this condition is satisfied, aliasing distortion is acceptable without recourse to any optical low-pass filter. This harnesses the fact that as pixel size is smaller than a certain size, there is no component having a frequency greater than Nyquist frequency under the influence of diffraction. When condition (43) is not satisfied, some optical low-pass filter is needed. Therefore, it is preferable to place an aperture stop at a full-aperture state alone, or it is not preferable to stop down the aperture stop. Thus, any stop-down mechanism is dispensed with and, accordingly, size and thickness reductions are achievable.

More preferably, $$F_W \geqq 1.2a(\mu m) \quad (43)'$$

Most preferably, $$F_W \geqq 1.3a(\mu m) \quad (43)''$$

The 11th electronic imaging system according to the further aspect of the invention is characterized in that any one of the 1st to the 10th electronic imaging system satisfies the following condition.

$$0.4<(dy^*/dy)_{y08^*}/(dy^*/dy)_{y00^*}<0.9 \quad (44)$$

Here, in consideration of the relation of the actual image height y* to the ideal image height y, let y10* be the distance (maximum image height) from the center to the farthest point in the effective image pickup plane (capable of picking up an image) of the electronic image pickup device, and let $(dy^*/dy)_{y08^*}$ and $(dy^*/dy)_{y00^*}$ be differential values with respect to the image height $y_{08}^*$ ($=0.8y_{10}^*$) and the center of a screen, respectively.

Referring now to the advantage of, and the requirement for, the above 11th electronic imaging system arrangement, the actual image height y* becomes a function of the ideal image height y. However, at a local y where the differential value dy*/dy is greater than a certain value, a local enlargement factor at the time of correction of distortion becomes too large to obtain any given resolving power at that site.

As the lower limit of 0.4 to condition (44) is not reached, it causes the local enlargement factor at the time of correction of distortion to become too large to obtain any given resolving power at that site. As the upper limit of 0.9 is exceeded, it renders it difficult to attain the objects of the invention.

More preferably, $$0.5<(dy^*/dy)_{y08^*}/(dy^*/dy)_{y00^*}<0.87 \quad (44)'$$

It is most preferable to satisfy at least the following condition (44)".

$$0.55<(dy^*/dy)_{y08^*}/(dy^*/dy)_{y00^*}<0.84 \quad (44)''$$

Note here that the image-formation capability of the above zoom lens is well compatible with the electronic imaging system that satisfies the above condition (42).

The 12th electronic imaging system according to the further aspect of the invention is characterized in that in any one of the 1st to the 11th electronic imaging system, the zoom lens comprises, in order from its object side, a first lens group consisting of a negative 1-1 lens component B1 and a positive 1-2 lens component B12 and having negative refracting power and a second lens group consisting of a positive 2-1 lens component B21 and a negative 2-2 lens component B22 and having positive refracting power, wherein the electronic image pickup device is located near the position of the image-formation position of the zoom lens; during zooming, the second lens group remains immobilized with respect to the casing of the electronic imaging system, the position of the first lens group relative to the second lens group is movable, and the electronic image pickup device is axially movable with respect to the casing of the electronic imaging system; and the zoom lens satisfies the following conditions:

$$-1.2<f_W/r_{22R}<0.9 \quad (45)$$

$$0.17<(D_{12W}-D_{12T})/(f_W\gamma_2)<0.33 \quad (46)$$

where $r_{22R}$ is the axial radius of curvature of the lens surface located in, and nearest to the image side of, the 2-2 lens component, $D_{12W}$ is the axial distance at the wide-angle end of the zoom lens between the vertex of the lens surface located in, and nearest to the image side of, the first lens group and the vertex of the lens surface located in, and nearest to the object side of, the second lens group, $D_{12T}$ is the axial distance at the telephoto end of the zoom lens between the vertex of the lens surface located in, and nearest to the image side of, the first lens group and the vertex of the lens surface located in, and nearest to the object side of, the second lens group, $f_W$ is the focal length of the zoom lens system at the wide-angle end, and $\gamma$ is $f_T/f_W$ where $f_T$ is the focal length of the zoom lens system at the telephoto end. Note here that the "lens component" refers to a single lens, a cemented lens or a composite lens such as one wherein a resin or the like is cured on a lens surface while they are in close contact. In other words, the number of a medium boundary surface is the number of the lens plus 1.

The advantage of, and the requirement for, the above 12th electronic imaging system arrangement is now explained.

As the upper limit of 0.9 to condition (45) is exceeded, the thickness of the zoom lens upon received at a collapsible lens mount, that is, the thickness defined by the distance between the lens surface nearest to the object side and the lens surface nearest to the image side, becomes small on the optical axis but becomes large at the peripheral portion of the zoom lens, winding up a failure in slimming down the zoom lens upon received at the lens mount. For correction of aberrations, the lens surface of the 2-2 lens component B22 nearest to its image side is preferably configured in such an aspheric shape that its central portion near the optical axis is in a convex form on its image side so as to implement correction of astigmatism and its peripheral portion is in a concave form on its image side so as to implement correction of spherical aberrations and coma. A problem with this case is, however, that the decentration sensitivity of that lens surface relative to the lens surface of the 2-2 lens component B22 nearest to the object side is susceptible to become high. Therefore, it is preferable that astigmatism is corrected at the first lens group in such a way as to satisfy at least the lower limit of −1.2 to condition (45).

Exceeding the upper limit of 0.33 to condition (46) may work for correction of aberrations; however, it causes off-axis light rays through the first lens group to gain height at the wide-angle end. This in turn renders the diameter of the first lens group likely to become large, and makes each lens component thick contrary to the objects of the invention. Falling short of the lower limit of 0.17 may work for thickness reductions; however, it requires for both the first and second lens groups to have increased refracting power, which combines with fewer lenses, posing problems such as difficulty in correction of each aberration and an increased sensitivity to decentration.

More preferably, $$-1.1<f_W/r_{22R}<0.7 \quad (45)'$$

$$0.19<(D_{12W}-D_{12T})/(f_W\gamma^2)<0.30 \quad (46)'$$

Most preferably, $$-1<f_W/r_{22R}<0.5 \quad (45)''$$

$$0.21<(D_{12W}-D_{12T})/(f_W\gamma^2)<0.27 \quad (46)''$$

The $13^{th}$ electronic imaging system according to the further aspect of the invention is characterized in that any one of the $1^{st}$ to $12^{th}$ electronic imaging system satisfies the following condition:

$$1.0<\Sigma D_T/f_W<2.2 \quad (47)$$

where $\Sigma D_T$ is the distance at the telephoto end from the vertex of the lens surface nearest to the object side to the vertex of the lens surface nearest to the image side.

The advantage of, and the requirement for, the above $13^{th}$ electronic imaging system arrangement is now explained.

It is more preferable that the above conditions (45) and (46) are satisfied with the result that the above condition (47) is satisfied.

When the upper limit of 2.2 to condition (47) is exceeded, the thickness of the zoom lens upon received at the lens mount is still insufficient. As the lower limit of 1.0 is not reached, it renders the formation of a lens component having given refracting power difficult.

More preferably, $$1.2<\Sigma D_T/f_W<2.0 \quad (47)'$$

Most preferably, $$1.4<\Sigma D_T/f_W<1.8 \quad (48)''$$

The $14^{th}$ electronic imaging system according to the further aspect of the invention is characterized in that the $12^{th}$ or $13^{th}$ electronic imaging system satisfies the following condition:

$$0.1<f_W/f_{22}|<1 \quad (48)$$

where $f_{22}$ is the composite focal length of the 2-2 lens component.

Referring now to the advantage of, and the requirement for, the above $14^{th}$ electronic imaging system arrangement, the satisfaction of condition (48) makes it easy to satisfy the above conditions (45), (46) and (47). Especially if the satisfaction of condition (46) is taken into account, it is then preferable to allow the second lens group to have some or larger refracting power. In other words, it is preferable that the composite focal length of the 2-2 lens component acting to cancel out the refracting power of the second lens group is short.

As the upper limit of 1 to condition (48) is exceeded, it causes the refracting power of the second lens group to become weak, or poses problems such as degradation of aberrations and sensitivity to decentration, because the refracting power sharing of the 2-1 lens component increases. As the lower limit of 0.1 is not reached, it often results in undercorrection of each aberration (especially longitudinal chromatic aberration).

More preferably, $$0.2<f_W/f_{22}|<0.8 \quad (48)'$$

Most preferably, $$0.3<f_W/f_{22}|<0.6 \quad (48)''$$

The $15^{th}$ electronic imaging system according to the further aspect of the invention is characterized in that any one of the $12^{th}$ to the $14^{th}$ electronic imaging system satisfies the following condition:

$$35<\nu_{21}-\nu_{22}<95 \quad (49)$$

where $\nu_{21}$ is the Abbe constant of the 2-1 lens component, and $\nu_{22}$ is the Abbe constant of the 2-2 lens component, each on a d-line basis.

Referring now to the advantage of, and the requirement for, the above 15 electronic imaging system arrangement, exceeding the upper limit of 95 to condition (49) poses no problem in conjunction with aberrations, but there are no such optical media. Being short of the lower limit of 35 will render longitudinal chromatic aberration likely to become worse.

More preferably, $$40<\nu_{21}-\nu_{22}<85 \quad (49)$$

Most preferably, $$45<\nu_{21}-\nu_{22}<80 \quad (49)''$$

The $16^{th}$ electronic imaging system according to the further aspect of the invention is characterized in that any one of the $12^{th}$ to the $15^{th}$ electronic imaging system satisfies the following condition:

$$-0.7<f_W/r_{11F}<0.2 \quad (50)$$

where $r_{11F}$ is the axial radius of curvature of the lens surface located in, and nearest to the object side of, the 1-1 lens component.

The $17^{th}$ electronic imaging system according to the further aspect of the invention is characterized in that any one of the $12^{th}$ to the $16^{th}$ electronic imaging system satisfies the following condition:

$$0.6<t_1/t_2<1.4 \quad (51)$$

where $t_1$ is the axial distance of the first lens group from the surface nearest to the object side to the surface nearest to the image side, $t_2$ is the axial distance of the second lens group from the surface nearest to the object side to the surface nearest to the image side.

The $18^{th}$ electronic imaging system according to the further aspect of the invention is characterized in that any one of the $12^{th}$ to the $17^{th}$ electronic imaging system satisfies the following condition:

$$0.1<d_{11}/f_W<0.5 \quad (52)$$

where $d_{11}$ is the axial air separation between the negative 1-1 lens component and the positive 1-2 lens component in the first lens group.

The $19^{th}$ electronic imaging system according to the further aspect of the invention is characterized in that any one of the $12^{th}$ to the $18^{th}$ electronic imaging system satisfies the following condition:

$$0.5<R_{11R}/R_{12F}<1 \quad (53)$$

where $R_{11R}$ is the axial radius of curvature of the surface located in, and nearest to the image side of, the negative 1-1 lens component in the first lens group, and $R_{12F}$ is the axial radius of curvature of the surface located in, and nearest to the object side of, the positive 1-2 lens component in the first lens group.

The advantages of, and the requirements for, the above $16^{th}$ to the $19^{th}$ electronic imaging system are now explained.

The above conditions (50), (51), (52) and (53), too, are favorable for reducing the thickness of the zoom lens upon received at a collapsible lens mount, and it is preferable that any one of them has been satisfied.

As the lower limit of −0.7 to condition (50) is not reached, the thickness of the zoom lens upon received at the lens mount, that is, the thickness defined by the distance between the lens surface nearest to the object side and the lens surface nearest to the image side, becomes small on the optical axis but becomes large at the peripheral portion of the zoom lens, winding up a failure in slimming down the zoom lens upon received at the lens mount. As the upper limit of 0.2 is exceeded, it renders correction of astigmatism difficult.

As the upper limit of 1.4 to condition (51) is exceeded, the sensitivity to relative decentration is likely to increase when each lens surface in the second lens group is formed of an aspheric surface. When the lower limit of 0.6 is not reached, astigmatism is likely to become worse.

As the axial air separation $d_{11}$ between the negative 1-1 lens component and the positive 1-2 lens component in the first lens group is decreased for the purpose of thickness reductions, it causes the optimum principal point positions of the first lens group to shift toward the image side. An effort to get this shift back causes the curvature of the surface of the negative lens component nearest to the object side to move in the negative direction, causing barrel distortion or astigmatism to become worse. Here, if the distortion is intentionally produced, it can then be corrected by image processing. However, as $d_{11}$ is less than the lower limit of 0.1 to condition (52), distortion becomes too large at the time of correction of astigmatism. In this case, it is difficult to get hold of the resolution of the peripheral portion of a screen even with correction of such large distortion by image processing. Exceeding the upper limit of 0.5 to condition (52) will make it difficult to reduce the thickness of the whole lens system, as is the case with the prior art.

Alternatively, if distortion is acceptable, it is then easy to decrease $d_{11}$ by allowing the negative lens component and the positive lens component in the first lens group of the zoom lens to satisfy condition (53). As the upper limit of 1 to condition (53) is exceeded, it causes distortion to become too large at the time of correction of astigmatism. In this case, it is difficult to get hold of the resolution of the peripheral portion of a screen even with correction of such large distortion by image processing. Being shy of the lower limit of 0.5 will make it difficult to reduce the thickness of the whole lens system, as is the case with the prior art.

Regarding conditions (50), (51), (52) and (53), it is more preferable to satisfy the following narrower conditions:

$$-0.5<f_W/r_{11F}<0.15 \quad (50)'$$

$$0.7<t_1/t_2<1.3 \quad (51)'$$

$$0.15<d_{11}/f_W<0.4 \quad (52)'$$

$$0.55<R_{11R}/R_{12F}<0.95 \quad (53)'$$

Regarding conditions (50), (51), (52) and (53), it is most preferable to satisfy the following much narrower conditions:

$$-0.3<f_W/r_{11F}<0.1 \quad (50)''$$

$$0.8<t_1/t_2<1.2 \quad (51)''$$

$$0.2<d_{11}/f_W<0.3 \quad (52)''$$

$$0.6<R_{11R}/R_{12F}<0.9 \quad (53)''$$

The $20^{th}$ electronic imaging system according to the further aspect of the invention is characterized by comprising a zoom lens system for forming the image of a subject and a photoelectric converter device located on an image side of the zoom lens system and operable to convert an image formed by the zoom lens into electric signals, wherein:

the zoom lens system comprises a fixed lens group that has a finite focal length and includes a reflecting surface fixed to an imaging system body during zooming and at least one movable lens group that is located on an entrance or exit side of the fixed lens group and has a finite focal length, wherein a relative position of the movable lens group to the fixed lens group is varied to implement zooming, and the photoelectric converter device is varied in a relative position to the fixed lens group in association with movement of an image position by zooming of the zoom lens group.

The advantage of, and the requirement for, the above $20^{th}$ electronic imaging system arrangement is now explained.

As the lens group having a reflecting surface is fixed to the body (casing) of the electronic imaging system, it allows zooming to be implemented without moving the lens group likely to increase in volume. This makes it possible to save power for zooming and simplify mechanical arrangements for zooming.

As the photoelectric converter device (electronic image pickup device) is relatively movable with respect to the fixed lens group, it allows the fixed lens group to move with respect to an image plane. This works for cutting back on the number of lens groups for setting up the zoom lens system, because the fixed lens group can be handled as a group movable with respect to the image plane. It is also possible to increase the amount of movement of the movable lens group in front of, or in the rear of, the fixed lens group with respect to the image plane although depending on how to move it; this works for getting hold of zoom ratios.

The $21^{st}$ electronic imaging system according to the further aspect of the invention is characterized in that in the $20^{th}$ electronic imaging system, only one movable lens group is located on the entrance side of the fixed lens group having a reflecting surface, and said movable lens group is movable to a position where it is housed in a lens barrel.

The advantage of, and the requirement for, the above $21^{st}$ electronic imaging system arrangement is now explained. As compared with an arrangement comprising a plurality of movable lens groups located on the entrance side of the fixed lens group, this arrangement is smaller in the amount of putting out the lenses during taking operation and shorter in the length from the fixed lens group to the photoelectric converter device, and so it can be set up with less restrictions on its height or width direction.

The $22^{nd}$ electronic imaging system according to the further aspect of the invention is characterized in that in the $20^{th}$ or the $21^{st}$ electronic imaging system, the fixed lens group comprises only one reflecting surface.

The advantage of, and the requirement for, the above $22^{nd}$ electronic imaging system arrangement is now explained. This arrangement can be smaller in the volume of the fixed lens group than an arrangement comprising a plurality of reflecting surfaces in the fixed lens group.

The $23^{rd}$ electronic imaging system according to the further aspect of the invention is characterized in that in any one of the $20^{th}$ to the $22^{nd}$ electronic imaging system, at least one lens group in the movable lens groups comprises a lens component of positive refracting power and a lens component of negative refracting power.

Referring now to the advantage of, and the requirement for, the above $23^{rd}$ electronic imaging system arrangement, this arrangement works for correction of aberrations in the movable lens group.

The $24^{th}$ electronic imaging system according to the further aspect of the invention is characterized in that in any one of the $20^{th}$ to the $23^{rd}$ electronic imaging system, at least one lens group in the fixed lens groups comprises a lens component of positive refracting power and a lens component of negative refracting power.

Referring now to the advantage of, and the requirement for, the above $24^{th}$ electronic imaging system arrangement, this arrangement works for correction of aberrations in the fixed lens group.

The $25^{th}$ electronic imaging system according to the further aspect of the invention is characterized in that in any one of the $20^{th}$ to the $24^{th}$ electronic imaging system, the zoom lens system comprises only one movable lens group.

The advantage of, and the requirement for, the above $25^{th}$ electronic imaging system arrangement is now explained. With this arrangement wherein the zoom lens system comprises only one movable lens group, it is possible to simplify a lens drive mechanism.

In accordance with the further aspect of the invention, it is possible to obtain an electronic imaging system that is much more slimmed down in the depth direction upon the lenses received at a lens mount, even with a zoom lens in which the total number of lens components is reduced as much as possible and which ensures much more enhanced stable image-formation capability all over the zoom range. It is also possible to obtain an electronic imaging system that can cut back on the number of lenses and does not work against having high zoom ratios, even with a fixed lens having a reflecting surface for reflecting the path of light.

Next, the zoom lens used with the inventive electronic imaging system is explained with reference to Examples 1–6. FIGS. 1–6 are illustrative in lens arrangement section of Examples 1–6 at the wide-angle end (a), in the intermediate setting (b) and (c) at the telephoto end (c), respectively, upon focusing on an infinite object point. Throughout the drawings, the first lens group is indicated by G1, an aperture stop by S, the second lens group by G2, a plane-parallel plate that forms a low-pass filter with an IR cut coating applied to it, etc. by L, a cover glass plane-parallel plate for an electronic image pickup device by G, and an image plane by I. Note here that the cover glass G may have a wavelength range limiting multilayer film applied onto its surface, and that the cover glass G may have a low-pass filter function.

EXAMPLE 1

Figure 1B:
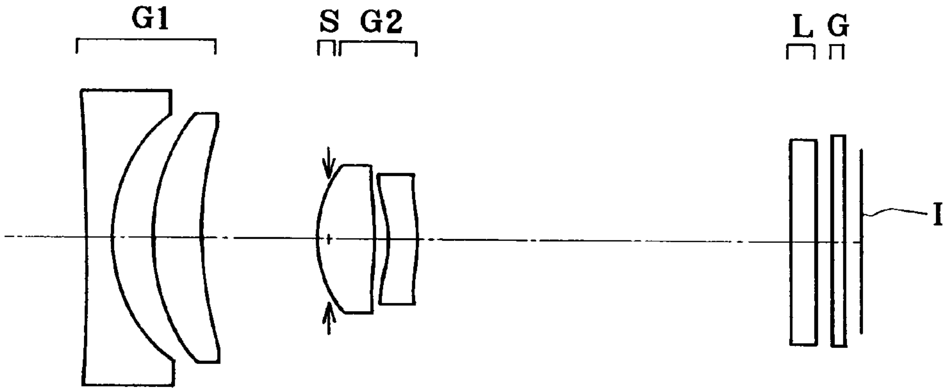
Figure 1C:
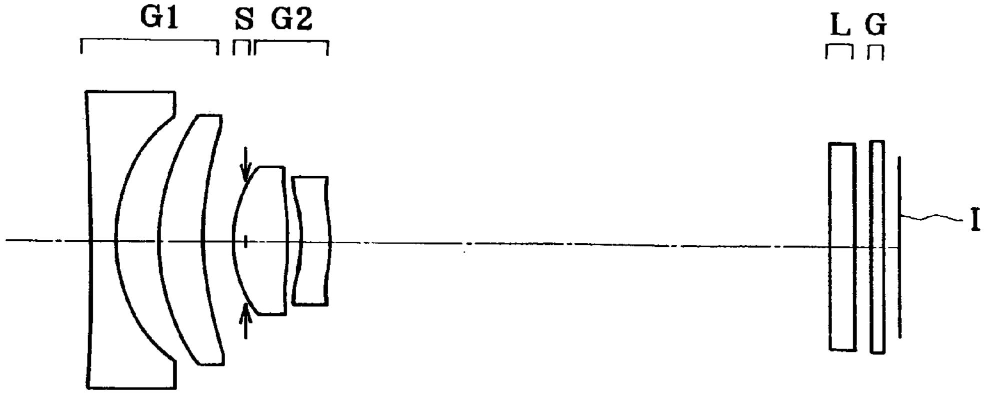

As shown in FIG. 1, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a double-concave negative lens and a positive meniscus lens convex on its object side, and the second lens group G2 consists of a double-convex positive lens and a negative meniscus lens convex on its image side.

Aspheric surfaces are applied to all eight lens surfaces.

EXAMPLE 2

Figure 2A:
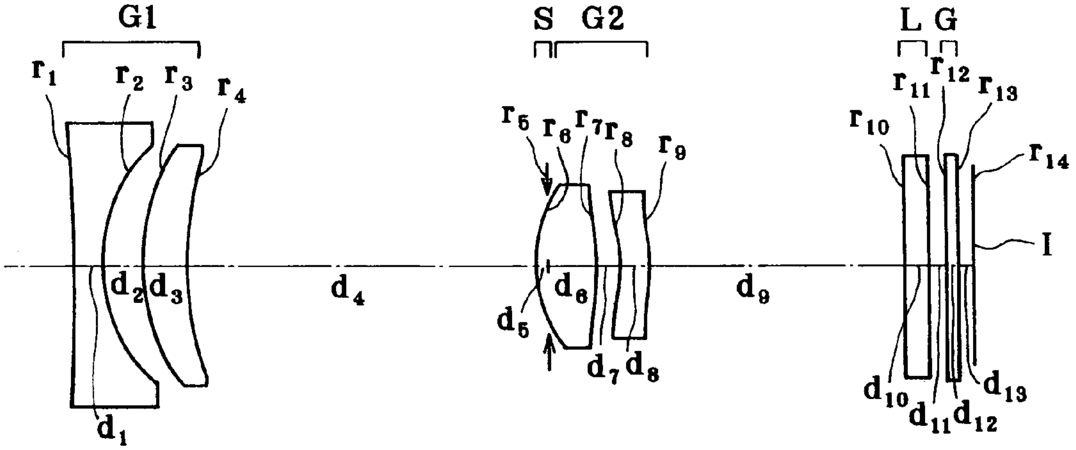
FIG. 2 is illustrative, as in FIG. 1, of Example 2 of the zoom lens.
Figure 2B:
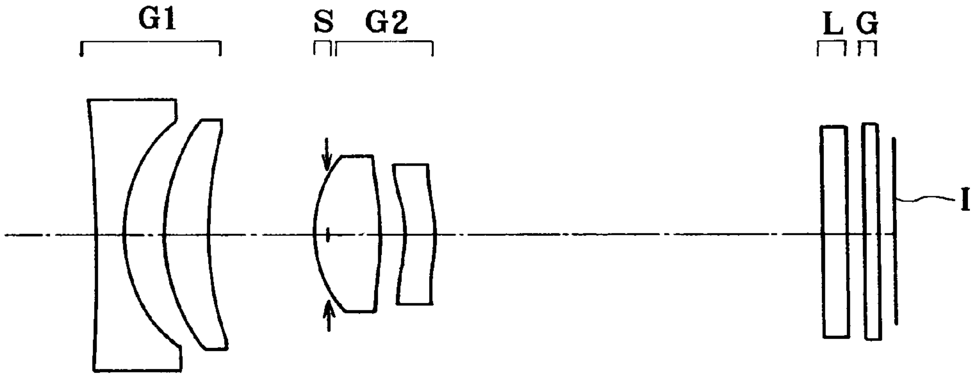
Figure 2C:
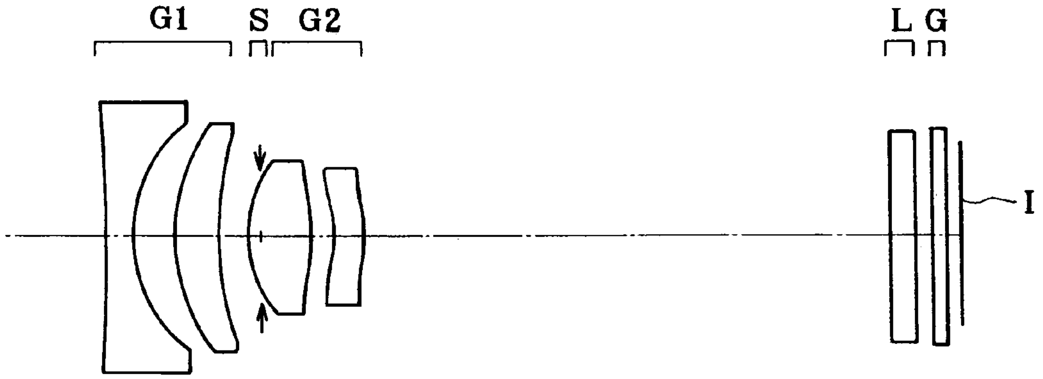

As shown in FIG. 2, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a double-concave negative lens and a positive meniscus lens convex on its object side, and the second lens group G2 consists of a double-convex positive lens and a negative meniscus lens convex on its image side.

Aspheric surfaces are applied to all eight lens surfaces.

EXAMPLE 3

Figure 3A:
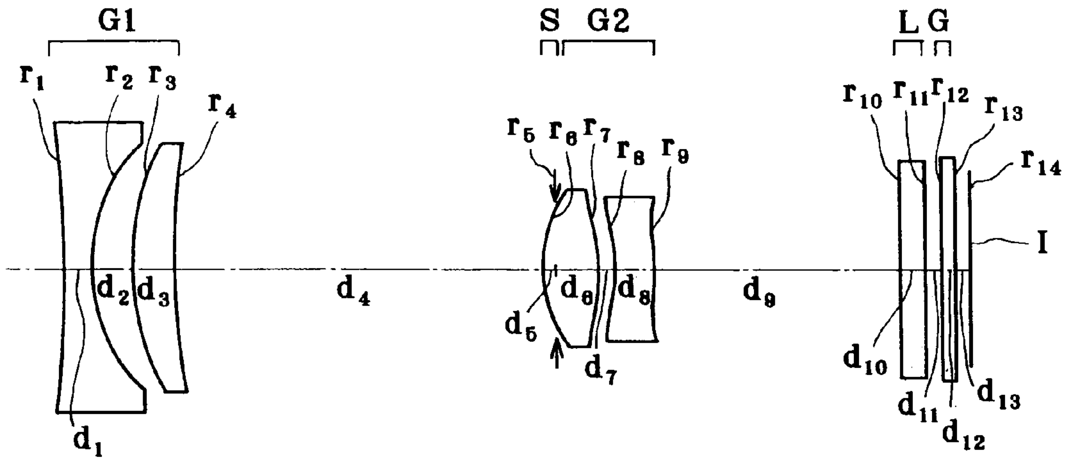
FIG. 3 is illustrative, as in FIG. 1, of Example 3 of the zoom lens.
Figure 3B:
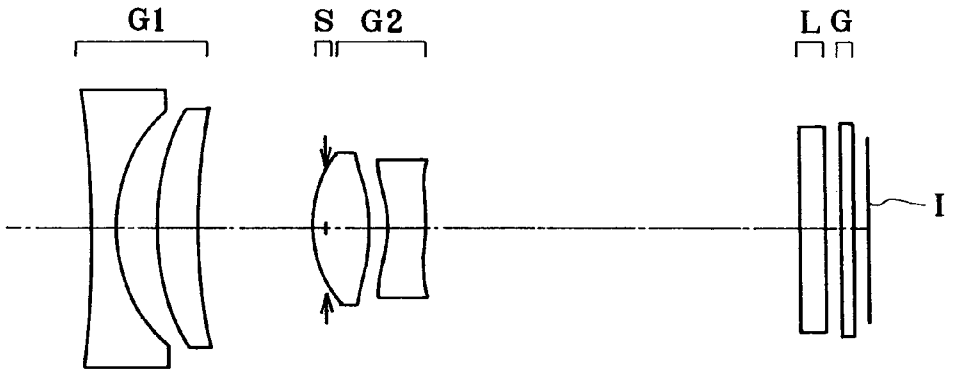
Figure 3C:
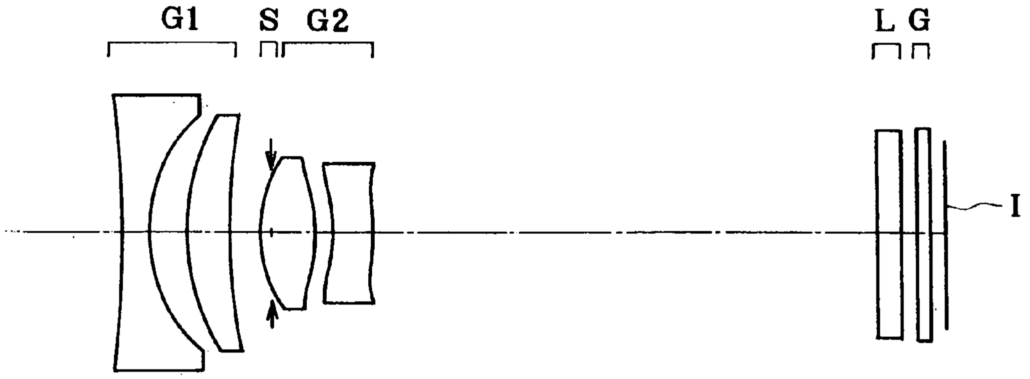

As shown in FIG. 3, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a double-concave negative lens and a positive meniscus lens convex on its object side, and the second lens group G2 consists of a double-convex positive lens and a negative meniscus lens convex on its image side.

Aspheric surfaces are applied to all eight lens surfaces.

EXAMPLE 4

Figure 4A:
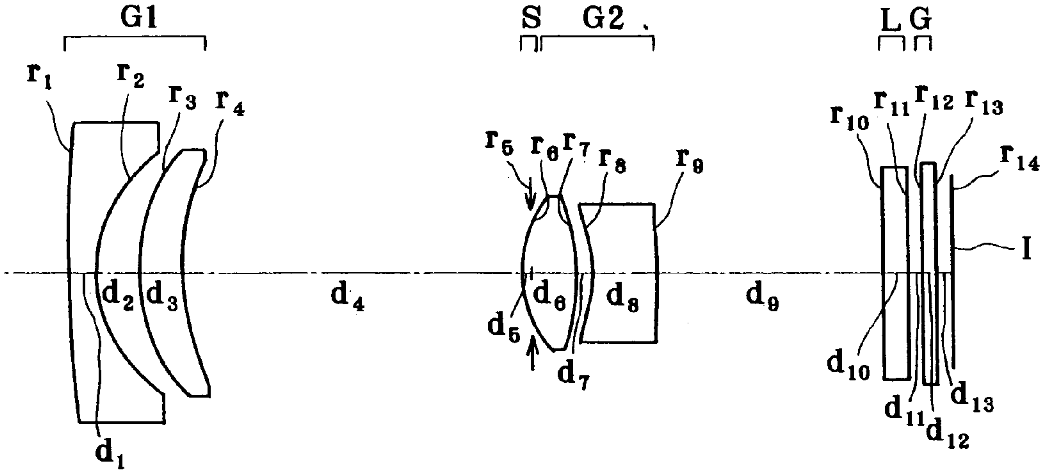
FIG. 4 is illustrative, as in FIG. 1, of Example 4 of the zoom lens.
Figure 4B:
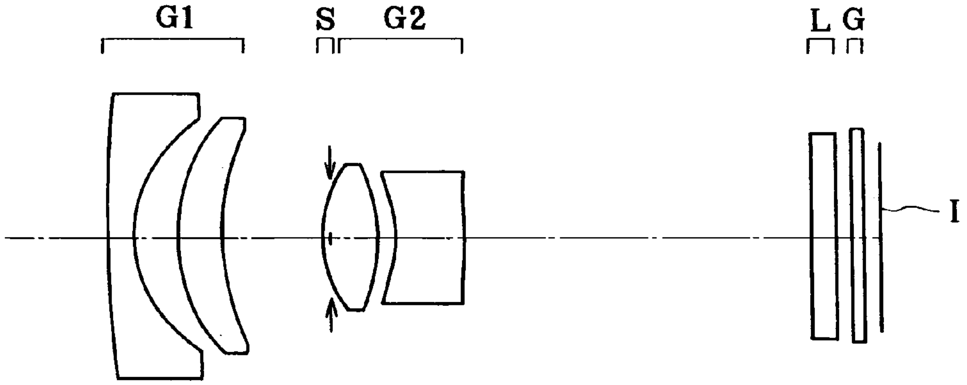
Figure 4C:
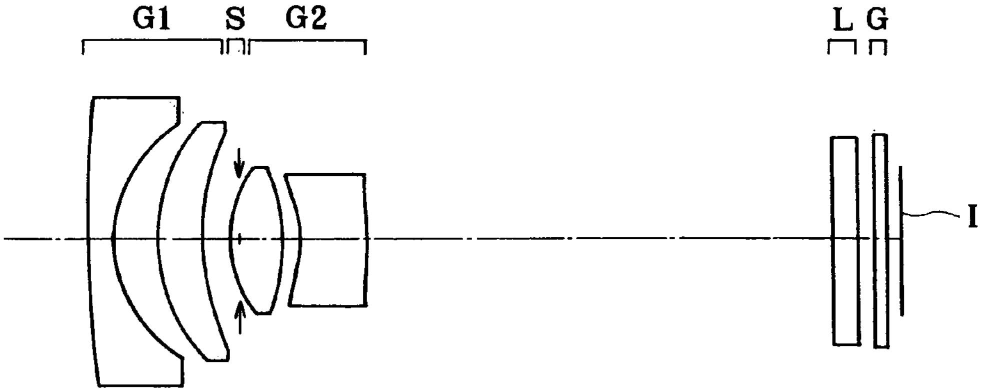

As shown in FIG. 4, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a negative meniscus lens convex on its object side and a positive meniscus lens convex on its object side, and the second lens group G2 consists of a double-convex positive lens and a negative meniscus lens convex on its image side.

Five aspheric surfaces are used: one at the image-side surface of the negative meniscus lens in the first lens group G1 and four at all the surfaces in the second lens group G2.

EXAMPLE 5

Figure 5A:
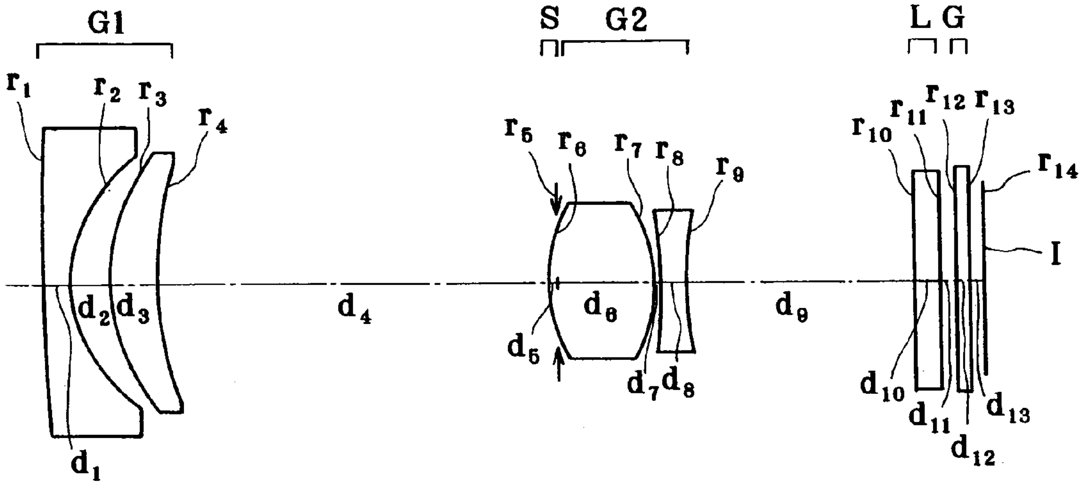
FIG. 5 is illustrative, as in FIG. 1, of Example 5 of the zoom lens.
Figure 5B:
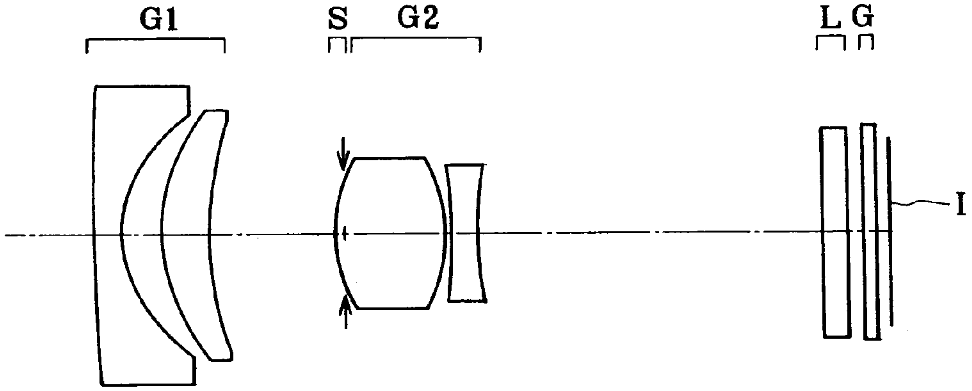
Figure 5C:
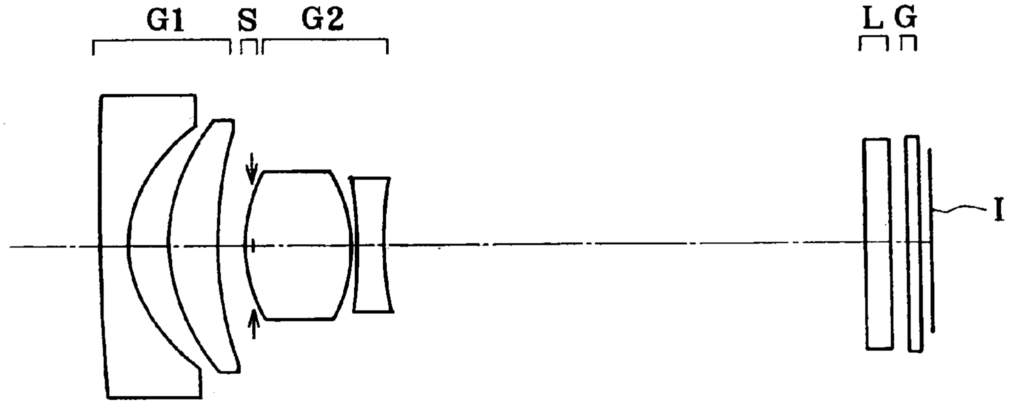

As shown in FIG. 5, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a negative meniscus lens convex on its object side and a positive meniscus lens convex on its object side, and the second lens group G2 consists of a double-convex positive lens and a double-concave negative lens.

Five aspheric surfaces are used: one at the image-side surface of the negative meniscus lens in the first lens group G1 and four at all the surfaces in the second lens group G2.

EXAMPLE 6

Figure 6A:
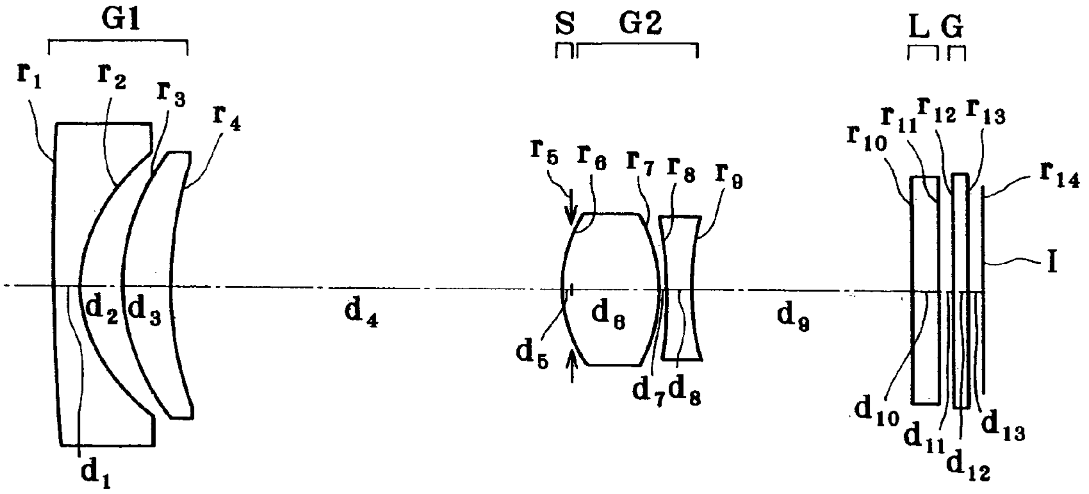
FIG. 6 is illustrative, as in FIG. 1, of Example 6 of the zoom lens.
Figure 6B:
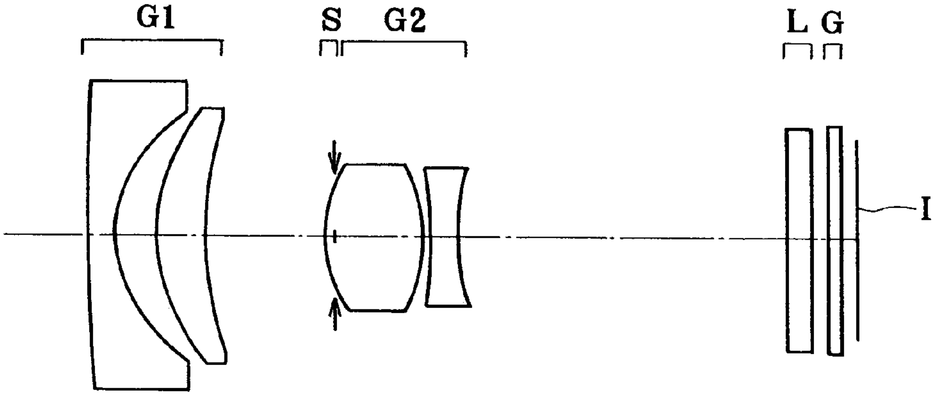
Figure 6C:
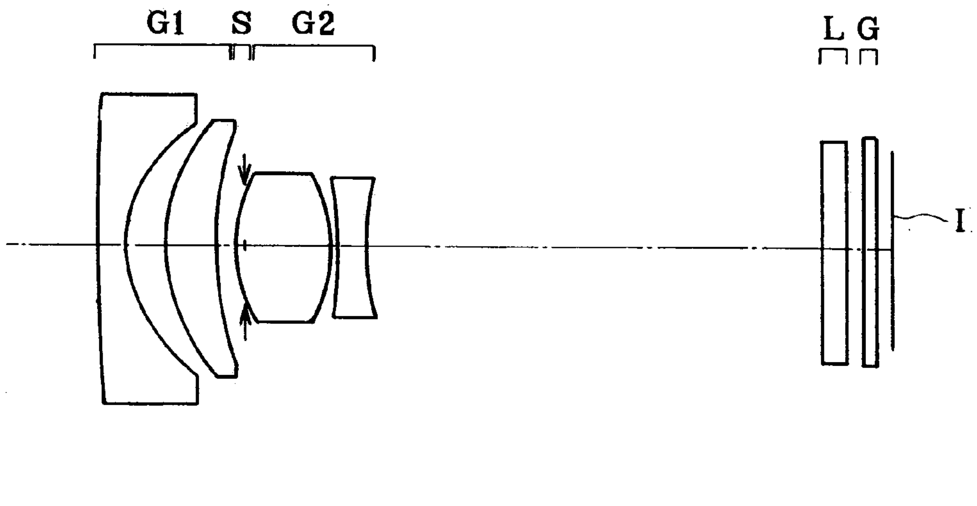
Figure 7A:
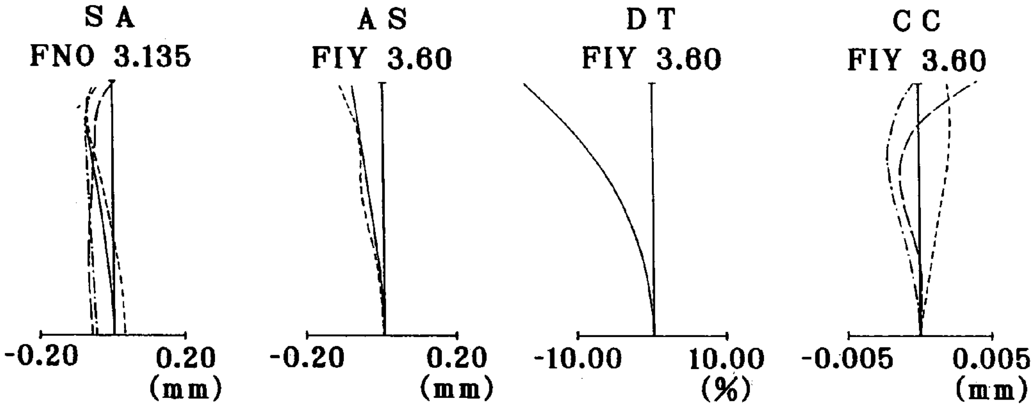
FIG. 7 is a collection of aberration diagrams for Example 1 upon focusing on an infinite object point.
Figure 7B:
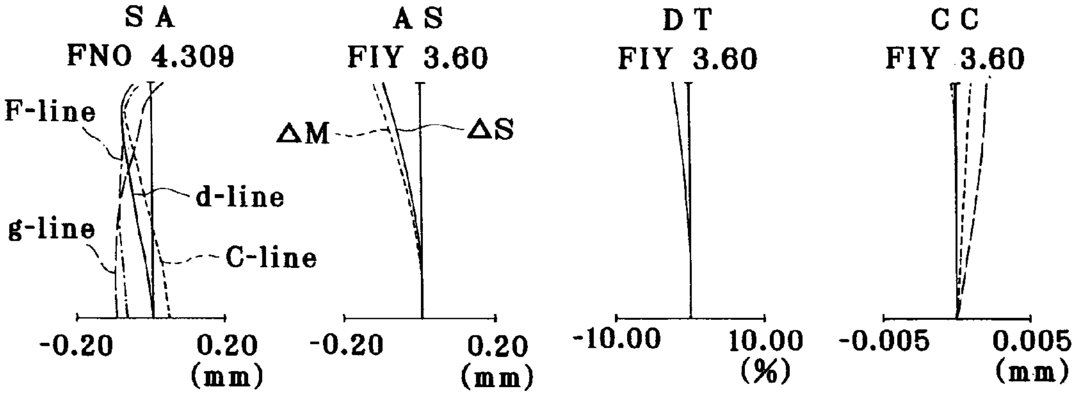
Figure 7C:
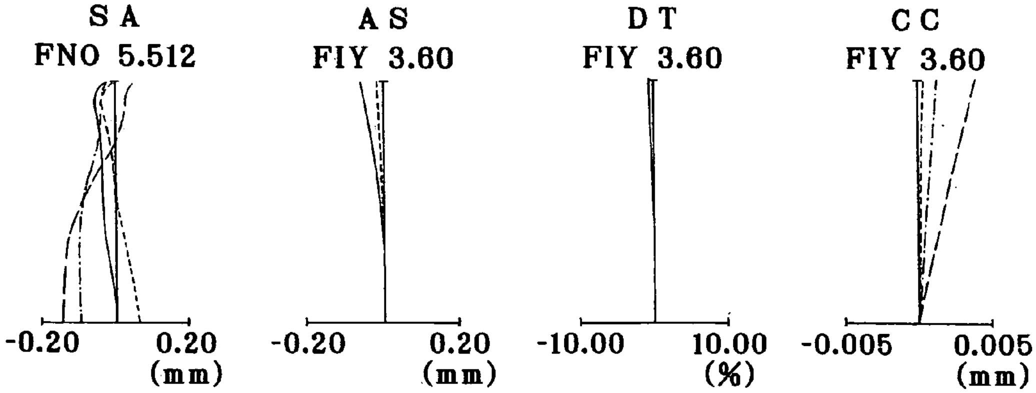
Figure 8A:
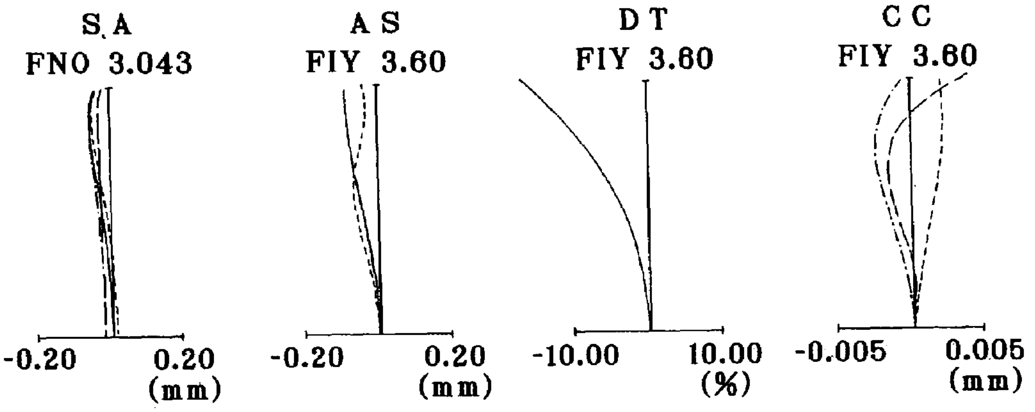
FIG. 8 is a collection of aberration diagrams for Example 2 upon focusing on an infinite object point.
Figure 8B:
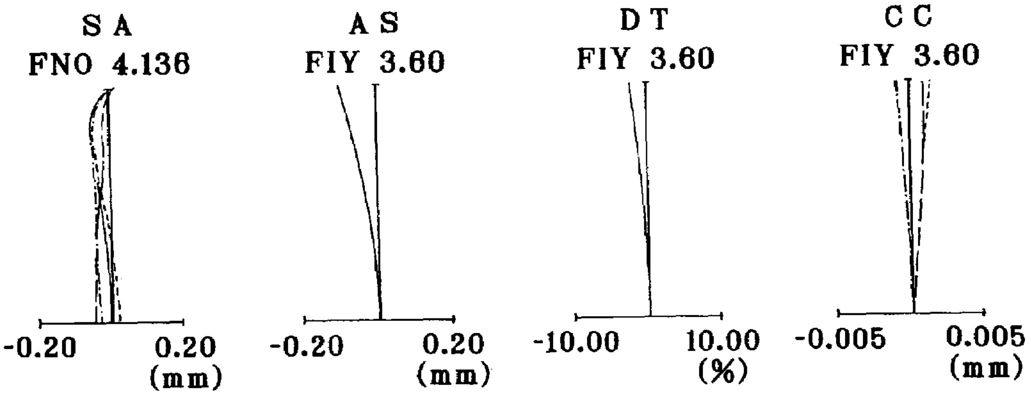
Figure 8C:
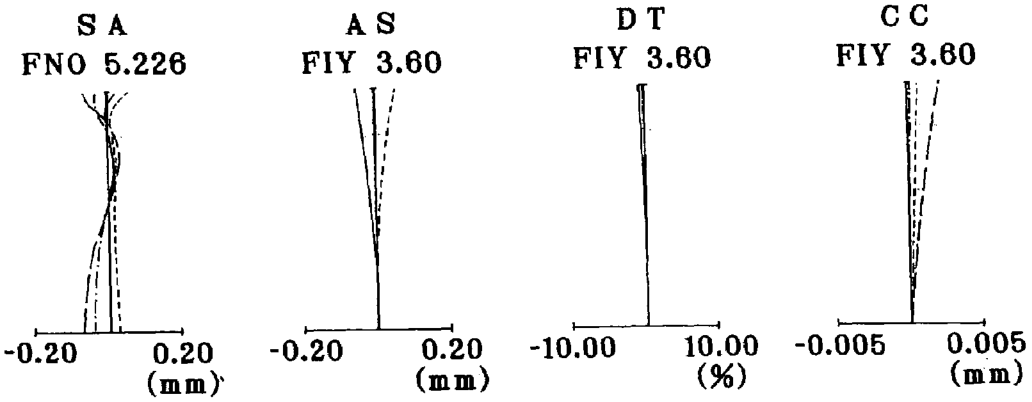
Figure 9A:
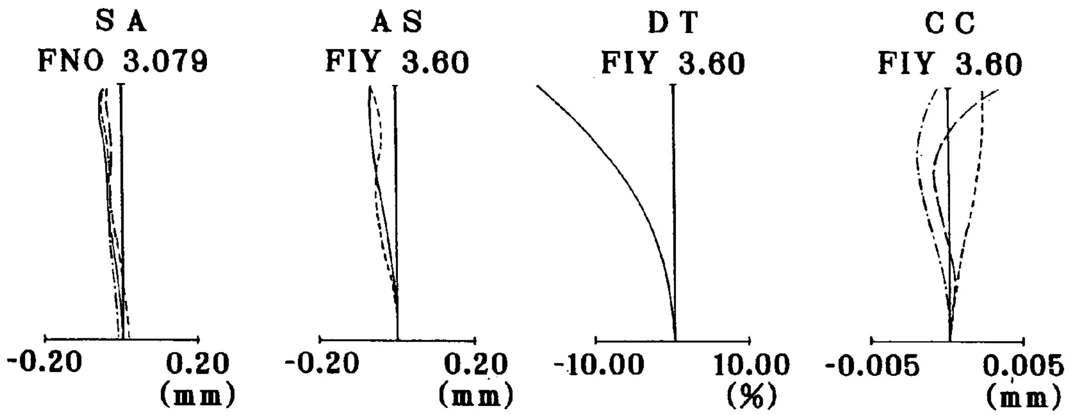
FIG. 9 is a collection of aberration diagrams for Example 3 upon focusing on an infinite object point.
Figure 9B:
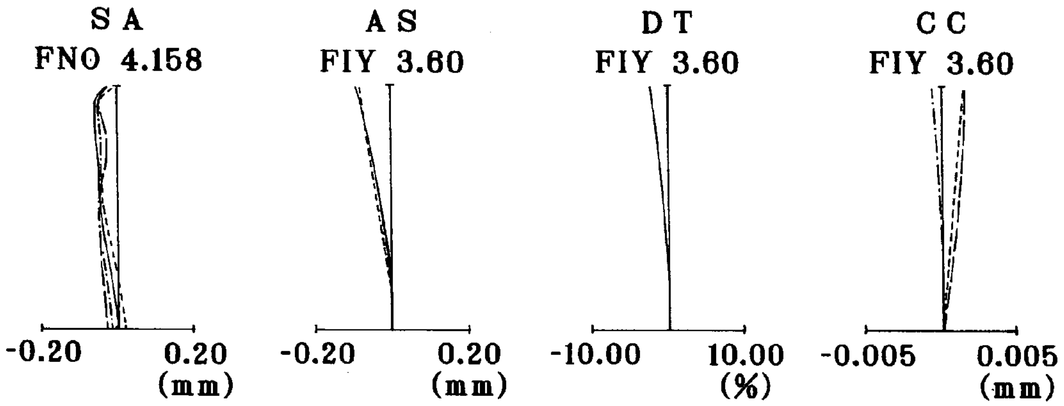
Figure 9C:
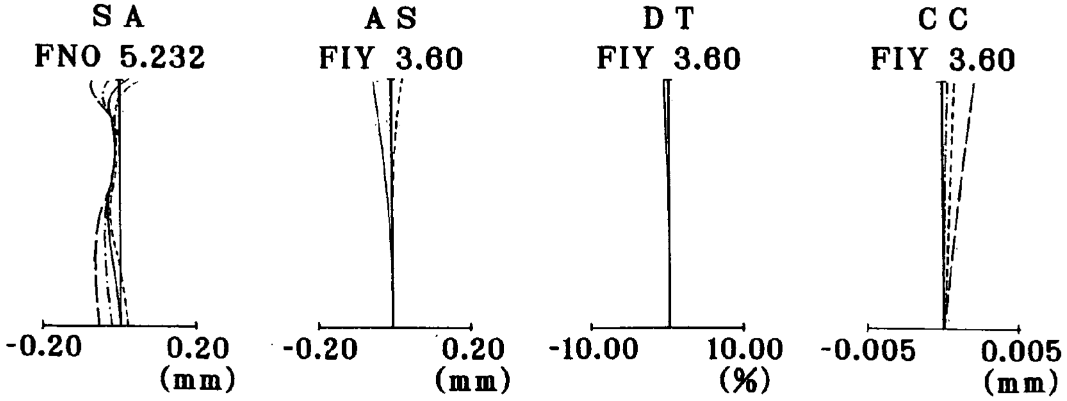
Figure 10A:
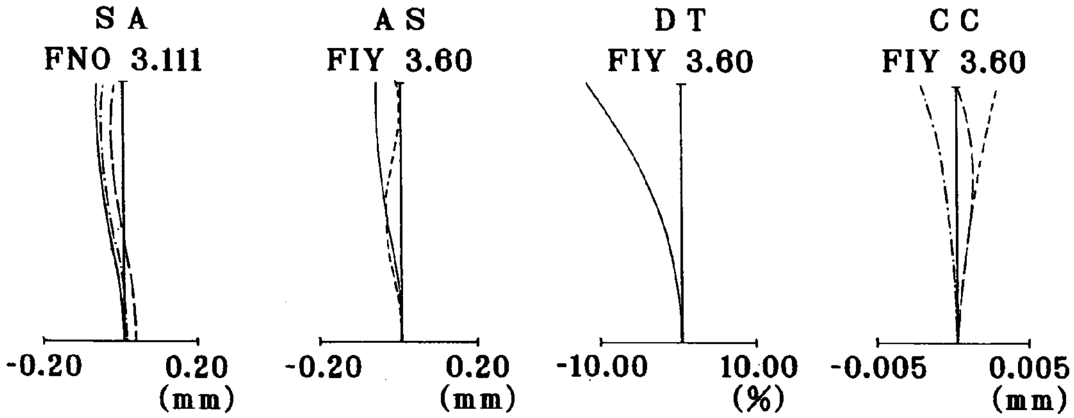
FIG. 10 is a collection of aberration diagrams for Example 4 upon focusing on an infinite object point.
Figure 10B:
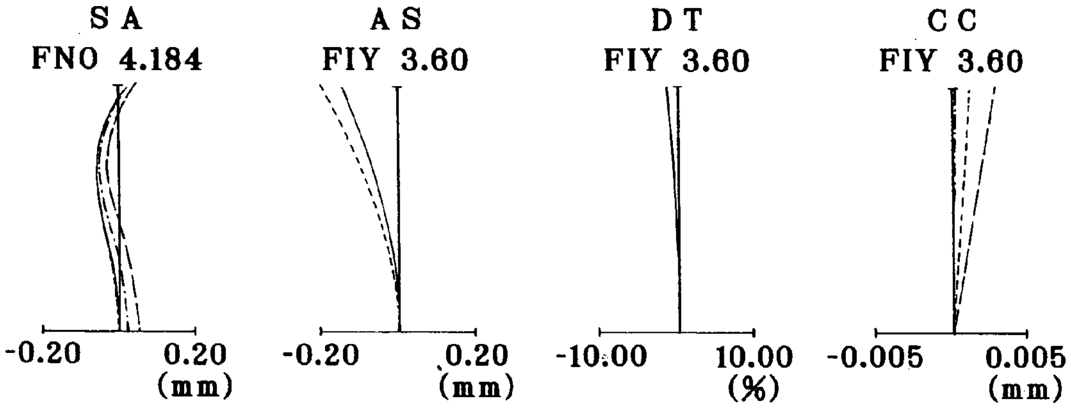
Figure 10C:
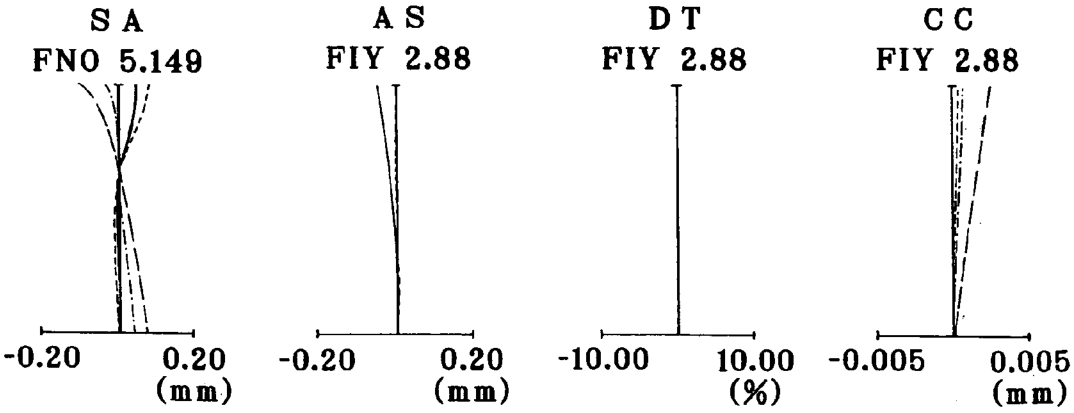
Figure 11A:
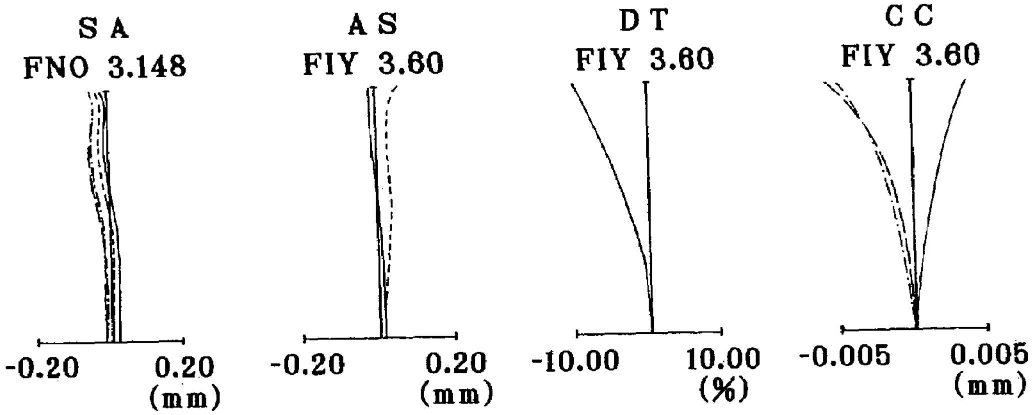
FIG. 11 is a collection of aberration diagrams for Example 5 upon focusing on an infinite object point.
Figure 11B:
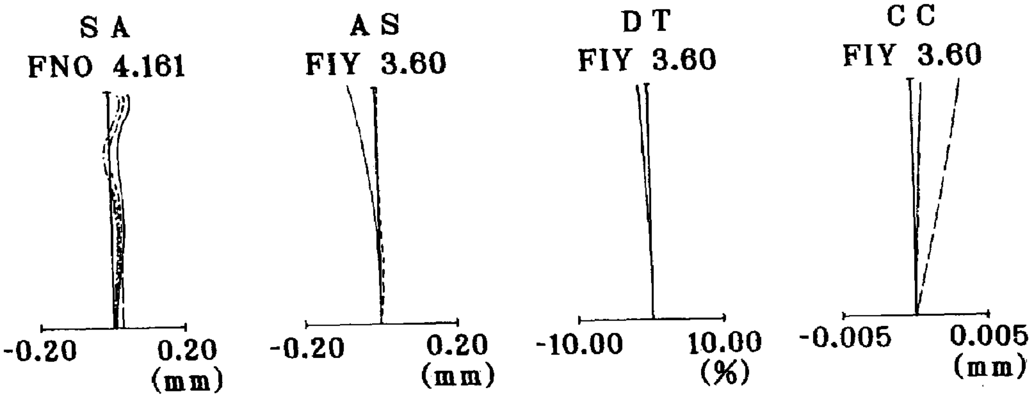
Figure 11C:
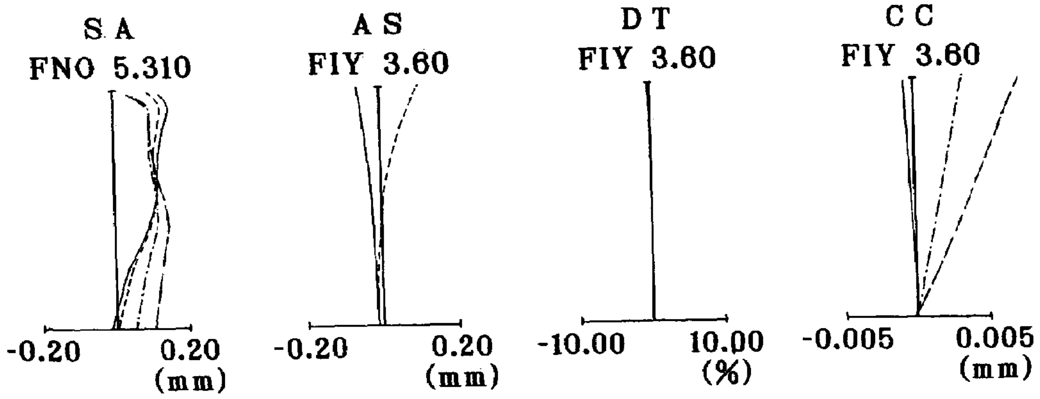
Figure 12A:
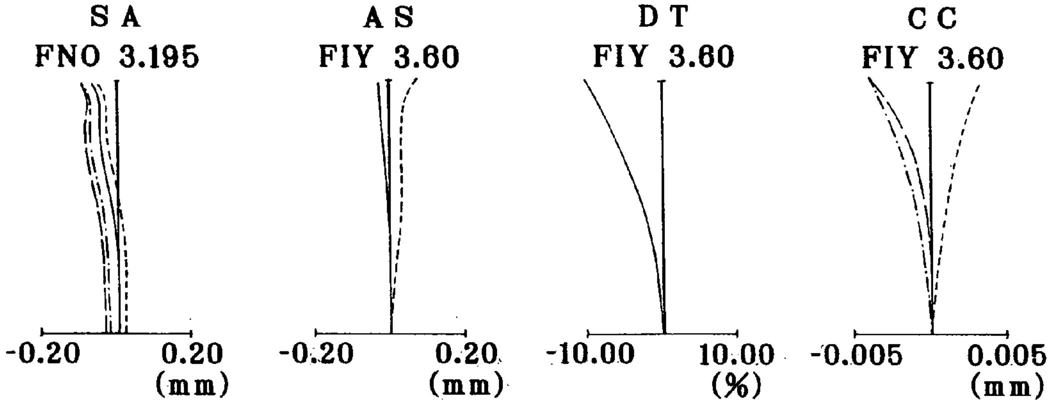
FIG. 12 is a collection of aberration diagrams for Example 6 upon focusing on an infinite object point.
Figure 12B:
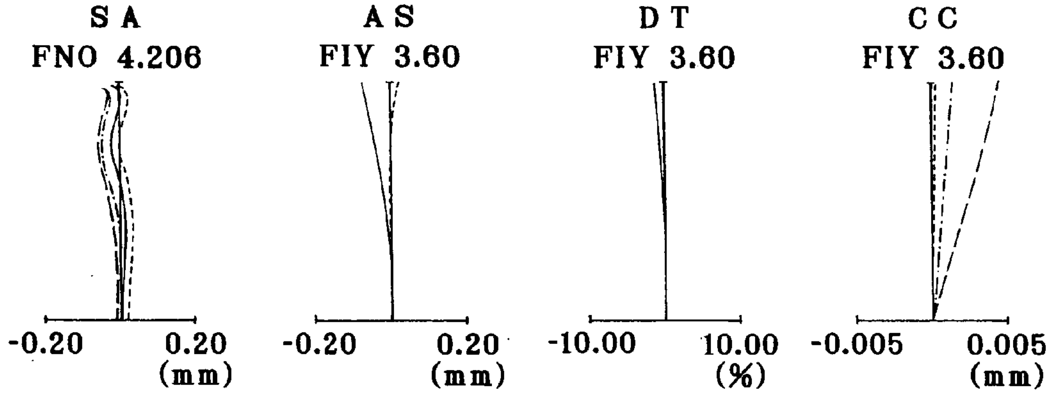
Figure 12C:
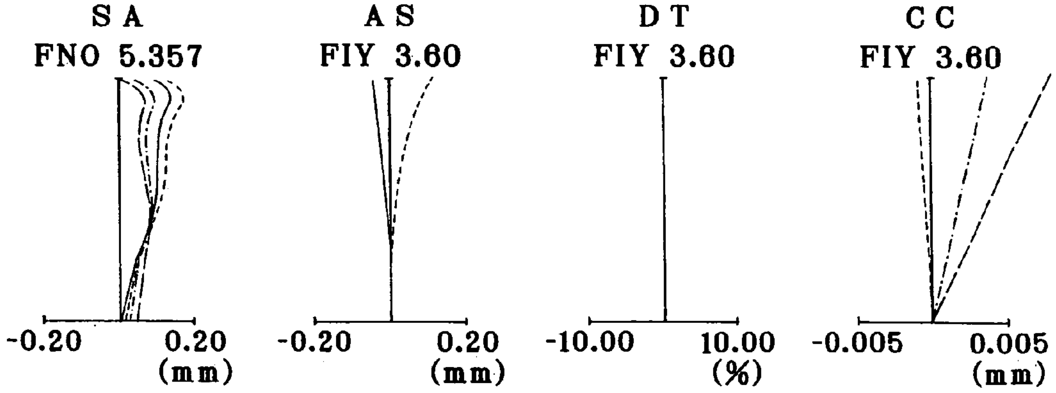

As shown in FIG. 6, this example is directed to a zoom optical system made up of, in order from its object side, a first lens group G1 of negative refracting power, an aperture stop S and a second lens group G2 of positive refracting power. Upon zooming from the wide-angle end to the telephoto end of the optical system, the first lens group G1 moves in a convex locus toward the image side of the optical system and is positioned nearer to the image side at the telephoto end than at the wide-angle end. The apertures stop S and the second lens group G2 move together monotonously toward the object side with a narrowing space between the first lens group G1 and the second lens group G2.

In order from the object side, the first lens group G1 consists of a negative meniscus lens convex on its object side and a positive meniscus lens convex on its object side, and the second lens group G2 consists of a double-convex positive lens and a double-concave negative lens.

Six aspheric surfaces are used: one at both surfaces of the negative meniscus lens in the first lens group G1 and four at all the surfaces in the second lens group G2.

Enumerated below are numerical data on each example. The symbols used hereinafter but not hereinbefore have the following meanings.

f: focal length of the zoom optical system, $F_{NO}$: F-number,

WE: wide-angle end,

ST: intermediate setting,

TE: telephoto end, $r_1$, $r_2$, etc.: radius of curvature of each lens surface, $d_1$, $d_2$, etc.: space between adjacent lens surfaces, $n_{d1}$, $n_{d2}$, etc.: d-line refractive index of each lens, and $\nu_{d1}$, $\nu_{d2}$, etc.: Abbe constant of each lens. Here let x stand for a light axis with the direction of travel of light taken as positive and y indicate a direction orthogonal to the light axis. Then, aspheric shape is given by $$x=(y^2/r)/[1+\{1-(k+1)(y/r)^2\}^{1/2}]$$

$$+A_4y^4+A^6y_6+A_8y^8$$

Here, r is a par-axial radius of curvature, K is a conical coefficient, and $A_4$, $A_6$ and $A_8$ are the fourth, the sixth and the eighth-order aspheric coefficients, respectively.

EXAMPLE 1

| | | | |
|---|---|---|---|
| $r_1 = -80.3012$(Aspheric) | $d_1 = 1.0000$ | $n_{d1} = 1.74320$ | $\nu_{d1} = 49.34$ |
| $r_2 = 6.1213$(Aspheric) | $d_2 = 1.5886$ | | |
| $r_3 = 7.8091$(Aspheric) | $d_3 = 1.6298$ | $n_{d2} = 1.84666$ | $\nu_{d2} = 23.78$ |
| $r_4 = 12.6372$(Aspheric) | $d_4$ = (Variable) | | |
| $r_5 = \infty$ (Stop) | $d_5 = -0.5000$ | | |
| $r_6 = 4.5177$(Aspheric) | $d_6 = 2.1059$ | $n_{d3} = 1.58913$ | $\nu_{d3} = 61.14$ |
| $r_7 = -11.6839$(Aspheric) | $d_7 = 0.5364$ | | |
| $r_8 = -4.0191$(Aspheric) | $d_8 = 1.0393$ | $n_{d4} = 1.84666$ | $\nu_{d4} = 23.78$ |
| $r_9 = -6.9703$(Aspheric) | $d_9$ = (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

Aspherical Coefficients

1st surface $K = 0$
$A_4 = 9.0166 \times 10^{-5}$
$A_6 = 0.0000$
$A_8 = 0.0000$

2nd surface $K = 0$
$A_4 = -4.1100 \times 10^{-4}$
$A_6 = 2.6370 \times 10^{-5}$
$A_8 = 0.0000$ 3rd surface $K = 0$
$A_4 = -7.3294 \times 10^{-4}$
$A_6 = 2.6541 \times 10^{-5}$
$A_8 = 0.0000$ 4th surface $K = 0$
$A_4 = -5.6865 \times 10^{-4}$
$A_6 = 1.6975 \times 10^{-5}$
$A_8 = 0.0000$ 6th surface $K = 0$
$A_4 = 5.0962 \times 10^{-4}$
$A_6 = 0.0000$
$A_8 = 0.0000$ 7th surface $K = 0$
$A_4 = 3.6845 \times 10^{-3}$
$A_6 = 0.0000$
$A_8 = 0.0000$ 8th surface $K = 0$
$A_4 = 1.3837 \times 10^{-2}$
$A_6 = -2.1725 \times 10^{-4}$
$A_8 = 0.0000$ 9th surface $K = 0$
$A_4 = 9.2372 \times 10^{-3}$
$A_6 = 1.5395 \times 10^{-4}$
$A_8 = 0.0000$ -continued

| Zooming Data (∞) | | | |
|---|---|---|---|
| | WE | ST | TE |
| f (mm) | 6.0061 | 11.9936 | 17.9196 |
| $F_{NO}$ | 3.1351 | 4.3092 | 5.5123 |
| $d_4$ | 14.5657 | 4.8297 | 1.6000 |
| $d_9$ | 9.3815 | 13.9712 | 18.5540 |

EXAMPLE 2

| | | | |
|---|---|---|---|
| $r_1 = -48.0000$(Aspheric) | $d_1 = 1.0000$ | $n_{d1} = 1.74320$ | $\nu_{d1} = 49.34$ |
| $r_2 = 5.6908$(Aspheric) | $d_2 = 1.4977$ | | |
| $r_3 = 7.4496$(Aspheric) | $d_3 = 1.5669$ | $n_{d2} = 1.84666$ | $\nu_{d2} = 23.78$ |
| $r_4 = 12.8049$(Aspheric) | $d_4 =$ (Variable) | | |
| $r_5 = \infty$ (Stop) | $d_5 = -0.5000$ | | |
| $r_6 = 4.7641$(Aspheric) | $d_6 = 2.3639$ | $n_{d3} = 1.49700$ | $\nu_{d3} = 81.54$ |
| $r_7 = -7.9339$(Aspheric) | $d_7 = 0.8763$ | | |
| $r_8 = -4.2374$(Aspheric) | $d_8 = 1.0952$ | $n_{d4} = 1.84666$ | $\nu_{d4} = 23.78$ |
| $r_9 = -6.5441$(Aspheric) | $d_9 =$ (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

Aspherical Coefficients

1st surface $K = 0$
$A_4 = 1.4590 \times 10^{-4}$
$A_6 = 0.0000$
$A_8 = 0.0000$

2nd surface $K = 0$
$A_4 = -6.5163 \times 10^{-4}$
$A_6 = 4.4567 \times 10^{-5}$
$A_8 = 0.0000$ 3rd surface $K = 0$
$A_4 = -8.9735 \times 10^{-4}$
$A_6 = 4.6463 \times 10^{-5}$
$A_8 = 0.0000$ 4th surface $K = 0$
$A_4 = -6.1437 \times 10^{-4}$
$A_6 = 3.0689 \times 10^{-5}$
$A_8 = 0.0000$ 6th surface $K = 0.$
$A_4 = -2.0881 \times 10^{-4}$
$A_6 = 0.0000$
$A_8 = 0.0000$ 7th surface $K = 0$
$A_4 = 3.7741 \times 10^{-3}$
$A_6 = 0.0000$
$A_8 = 0.0000$ 8th surface $K = 0$
$A_4 = 1.1838 \times 10^{-2}$
$A_6 = -1.4228 \times 10^{-4}$
$A_8 = 0.0000$ 9th surface $K = 0$ -continued $A_4 = 7.3941 \times 10^{-3}$
$A_6 = 1.0081 \times 10^{-4}$
$A_8 = 0.0000$

| Zooming Data (∞) | | | |
|---|---|---|---|
| | WE | ST | TE |
| f (mm) | 6.0042 | 11.9902 | 17.9396 |
| $F_{NO}$ | 3.0434 | 4.1365 | 5.2256 |
| $d_4$ | 13.2974 | 4.5198 | 1.6000 |
| $d_9$ | 9.4288 | 14.4655 | 19.5101 |

EXAMPLE 3

| | | | |
|---|---|---|---|
| $r_1 = -33.6563$(Aspheric) | $d_1 = 1.0000$ | $n_{d1} = 1.74320$ | $\nu_{d1} = 49.34$ |
| $r_2 = 6.2347$(Aspheric) | $d_2 = 1.4796$ | | |
| $r_3 = 8.8272$(Aspheric) | $d_3 = 1.6011$ | $n_{d2} = 1.82114$ | $\nu_{d2} = 24.06$ |
| $r_4 = 18.7944$(Aspheric) | $d_4 =$ (Variable) | | |
| $r_5 = \infty$ (Stop) | $d_5 = -0.5000$ | | |
| $r_6 = 4.6767$(Aspheric) | $d_6 = 2.0886$ | $n_{d3} = 1.49700$ | $\nu_{d3} = 81.54$ |
| $r_7 = -6.7262$(Aspheric) | $d_7 = 0.7069$ | | |
| $r_8 = -3.9732$(Aspheric) | $d_8 = 1.4401$ | $n_{d4} = 1.58393$ | $\nu_{d4} = 30.21$ |
| $r_9 = -9.3454$(Aspheric) | $d_9 =$ (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

Aspherical Coefficients

1st surface $K = 0$
$A_4 = 1.3164 \times 10^{-4}$
$A_6 = 0.0000$
$A_8 = 0.0000$

2nd surface $K = 0$
$A_4 = -5.3057 \times 10^{-4}$
$A_6 = 3.3686 \times 10^{-5}$
$A_8 = 0.0000$ 3rd surface $K = 0$
$A_4 = -7.5233 \times 10^{-4}$
$A_6 = 2.8971 \times 10^{-5}$
$A_8 = 0.0000$ 4th surface $K = 0$
$A_4 = -5.1461 \times 10^{-4}$
$A_6 = 1.2110 \times 10^{-5}$
$A_8 = 0.0000$ 6th surface $K = 0$
$A_4 = -4.1026 \times 10^{-4}$
$A_6 = -5.9764 \times 10^{-5}$
$A_8 = 0.0000$ 7th surface $K = 0$
$A_4 = 2.7551 \times 10^{-3}$
$A_6 = 4.7060 \times 10^{-5}$
$A_8 = 0.0000$ 8th surface $K = 0$
$A_4 = 1.1630 \times 10^{-2}$
$A_6 = -3.4684 \times 10^{-5}$ -continued

| |
|---|
| $A_8 = 0.0000$ |
| 9th surface |
| $K = 0$ |
| $A_4 = 7.6508 \times 10^{-3}$ |
| $A_6 = 1.2631 \times 10^{-4}$ |
| $A_8 = 0.0000$ |

Zooming Data (∞)

| | WE | ST | TE |
|---|---|---|---|
| f (mm) | 6.0010 | 11.9974 | 17.9434 |
| $F_{NO}$ | 3.0785 | 4.1576 | 5.2322 |
| $d_4$ | 14.3857 | 4.7841 | 1.6000 |
| $d_9$ | 9.2380 | 14.0573 | 18.8752 |

EXAMPLE 4

| | | | |
|---|---|---|---|
| $r_1 = 54.1696$ | $d_1 = 1.0000$ | $n_{d1} = 1.74320$ | $\nu_{d1} = 49.34$ |
| $r_2 = 4.8359$(Aspheric) | $d_2 = 1.6143$ | | |
| $r_3 = 6.5785$ | $d_3 = 1.6421$ | $n_{d2} = 1.84666$ | $\nu_{d2} = 23.78$ |
| $r_4 = 9.7896$ | $d_4 =$ (Variable) | | |
| $r_5 = \infty$ (Stop) | $d_5 = -0.3000$ | | |
| $r_6 = 4.4880$(Aspheric) | $d_6 = 2.0086$ | $n_{d3} = 1.49700$ | $\nu_{d3} = 81.54$ |
| $r_7 = -5.2355$(Aspheric) | $d_7 = 0.6212$ | | |
| $r_8 = -4.2761$(Aspheric) | $d_8 = 2.5138$ | $n_{d4} = 1.68893$ | $\nu_{d4} = 31.08$ |
| $r_9 = -12.1262$(Aspheric) | $d_9 =$ (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

| Aspherical Coefficients |
|---|
| 2nd surface |
| $K = -0.3732$ |
| $A_4 = 1.1763 \times 10^{-4}$ |
| $A_6 = 7.6055 \times 10^{-6}$ |
| $A_8 = 0.0000$ |
| 6th surface |
| $K = 0$ |
| $A_4 = -4.8314 \times 10^{-4}$ |
| $A_6 = -1.8704 \times 10^{-5}$ |
| $A_8 = 0.0000$ |
| 7th surface |
| $K = 0$ |
| $A_4 = 5.4417 \times 10^{-3}$ |
| $A_6 = -1.4828 \times 10^{-4}$ |
| $A_8 = 0.0000$ |
| 8th surface |
| $K = 0$ |
| $A_4 = 8.7473 \times 10^{-3}$ |
| $A_6 = -2.3686 \times 10^{-4}$ |
| $A_8 = 0.0000$ |
| 9th surface |
| $K = 0$ |
| $A_4 = 3.8519 \times 10^{-3}$ |
| $A_6 = 9.6677 \times 10^{-5}$ |
| $A_8 = 0.0000$ |

Zooming Data (∞)

| | WE | ST | TE |
|---|---|---|---|
| f (mm) | 6.0150 | 11.9944 | 17.3441 |
| $F_{NO}$ | 3.1115 | 4.1841 | 5.1487 |
| $d_4$ | 12.9832 | 4.1430 | 1.4000 |
| $d_9$ | 8.3569 | 13.0706 | 17.3669 |

EXAMPLE 5

| | | | |
|---|---|---|---|
| $r_1 = 105.9148$ | $d_1 = 1.0000$ | $n_{d1} = 1.74320$ | $\nu_{d1} = 49.34$ |
| $r_2 = 4.8410$(Aspheric) | $d_2 = 1.5040$ | | |
| $r_3 = 7.2669$ | $d_3 = 1.7628$ | $n_{d2} = 1.90366$ | $\nu_{d2} = 31.31$ |
| $r_4 = 13.0583$ | $d_4 =$ (Variable) | | |
| $r_5 = \infty$ (Stop) | $d_5 = -0.3000$ | | |
| $r_6 = 5.0527$(Aspheric) | $d_6 = 3.9657$ | $n_{d3} = 1.49700$ | $\nu_{d3} = 81.54$ |
| $r_7 = -6.2123$(Aspheric) | $d_7 = 0.2260$ | | |
| $r_8 = -14.5875$(Aspheric) | $d_8 = 1.0000$ | $n_{d4} = 1.68893$ | $\nu_{d4} = 31.08$ |
| $r_9 = 21.9283$(Aspheric) | $d_9 =$ (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

| Aspherical Coefficients |
|---|
| 2nd surface |
| $K = -0.5047$ |
| $A_4 = 1.6548 \times 10^{-4}$ |
| $A_6 = 0.0000$ |
| $A_8 = 0.0000$ |
| 6th surface |
| $K = 0$ |
| $A_4 = -9.9851 \times 10^{-4}$ |
| $A_6 = 2.1369 \times 10^{-5}$ |
| $A_8 = -1.3544 \times 10^{-5}$ |
| 7th surface |
| $K = 0$ |
| $A_4 = 3.6904 \times 10^{-3}$ |
| $A_6 = -7.9943 \times 10^{-4}$ |
| $A_8 = 3.4637 \times 10^{-5}$ |
| 8th surface |
| $K = 0$ |
| $A_4 = 4.5559 \times 10^{-3}$ |
| $A_6 = -8.0268 \times 10^{-4}$ |
| $A_8 = 2.4078 \times 10^{-5}$ |
| 9th surface |
| $K = 3.9777$ |
| $A_4 = 3.5893 \times 10^{-3}$ |
| $A_6 = -1.2648 \times 10^{-4}$ |
| $A_8 = 0.0000$ |

Zooming Data (∞)

| | WE | ST | TE |
|---|---|---|---|
| f (mm) | 6.0849 | 11.8129 | 18.2441 |
| $F_{NO}$ | 3.1477 | 4.1606 | 5.3101 |
| $d_4$ | 14.7513 | 5.0376 | 1.4000 |
| $d_9$ | 8.5302 | 12.8580 | 17.7946 |

EXAMPLE 6

| | | | |
|---|---|---|---|
| $r_1 = 75.3593$(Aspheric) | $d_1 = 1.0000$ | $n_{d1} = 1.74320$ | $\nu_{d1} = 49.34$ |
| $r_2 = 4.8561$(Aspheric) | $d_2 = 1.5218$ | | |
| $r_3 = 7.4430$ | $d_3 = 1.7503$ | $n_{d2} = 1.90366$ | $\nu_{d2} = 31.31$ |

-continued

| | | | |
|---|---|---|---|
| $r_4 = 13.6272$ | $d_4$ = (Variable) | | |
| $r_5 = \infty$ (Stop) | $d_5 = -0.3000$ | | |
| $r_6 = 4.6713$(Aspheric) | $d_6 = 3.5824$ | $n_{d3} = 1.49700$ | $\nu_{d3} = 81.54$ |
| $r_7 = -6.6499$(Aspheric) | $d_7 = 0.2264$ | | |
| $r_8 = -18.5581$(Aspheric) | $d_8 = 1.0000$ | $n_{d4} = 1.68893$ | $\nu_{d4} = 31.08$ |
| $r_9 = 15.0264$(Aspheric) | $d_9$ = (Variable) | | |
| $r_{10} = \infty$ | $d_{10} = 0.9600$ | $n_{d5} = 1.54771$ | $\nu_{d5} = 62.84$ |
| $r_{11} = \infty$ | $d_{11} = 0.6000$ | | |
| $r_{12} = \infty$ | $d_{12} = 0.5000$ | $n_{d6} = 1.51633$ | $\nu_{d6} = 64.14$ |
| $r_{13} = \infty$ | $d_{13} = 0.5000$ | | |
| $r_{14} = \infty$(Image plane) | | | |

Aspherical Coefficients

1st surface $K = 0$
$A_4 = -5.9981 \times 10^{-5}$
$A_6 = 0.0000$
$A_8 = 0.0000$ 2nd surface $K = -0.6453$
$A_4 = 2.3718 \times 10^{-4}$
$A_6 = 0.0000$
$A_8 = 0.0000$ 6th surface $K = 0$
$A_4 = -1.1120 \times 10^{-3}$
$A_6 = 1.0075 \times 10^{-5}$
$A_8 = -1.6650 \times 10^{-5}$ 7th surface $K = 0$
$A_4 = 3.2283 \times 10^{-3}$
$A_6 = -7.9085 \times 10^{-4}$
$A_8 = 3.2257 \times 10^{-5}$ 8th surface $K = 0$
$A_4 = 4.5672 \times 10^{-3}$
$A_6 = -7.9080 \times 10^{-4}$
$A_8 = 2.1571 \times 10^{-5}$ 9th surface $K = 13.2252$
$A_4 = 3.9321 \times 10^{-3}$
$A_6 = -1.0714 \times 10^{-4}$
$A_8 = 0.0000$ Zooming Data (∞)

| | WE | ST | TE |
|---|---|---|---|
| f (mm) | 6.0806 | 11.7818 | 18.2149 |
| $F_{NO}$ | 3.1976 | 4.2126 | 5.3670 |
| $d_4$ | 14.5976 | 4.7205 | 1.0000 |
| $d_9$ | 8.0615 | 12.0938 | 16.7288 |

FIGS. 7–12 are aberration diagrams for Examples 1–6 upon focusing on an infinite object point. Throughout the drawings, spherical aberrations (SA), astigmatisms (AS), distortions (DT) and chromatic aberrations of magnification (CC) at the wide-angle end (a), in the intermediate setting (b) and at the telephoto end (c) are presented, and "FIY" is the maximum image height.

Listed below are the values of parameters, etc. regarding the angels of view and conditions (1) to (53) in Examples 1–6.

| Condition | Example 1 | Example 2 | Example 3 | Example 4 |
|---|---|---|---|---|
| $y_{10}$* (Maximum Image Height)(mm) | 3.6 | 3.6 | 3.6 | 3.6 |
| Angle of View Corresponding to $y_{10}$* × 0.8 <Note 1> | 28.5° | 28.3° | 28.5° | 27.6° |
| Angle of View Corresponding to $y_{10}$* × 0.6 <Note 1> | 21.0° | 20.9° | 21.0° | 20.6° |
| Angle of View at WE <Note 2> | 32.6° | 32.5° | 32.6° | 32.1° |
| Angle of View at ST | 17.1° | 17.1° | 17.1° | 17.0° |
| Angle of View at TE | 11.4° | 11.4° | 11.4° | 11.7° |
| $f_W/r_{22R}$ | −0.86167 | −0.91750 | −0.64213 | −0.49603 |
| $(D_{12W} - D_{12T})/(f_W \cdot \gamma^2)$ | 0.24251 | 0.21824 | 0.23831 | 0.23161 |
| $\Sigma D_T/f_W$ | 1.49848 | 1.58222 | 1.56912 | 1.74564 |
| $f_W/\lvert f_{22}\rvert$ | 0.44920 | 0.33083 | 0.45689 | 0.54541 |
| $\nu_{21} - \nu_{22}$ | 37.36 | 57.76 | 51.33 | 50.46 |
| $f_W/r_{11F}$ | −0.07479 | −0.12509 | −0.17830 | +0.11104 |
| $t_1/t_2$ | 1.14584 | 0.93754 | 0.96342 | 0.82752 |
| $d_{11}/f_W$ | 0.26450 | 0.24944 | 0.24656 | 0.26838 |
| $R_{11R}/R_{12F}$ | 0.78387 | 0.76391 | 0.70631 | 0.73511 |
| $y_{08}^*/(f_W \cdot \tan\omega_{08W})$ <Note 1> | 0.88479 | 0.89253 | 0.88434 | 0.91714 |
| $(dy^*/dy)_{y08^*}$ | 0.69665 | 0.70875 | 0.68859 | 0.78037 |
| $(dy^*/dy)_{y00^*}$ | 1 | 1 | 1 | 1 |
| a (μm) | 2.25 | 2.25 | 2.25 | 2.25 |
| $y_{10}$*/a | 1.6 | 1.6 | 1.6 | 1.6 |
| $F_W/a$ | 1.39 | 1.35 | 1.37 | 1.38 |
| $d1/y_{10}$* | 0.44128 | 0.41603 | 0.41100 | 0.44842 |
| $(R_{11F} + R_{11R})/(R_{11F} - R_{11R})$ | 0.85834 | 0.78802 | 0.68741 | 1.19605 |
| n1 | 1.74320 | 1.74320 | 1.74320 | 1.74320 |
| $t1/y_{10}$* | 1.17178 | 1.12906 | 1.13353 | 1.18234 |
| $\beta_T$ | −1.45165 | −1.60006 | −1.49875 | −1.49350 |
| $t2/y_{10}$* | 1.02267 | 1.20428 | 1.17656 | 1.42877 |
| $D_{12T}/y_{10}$* | 0.44444 | 0.44444 | 0.44444 | 0.30556 |
| $ds/y_{10}$* | −0.13889 | −0.13889 | −0.13889 | −0.08333 |
| $P_W/y_{10}$* | 5.21781 | 4.82278 | 5.12956 | 4.78877 |
| $(R_{22F} + R_{22R})/(R_{22F} - R_{22R})$ | −3.72371 | −4.67399 | −2.47917 | −2.08944 |

| Condition | Example 5 | Example 6 |
|---|---|---|
| $y_{10}$* (Maximum Image Height)(mm) | 3.6 | 3.6 |
| Angle of View Corresponding to $y_{10}$* × 0.8 <Note 1> | 27.0° | 27.0° |
| Angle of View Corresponding to $y_{10}$* × 0.6 <Note 1> | 20.3° | 20.3° |
| Angle of View at WE <Note 2> | 31.7° | 31.7° |
| Angle of View at ST | 17.2° | 17.2° |
| Angle of View at TE | 11.2° | 11.1° |
| $f_W/r_{22R}$ | +0.27749 | +0.40466 |
| $(D_{12W} - D_{12T})/(f_W \cdot \gamma^2)$ | 0.24408 | 0.24920 |
| $\Sigma D_T/f_W$ | 1.73688 | 1.61007 |
| $f_W/\lvert f_{22}\rvert$ | 0.48760 | 0.51455 |
| $\nu_{21} - \nu_{22}$ | 50.46 | 50.46 |
| $f_W/r_{11F}$ | +0.05745 | +0.08069 |
| $t_1/t_2$ | 0.82185 | 0.88839 |
| $d_{11}/f_W$ | 0.24717 | 0.25027 |
| $R_{11R}/R_{12F}$ | 0.66617 | 0.65244 |
| $y_{08}^*/(f_W \cdot \tan\omega_{08W})$ <Note 1> | 0.92863 | 0.93045 |
| $(dy^*/dy)_{y08^*}$ | 0.81886 | 0.82344 |
| $(dy^*/dy)_{y00^*}$ | 1 | 1 |
| a (μm) | 2.25 | 2.25 |
| $y_{10}$*/a | 1.6 | 1.6 |
| $F_W/a$ | 1.40 | 1.42 |
| $d1/y_{10}$* | 0.41778 | 0.42272 |
| $(R_{11F} + R_{11R})/(R_{11F} - R_{11R})$ | 1.09579 | 1.13776 |
| n1 | 1.74320 | 1.74320 |
| $t1/y_{10}$* | 1.18523 | 1.18670 |
| $\beta_T$ | −1.43560 | −1.37437 |
| $t2/y_{10}$* | 1.44214 | 1.33578 |
| $D_{12T}/y_{10}$* | 0.30556 | 0.19444 |

-continued

| | | |
|---|---|---|
| $ds/y_{10}^*$ | −0.08333 | −0.08333 |
| $P_W/y_{10}^*$ | 5.28280 | 5.15219 |
| $(R_{22F} + R_{22R})/(R_{22F} - R_{22R})$ | −0.20103 | 0.10516 |

Note 1: calculated value before correction of distortion.
Note 2: The half angle of view corresponding to the maximum image height $y_{10}^*$ is a value with distortion introduced in it. However, the half angles of view after correction are mentioned in the above list, because all the examples are carried out on condition that distortion is corrected by image processing near the wide-angle end. Note here that correction is implemented in such a way that the half angle of view corresponding to $y_{10}^* \times 0.6$ remains nearly invariable.

The electronic imaging system of the invention constructed as described above may be applied to electronic taking systems where object images formed through zoom lenses are received at image pickup devices such as CCDs, especially, digital cameras or video cameras as well as PCs and telephone sets which are typical information processors, in particular, easy-to-carry cellular phones. Given below are some such embodiments.

Figure 13:
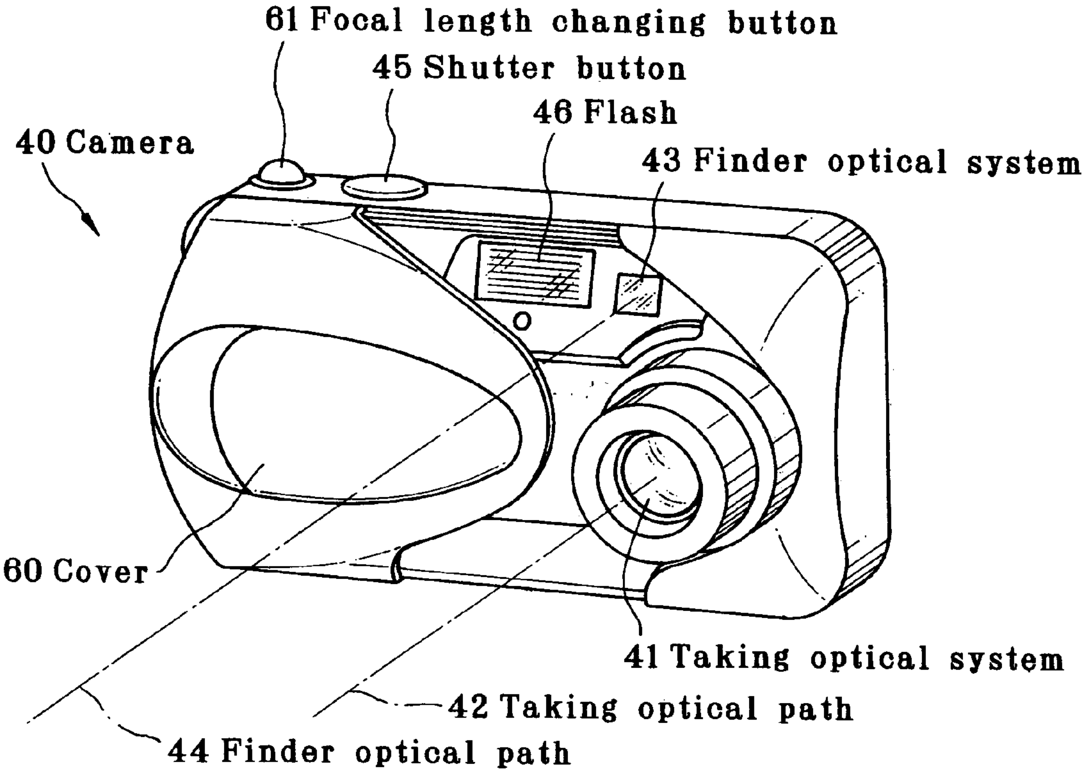
FIG. 13 is a front perspective view of the appearance of a digital camera in which the inventive zoom lens is built.
Figure 14:
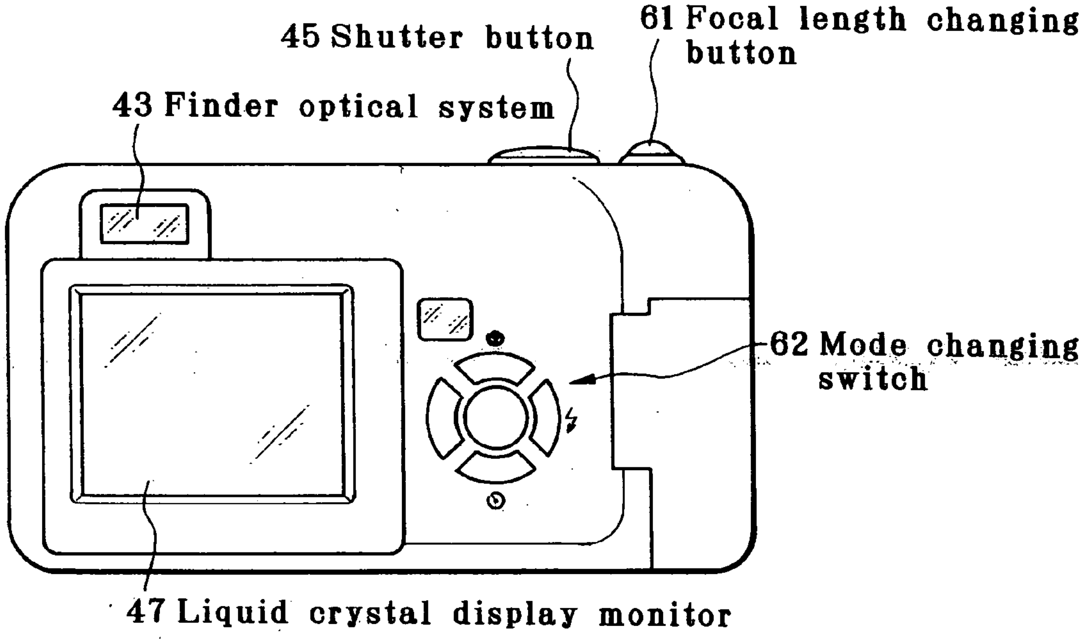
FIG. 14 is a rear perspective view of the digital camera of FIG. 13.
Figure 15:
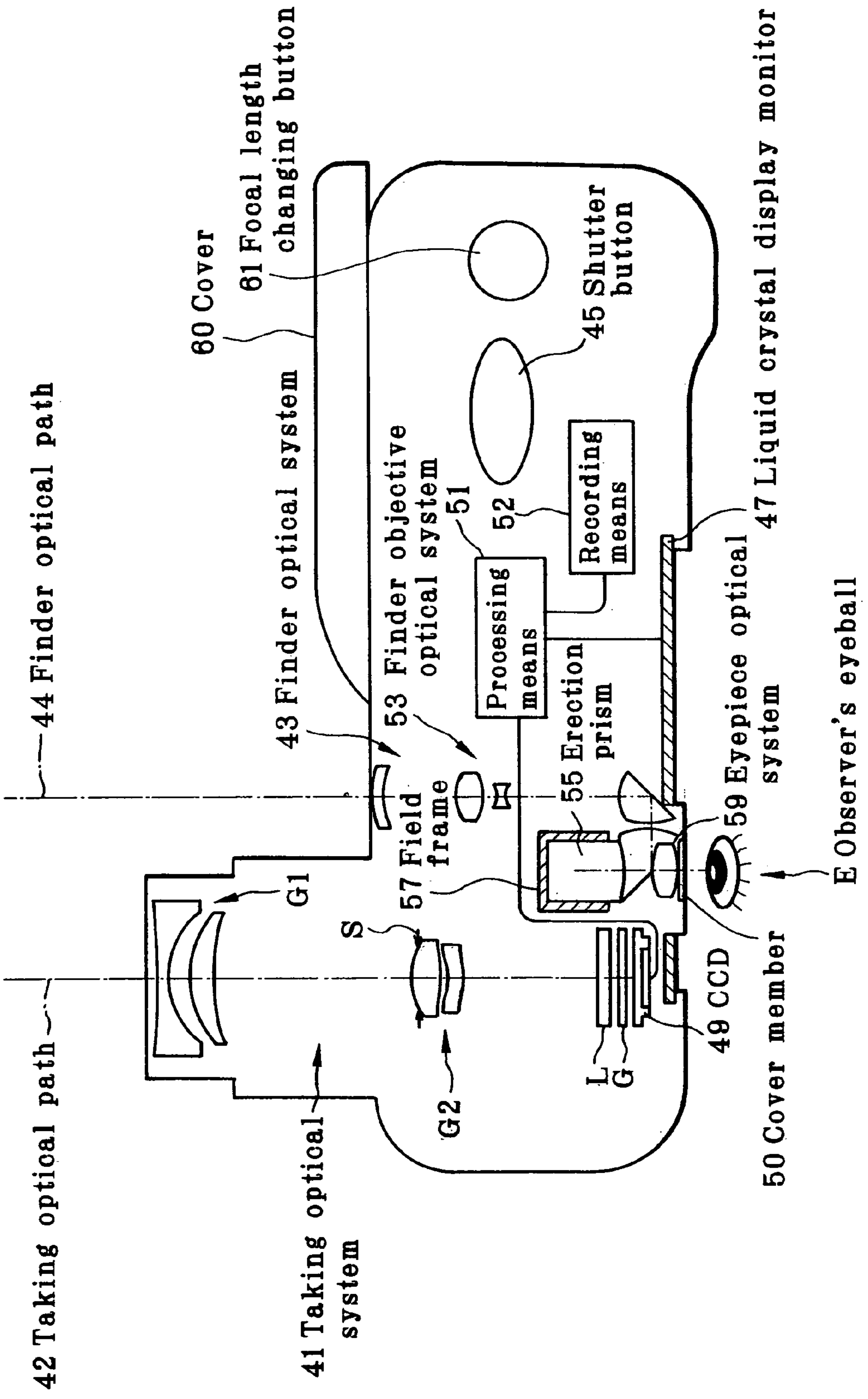
FIG. 15 is a sectional view of the digital camera of FIG. 13.
Figure 28:
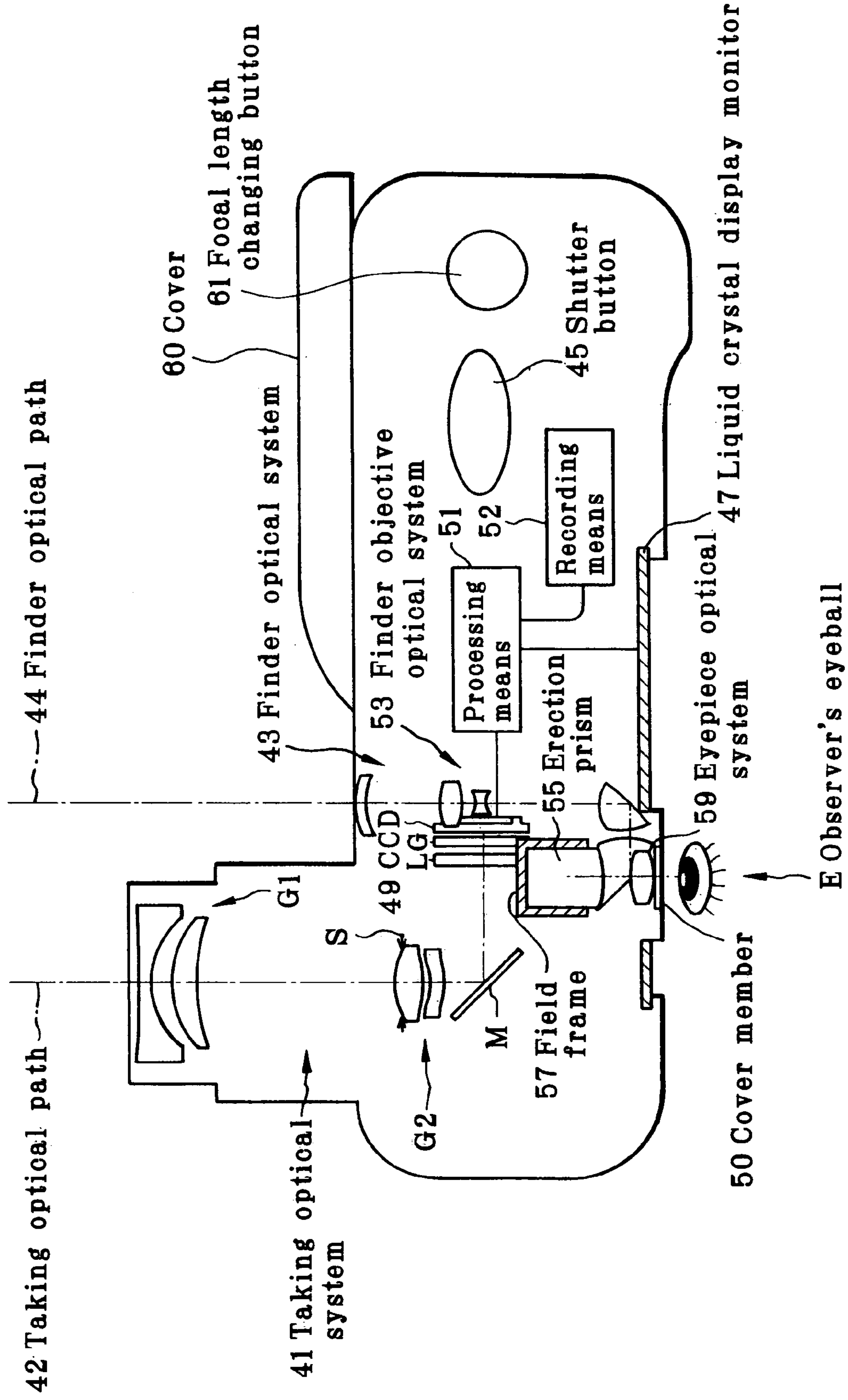
FIG. 28 is a sectional view of the digital camera of FIG. 26.

FIGS. 13, 14 and 15 are illustrative in conception of the construction of a digital camera according to the invention, in which the inventive zoom lens is built in its taking optical system 41. Specifically, FIG. 13 is a front perspective view of the appearance of a digital camera 40, FIG. 14 is a rear front view of the digital camera 40, and FIG. 15 is a schematic perspective plan view of the construction of the digital camera 40. Note here that FIGS. 13 and 15 show that the taking optical system 41 is housed in a camera body. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 71, a mode select switch 62 and so on. When the taking optical system 41 is housed in the camera body, a cover 60 is slid over the taking optical system 41, the finder optical system 43 and the flash 46. As the cover 60 is slid open to place the camera 40 in a taking mode, the taking optical system 41 is put out of the camera body, as shown in FIG. 28. Then, as the shutter button 45 mounted on the upper side of the camera 40 is pressed down, it causes taking to be implemented through the taking optical system 41, for instance, the zoom lens of Example 1. An object image formed through the taking optical system 41 is formed on the image pickup plane of CCD 49 via a low-pass filter LF with an IR cut coating applied on it and a cover glass CG. The object image received at CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens groups (three groups in the embodiment of FIGS. 27–28) and two prisms with its focal length variable in operable association with the zoom lens that is the taking optical system 41. An object image formed through the finder objective optical system 53 is formed on a field frame 57 of an erection prism 55 that is an image-erecting member. In the rear of the erection prism 55, there is located an eyepiece optical system 59 for guiding an erected image into the eyeball E of the viewer. Note here that a cover member 50 is located on the exit side of the eyepiece optical system 59.

The thus assembled digital camera 40 can be improved in performance and reduced in size, because the taking optical system 41 is of high performance and small size, and can be housed in the digital camera body.

Figure 16:
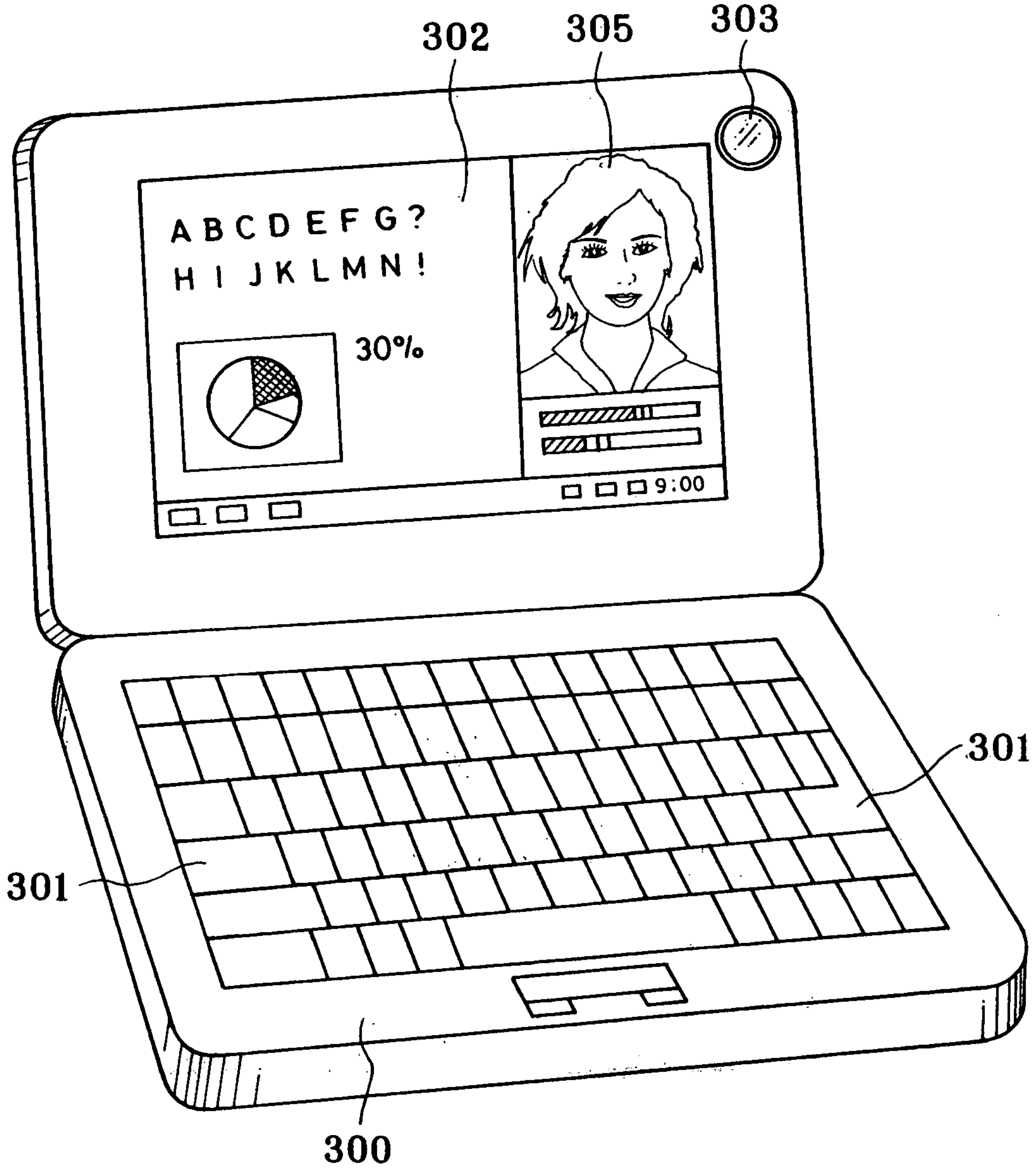
FIG. 16 is a front perspective view of a personal computer with a cover put upright, in which the zoom lens of the invention is built.
Figure 17:
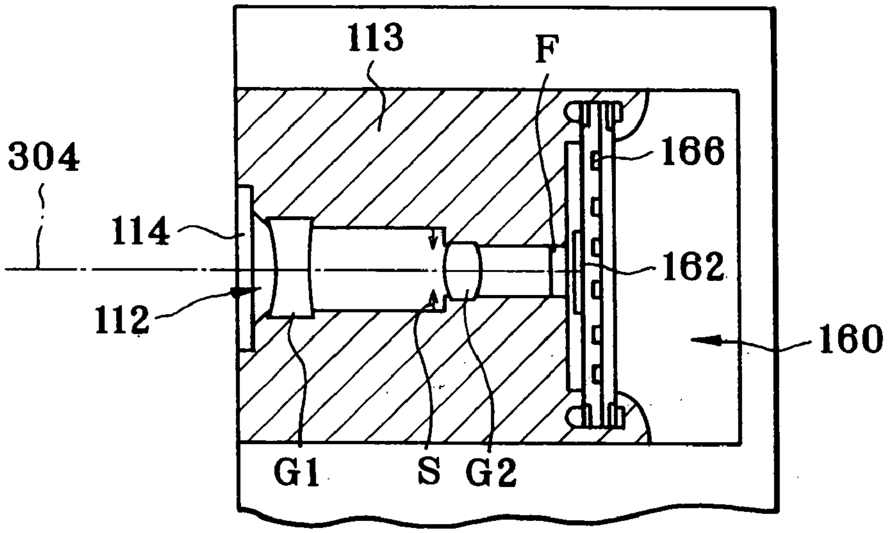
FIG. 17 is a sectional view of a taking optical system in the personal computer.
Figure 18:
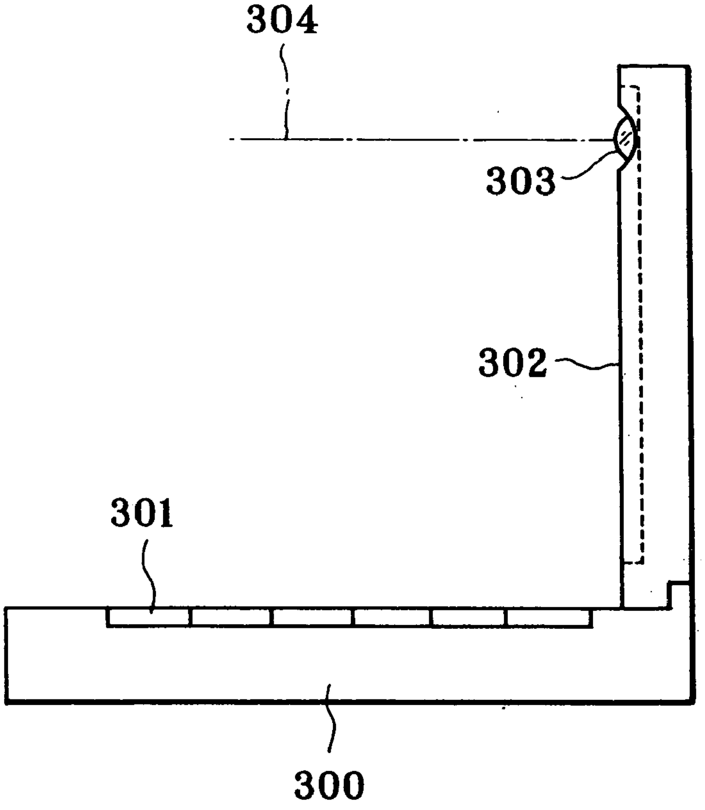
FIG. 18 is a side view of the FIG. 16 state.

FIGS. 16, 17 and 18 illustrate together a personal computer that is one embodiment of information processors in which the zoom lens of the invention is built in the form of an objective optical system. FIG. 16 is a front perspective view of a personal computer or PC 300 in an uncovered state, FIG. 17 is a sectional view of a taking optical system 303 in PC 300, and FIG. 18 is a side view of the FIG. 16 state. As shown in FIGS. 16, 17 and 18, PC 300 comprises a keyboard 301 for allowing an operator to enter information therein from outside, information processing and recording means (not illustrated), a monitor 302 for displaying the information to the operator, and a taking optical system 303 for taking an image of the operator per se and nearby images. The monitor 302 used herein may be a transmission type liquid crystal display illuminated from its back side by means of a backlight (not shown), a reflection type liquid crystal display designed to reflect light from its front side for display purposes, a CRT display or the like. As shown, the taking optical system 303 is built in the right upper portion of the monitor 302; however, it could be located at any desired position, for instance, around the monitor 302 or the keyboard 301.

This taking optical system 303 comprises an objective lens 112 mounted on a taking optical path 304 and formed of the zoom lens of the invention (roughly shown) and an image pickup chip 162 for receiving images, which are built in PC 300.

In this embodiment, an optical low-pass filter F is additionally applied onto the image pickup chip 162 to form a one-piece image pickup unit 160 that can be mounted at the rear end of the lens barrel 113 of the objective lens 112 in one-touch snap operation. Thus, any centering or surface-to-surface alignment for the objective lens 112 and image pickup chip 162 can be dispensed with, and so smooth assembly is achieved. Further, the lens barrel 113 is provided at the other end with a cover glass 114 for protection of the objective lens 112. Note here that the zoom lens drive mechanism in the lens barrel 113 is not shown.

An object image received at the image pickup chip 162 is entered into the processing means of PC 300 via a terminal 166 and displayed as an electronic image on the monitor 302. As an example, an image 305 phototaken of the operator is shown in FIG. 16. The image 305 may be displayed on a personal computer on the other end of the line by way of processing means and the Internet or a telephone.

Figure 19A:
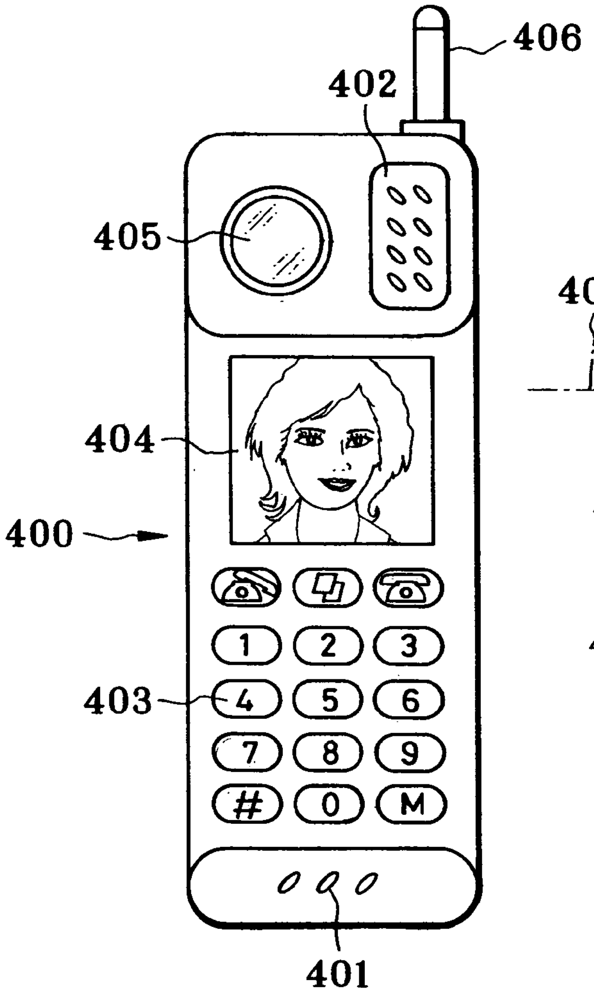
FIGS. 19(*a*) and 19(*b*) are a front view and a side view of a cellular phone in which the zoom lens of the invention is incorporated in the form of an objective optical system, and FIG. 19(*c*) is a sectional view of that taking optical system.
Figure 19B:
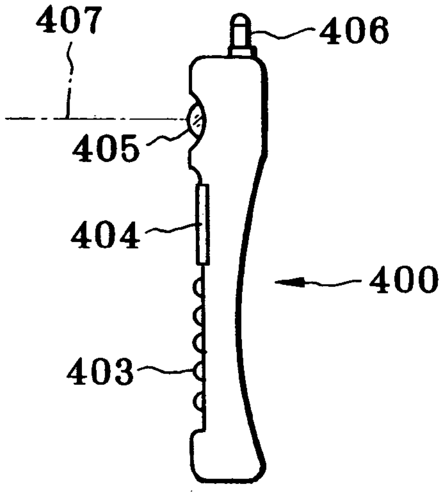
Figure 19C:
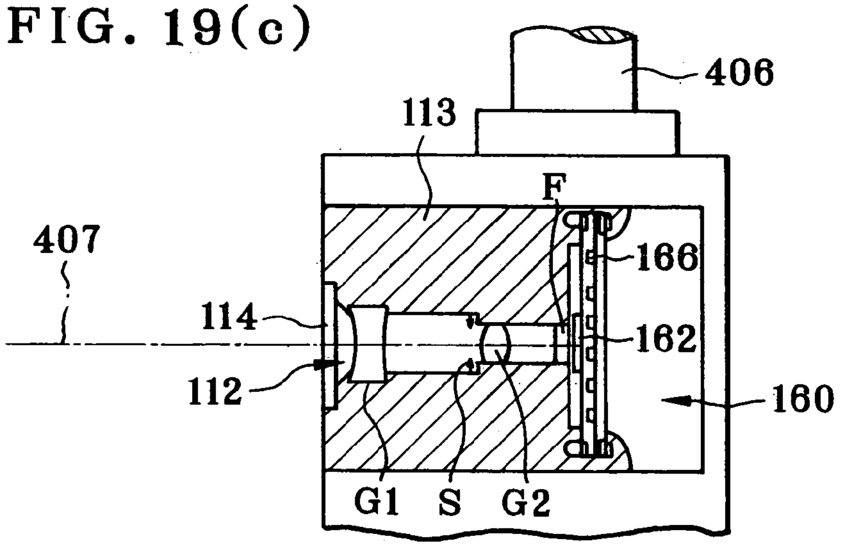

FIG. 19 is illustrative of a telephone set, especially a convenient-to-carry cellular phone that is one exemplary information processor in which the zoom lens of the invention is built as a taking optical system. FIGS. 19(*a*) and 19(*b*) are a front view and a side view of a cellular phone 400, and FIG. 19(*c*) is a sectional view of a taking optical system 405. As shown, the cellular phone 400 comprises a microphone 401 through which the voice of an operator is entered as information, a speaker 402 through which the voice of a person on the other end or the like is produced, an input dial 403 through which the information is entered by the operator, a monitor 404 for displaying images taken of the operator per se, the person on the other end of the line and so on as well as information such as telephone numbers, a taking optical system 405, an antenna 406 for transmission and reception of communications waves, and processing means (not shown) for processing image information, communications information, input signals, etc. Here a liquid crystal display is used for the monitor 404. How the respective devices are arranged is not particularly limited to the arrangement shown in FIG. 19. This taking optical system 405 comprises an objective lens 112 mounted on a taking optical path 407 and formed of the zoom lens of the invention (roughly shown) and an image pickup chip 162 for receiving object images, which are built in the cellular phone 400.

In this embodiment, an optical low-pass filter F is additionally applied onto the image pickup chip 162 to form a one-piece unit 160 that can be mounted at the rear end of the lens barrel 113 of the objective lens 112 in one-touch snap operation. Thus, any centering or surface-to-surface alignment for the objective lens 112 and image pickup chip 162 can be dispensed with, and so smooth assembly is achieved. Further, the lens barrel 113 is provided at the other end with a cover glass 114 for protection of the objective lens 112. It is here noted that the zoom lens drive mechanism in the lens barrel 113 is not shown.

An object image received at the image pickup device 162 is entered into processing means (not shown) via a terminal 166, so that the image is displayed as an electronic image on the monitor 404 and/or a monitor on the other end of the line. To transmit the image to the person on the other end, the signal processing means has a signal processing function of converting information on the object image received at the image pickup chip 162 to transmittable signals.

Throughout Examples 1–6 given above, when the optical system is set up in the form of a zoom lens with a bent optical path, the optical path-bending reflecting surface, for instance, is located at a position that faces 4 mm away from the image-side surface of the negative lens in the second lens group G2 (a negative meniscus lens or double-concave negative lens).

Throughout Examples 1–6 described above, the aperture stop S located on the object side of the positive lens (double-convex positive lens) in the second lens group G2 is a circular stop with a fixed aperture shape, wherein its edge portion that determines an axial light beam is positioned nearer to the image side than to the vertex position of the object-side surface of the positive lens (double-convex positive lens) in the second lens group G2. This arrangement makes the range of relative movement of the first lens group G1 used for zooming so wider that it can work for high zoom ratios or slimming down a camera on wide-angle taking. This also works for slimming down the lens system in its thickness direction even upon received at a collapsible lens mount.

Figures 20A, 20B, 20D:
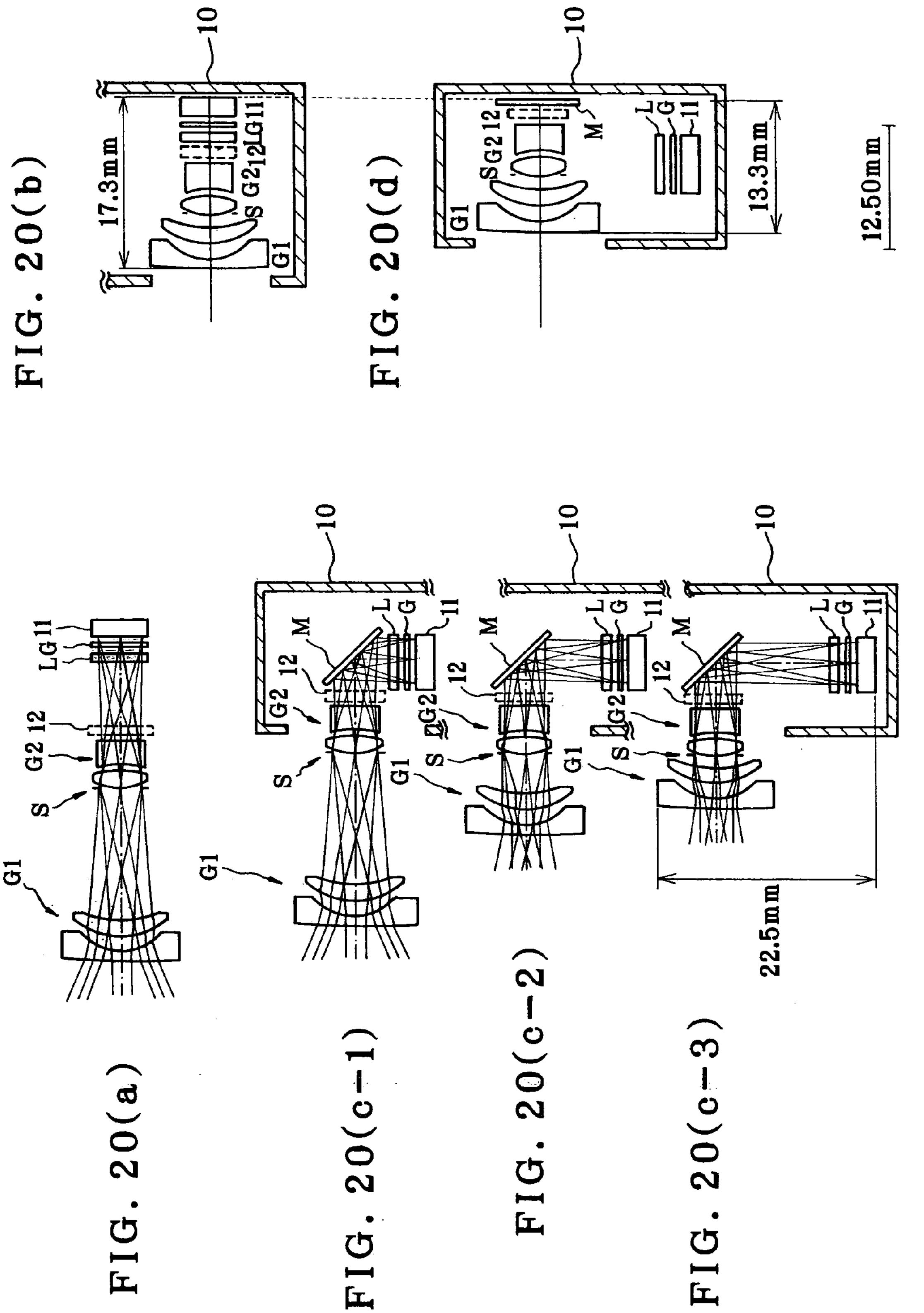
FIG. 20 is a collection of views of comparing one prior art mode of receiving a zoom lens at a lens mount with the inventive mode of receiving the zoom lens at a lens mount.

In these examples, light quantity adjustment on taking is implemented by a mechanical shutter located on the image side of the negative lens (negative meniscus lens or double-concave negative lens) in the second lens group G2 (see FIG. 20). Instead, the mode of adjusting taking time with the electronic image pickup device could be used without recourse to any mechanical shutter. This works more favorably for slimming down the lens system upon received at a collapsible lens mount, because of dispensing with the mechanical shutter.

In Examples 1–6 given above, focusing on a nearby object point could be implemented by moving the first lens group G1 toward the object side or moving the electronic image pickup device in a direction away from the reflecting surface.

While the zoom lens used with the electronic imaging system according to the further aspect of the invention has been explained with reference to a two-group arrangement which, as in Examples 1–6, comprises a first lens group of negative refracting power and a second lens group of positive refracting power, it is to be understood that it is not necessarily limited to such a two-group arrangement.

For instance, in the above exemplified type, the positive lens group could be located on the object side of the negative lens group or, alternatively, a positive lens group could be located on the image side of the positive lens group.

Further, the zoom lens of the invention could be set up in the form of:

a four-group zoom lens arrangement comprising:

a first lens group of positive refracting power, which remains fixed to an imaging system body during zooming, a second lens group of negative refracting power, which is movable during zooming, a third lens group of positive refracting power, which has a reflecting surface and remains fixed to the imaging system body during zooming, and a fourth lens group of positive refracting power, which is movable in unison with an image plane-side image pickup device during zooming;

a two-group zoom lens arrangement comprising:

a first lens group of negative refracting power, which has a reflecting surface and remains fixed to an imaging system casing during zooming, and a second lens group of positive refracting power, which is movable during zooming; or a three-group zoom lens arrangement comprising:

a first lens group of positive or negative refracting power, which has a reflecting surface and remains fixed to an imaging system body during zooming, a second lens group having refracting power opposite to the refracting power of the first lens group, and a third lens group of positive or negative refracting power, which is movable.

The zoom lens system used with the electronic imaging system according to the further aspect of the invention could be variously modified within the range disclosed herein.

The electronic imaging system according to the further aspect of the invention is constructed such that the optical path through such a zoom lens as described above is bent via the deflector element and a part of the zoom lens is housed in the imaging system body when not in use. FIG. 20 illustrates a comparison of a prior art arrangement for housing lenses in an imaging system with the inventive arrangement wherein the lenses are housed in the imaging system body. For instance, the zoom lens of Example 4 is used in FIG. 20. FIG. 20(*a*) is a sectional view at the wide-angle end of a prior art example of how to house the lenses in the electronic imaging system, and FIG. 20(*b*) is illustrative in section of the lenses upon received in place. FIGS. 20(*c*-1), 20(*c*-2) and 20(*c*-3) are illustrative in section at the wide-angle end, in the intermediate setting and at the telephoto end of the lenses housed in the inventive electronic imaging system and FIG. 20(*d*) is illustrative in section of the lenses housed in place. In FIG. 20, reference numeral 10 stands for a camera body (casing), 11 an electronic image pickup device, 12 a shutter mechanism, and M a (plane) mirror, and actual sizes are given.

According to the prior art, as shown in FIG. 20(*b*), a negative first lens group G1 and a positive second lens group G2 are moved along an optical axis toward an image side for receiving them in place. Thus, the negative first lens group G1, the positive second lens group G2 (integral with a stop S), the shutter mechanism 12, a low-pass filter L, an electronic image pickup device cover glass G and an electronic image pickup device (CCD or C-MOS) 11 are received and housed together side by side in the camera body 10, and so the camera body 10 grows thick in its optical axis direction.

In taking operation according to the invention, on the other hand, zooming is implemented by varying the relative space between the first lens group G1 of negative refracting power and the second lens group G2 of positive refracting power, which G2 has a mirror (reflecting surface) M. At this time, the positive second lens group G2 is fixed to a camera body 10 while the first lens group G1 is moved along the entrance-side optical axis of the second lens group G2. Having a stop S fixed to the camera body 10, a positive lens, a negative lens, a shutter mechanism 12 and a mirror M remaining fixed to the camera body 10 during zooming, the second lens group G2 has an optical path bent 90° by the reflecting surface of the mirror M.

In the direction of reflection of light by the mirror M, there are located a low-pass filter L integrally moving along an optical axis, a cover glass G and an electronic imaging pickup device 11. These devices move along the axis of light reflected at the mirror M, and their positions are determined in association with the movement of an image plane position by the movement of the first lens group G1.

When they are housed in the camera body 10, as shown in FIG. 20(*d*), the mirror M is retracted back along the contour of the camera body 10, and the stop S for the second lens group G2, the positive lens, the negative lens and the shutter mechanism 12 are fitted back in the ensuing space. Further, the first lens group G1 and the second lens group G2 are housed in the camera body 10 with a narrowing space between them.

Thus, the inventive arrangement (FIG. 20(*d*)) can be smaller in the thickness of the camera body 10 with each lens group housed in it than the prior art arrangement (FIG. 20(*b*)).

The zoom lens used with the electronic imaging system of the invention is not limited to those described above, and could be modified in such a way as to have such group arrangements and moving loci as described below. In FIGS. 21–25, solid lines are indicative of the position of the wide-angle end and broken lines are indicative of the position of the telephoto end. The lens groups are indicated by thin lens symbols while the moving loci are indicated by arrows from the wide-angle end (W) to the telephoto end (T).

Figure 21:
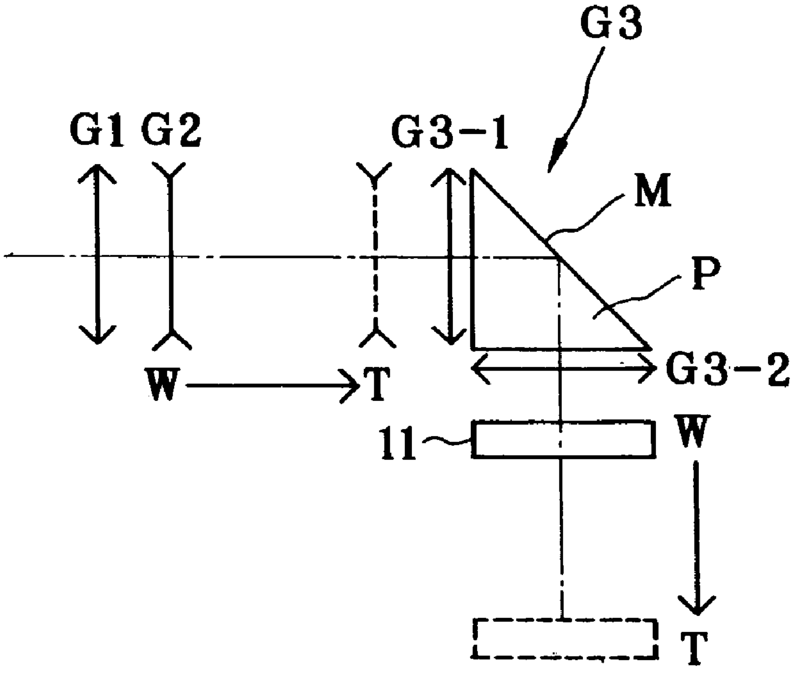
FIG. 21 is illustrative of a group arrangement and movement locus of another zoom lens used with another electronic imaging system of the invention.

The zoom lens exemplified in FIG. 21 comprises, in order from its object side, a first lens group G1 of positive refracting power, a second lens group G2 of negative refracting power, a third lens group G3 that has a reflecting surface M, remains fixed to a camera body at the time of zooming and has positive refracting power, and an electronic image pickup device 11 that changes in its distance with respect to the third lens group G3 at the time of zooming. Zooming is implemented by varying the space between the adjacent lens groups.

The third lens group G3 with the reflecting surface M has refracting power at the surfaces with the reflecting surface M sandwiched. In this example, the third lens group G3 is made up of a 3-1 lens subgroup G3-1 of positive refracting power, a right-angle prism P and a 3-2 lens subgroup G3-2 of positive refracting power.

Referring in detail to the movement of the lens groups and the image pickup device, the first lens group G1 remains fixed to the camera body during zooming. The second lens group G2 moves along the optical axis from the wide-angle end to the telephoto end with respect to the camera body in such a direction as to come close to the reflecting surface M. The third lens group G3 remains fixed to the camera body.

The electronic image pickup device (image plane) 11 moves along the optical axis from the wide-angle end to the telephoto end in such a direction as to come off the reflecting surface M. Note here that the first lens group G1 could be movable during zooming.

Figure 22:
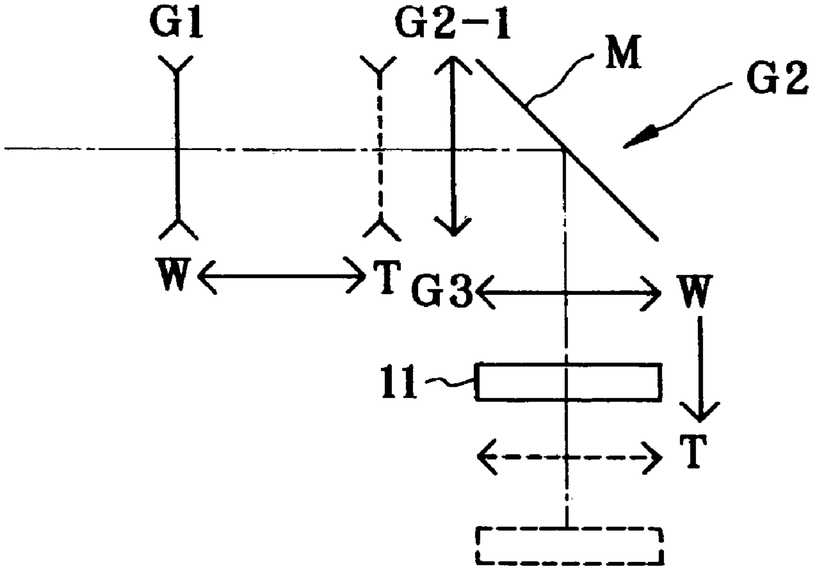
FIG. 22 is illustrative of a group arrangement and movement locus of yet another zoom lens used with yet another electronic imaging system of the invention.

The zoom lens exemplified in FIG. 22 is made up of, in order from its object side, a first lens group G1 of negative refracting power, a second lens group G2 that has a reflecting surface M, remains fixed to a camera body at the time of zooming and has positive refracting power, a third lens group G3 of positive refracting power, and an electronic image pickup device 11 that changes in its distance with respect to the second lens group G2 at the time of zooming. Zooming is then implemented by changing the space between the adjacent lenses.

The second lens group G2 with the reflecting surface M has refracting power on the object side alone of the reflecting surface M. The second lens group G2 is composed of a 2-1 lens subgroup G2-2 of positive refracting power and a front surface mirror having a plane reflecting surface M.

Referring in detail to the movement of the lens groups and the image pickup device, the first lens group G1 moves along the optical axis from the wide-angle end to the telephoto end with respect to the camera body in such a direction as to come close to the reflecting surface M. The second lens group G2 remains fixed to the camera body. The third lens group G3 moves along the optical axis from the wide-angle end to the telephoto end in such a way as to come off the reflecting surface M.

The electronic image pickup device (image plane) 11 moves along the optical axis from the wide-angle end to the telephoto end in such a direction as to come off the reflecting surface M. The space between the third lens group G3 and the electronic image pickup device 11 is kept constant during zooming. Note here that the space between the third lens group G3 and the electronic image pickup device 11 could be variable during zooming.

Figure 23:
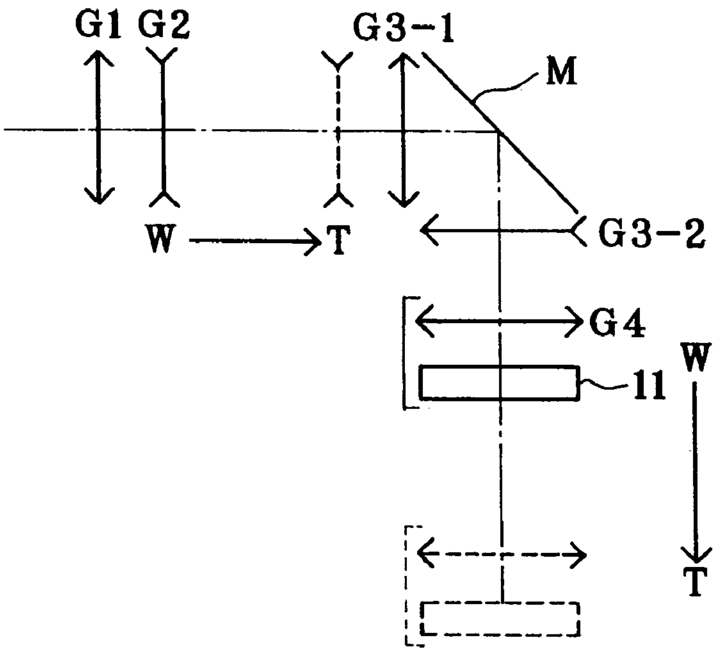
FIG. 23 is illustrative of a group arrangement and movement locus of a further zoom lens used with a further electronic imaging system of the invention.

The zoom lens exemplified in FIG. 23 is made up of, in order from its object side, a first lens group G1 of positive refracting power, a second lens group G2 of negative refracting power, a third lens group G3 that has a reflecting surface M, remains fixed to a camera body at the time of zooming and has positive refracting power, a fourth lens group G4 that changes in its distance with the third lens group G3 at the time of zooming and an electronic image pickup device 11 that changes in its distance with respect to the third lens group G3 at the time of zooming. Zooming is then implemented by varying the space between the adjacent lens groups.

The third lens group G3 with the reflecting surface M has refracting power at the surfaces with the reflecting surface M sandwiched. In this example, the third lens group G3 is composed of a 3-1 lens subgroup G3-1 of positive refracting power, a front surface mirror having a plane reflecting surface M and a 3-2 lens subgroup G3-2 of positive refracting power.

Referring in detail to the movement of the lens groups and the image pickup device, the first lens group G1 remains fixed to the camera body during zooming. The second lens group G2 moves along the optical axis from the wide-angle end to the telephoto end with respect to the camera body in such a direction as to come close to the reflecting surface M. The third lens group G3 remains fixed to the camera body. The fourth lens group G4 and the electronic image pickup device 11 moves together along the optical axis in such a direction as to come off the reflecting surface M. Note here that the first lens group G1 could be movable during zooming, and that the space between the fourth lens group G4 and the electronic image pickup device 11 could be variable during zooming.

Figure 24:
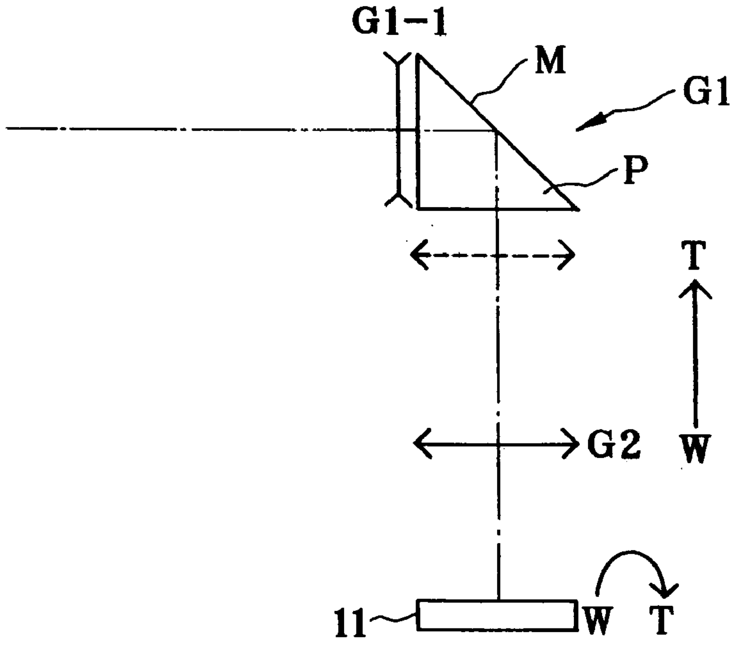
FIG. 24 is illustrative of a group arrangement and movement locus of a further zoom lens used with a further electronic imaging system of the invention.

The zoom lens exemplified in FIG. 24 is made up of, in order from its object side, a first lens group G1 that has a reflecting surface M, remains fixed to a camera body at the time of zooming and has negative refracting power, a second lens group G2 that changes in its distance with respect to the first lens group G1 at the time of zooming and has positive refracting power and an electronic image pickup device 11 that changes in its distance with respect to the first lens group G1 at the time of zooming. Zooming is then implemented by varying the space between the first lens group G1 and the second lens group G3.

The first lens group G1 with the reflecting surface M has negative refracting power on the object side of the reflecting surface M. In this example, the first lens group G1 is composed of a 1-1 lens subgroup G1-1 of negative refracting power and a right-angle prism P.

Referring in detail to the movement of the lens groups and the electronic image pickup device, the first lens group G1 remains fixed to the camera body during zooming. The second lens group G2 moves along the optical axis from the wide-angle end to the telephoto end with respect to the camera body in such a direction as to come close to the reflecting surface M.

The electronic image pickup device 11 moves from the wide-angle end to the telephoto end in such a way that it comes close to and then off the reflecting surface M.

Figure 25:
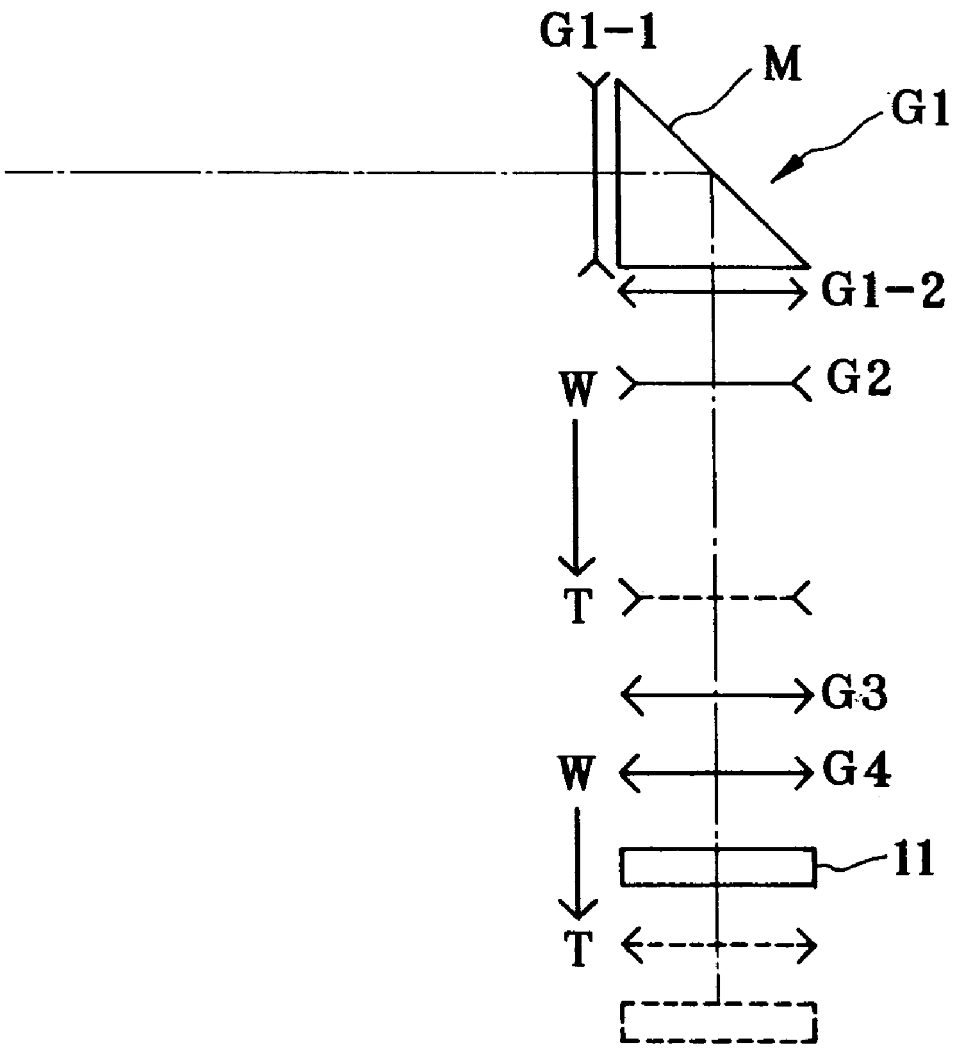
FIG. 25 is illustrative of a group arrangement and movement locus of a further zoom lens used with a further electronic imaging system of the invention.

The zoom lens exemplified in FIG. 25 is made up of, in order from its object side, a first lens group G1 that has a reflecting surface M, remains fixed to a camera body at the time of zooming and has positive refracting power, a second lens group G2 that changes in its distance with respect to the first lens group G1 at the time of zooming and has negative refracting power, a third lens group G3 that remains fixed to the camera body at the time of zooming and has positive refracting power and an electronic image pickup device 11 that changes in its distance with respect to the first lens group G1 at the time of zooming. Zooming is then implemented by varying the space between the adjacent lens groups.

The first lens group G1 with the reflecting surface M has negative refracting power on the object side of the reflecting mirror M and positive refracting power at the other side. In this example, the first lens group G1 is composed of a 1-1 lens subgroup G1-1 of negative refracting power, a right-angle prism P and a 1-2 lens subgroup G1-2 of negative refracting power.

Referring in detail to the movement of the lens groups and the image pickup device, the first lens group remains fixed to the camera body during zooming. The second lens group G2 moves along the optical axis from the wide-angle end to the telephoto end with respect to the camera body in such a direction as to come off the reflecting surface M. The third lens group G3 remains fixed to the camera body. The fourth lens group G4 and the electronic image pickup device 11 move in such a direction as to come off the reflecting surface M while their space varies. Note here that the third lens group G3 could be movable during zooming, and that the fourth lens group G4 and the electronic image pickup device 11 could be movable in unison.

In each of the examples of FIGS. 21–25, the lens groups are schematically indicated by thin lens symbols; however, the lens arrangement in each lens group could include a single lens, a plurality of positive lenses, a plurality of negative lenses, or a positive lens and a negative lens for the purpose of achieving compactness, and placing correction of aberrations in a well-balanced state. While some parts such as stops, shutters and low-pass filters are not shown, it is understood that they could optionally be provided in view of compactness and correction of aberrations. It is also noted that the optical element (for instance, the right-angle prism P) having a reflecting surface M could have refracting power.

Figure 26:
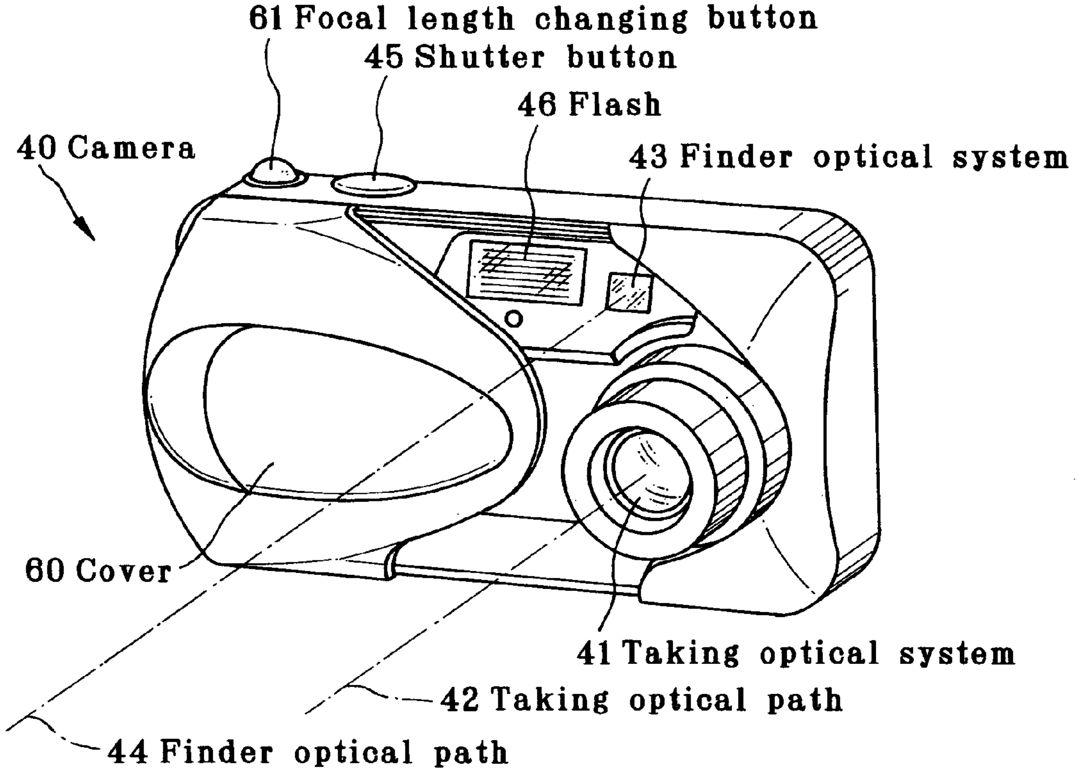
FIG. 26 is a front perspective view of the appearance of another digital camera in which the inventive zoom lens is built.
Figure 27:
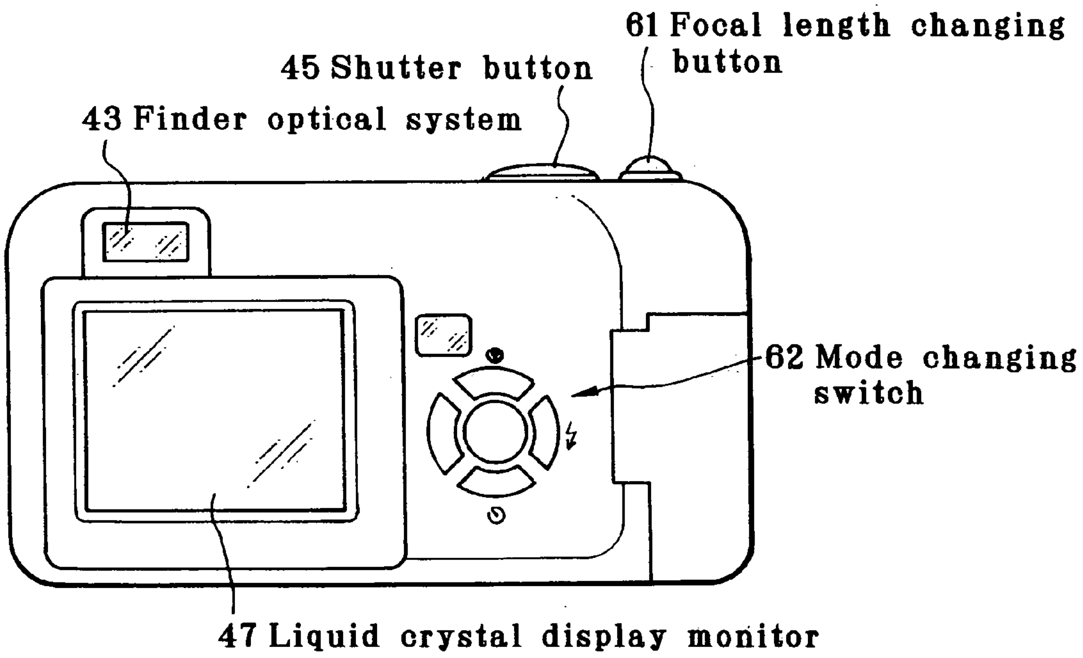
FIG. 27 is a rear perspective view of the digital camera of FIG. 26.

FIGS. 26, 27 and 28 are illustrative in conception of the construction of a digital camera according to the invention, in which such a zoom lens with a bent optical path as described above is built in a taking optical system 41. Specifically, FIG. 26 is a front perspective view of the appearance of a digital camera 40, FIG. 27 is a rear front view of the digital camera 40, and FIG. 28 is a schematic perspective plan view of the construction of the digital camera 40. Note here that FIGS. 26 and 28 show that the taking optical system 41 is housed in a camera body. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 71, a mode select switch 62 and so on. When the taking optical system 41 is housed in the camera body, a cover 60 is slid over the taking optical system 41, the finder optical system 43 and the flash 46. As the cover 60 is slid open to place the camera 40 in a taking mode, the taking optical system 41 is put out of the camera body, as shown in FIG. 28. Then, as the shutter button 45 mounted on the upper side of the camera 40 is pressed down, it causes taking to be implemented through the taking optical system 41, for instance, the zoom lens of Example 1. An object image formed through the taking optical system 41 is formed on the image pickup plane of CCD 49 via a low-pass filter LF with an IR cut coating applied on it and a cover glass CG. The object image received at CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens groups (three groups in the embodiment of FIGS. 27–28) and two prisms with its focal length variable in operable association with the zoom lens that is the taking optical system 41. An object image formed through the finder objective optical system 53 is formed on a field frame 57 of an erection prism 55 that is an image-erecting member. In the rear of the erection prism 55, there is located an eyepiece optical system 59 for guiding an erected image into the eyeball E of the viewer. Note here that a cover member 50 is located on the exit side of the eyepiece optical system 59.

The thus assembled digital camera 40 can be improved in performance and reduced in size, because the taking optical system 41 is of high performance and small size, and can be housed in the digital camera body.

The optical path involved can be bent not only in the long-side direction of the image pickup plane as shown, but also in the short-side direction of the image pickup plane.

What we claim is:

1. An electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on an image side of the zoom lens, wherein an image formed through the zoom lens can be produced as an image data output wherein image data obtained by picking up the image at the electronic image pickup device are processed to change shape, wherein:

the zoom lens satisfies the following condition:

$$0.7<y_{0.8}^*/(f_W \tan \omega_{08W})<0.96 \quad (1)$$

where $y_{08}^*=0.8y_{10}^*$ provided that $y_{10}^*$ is a distance (maximum image height) from a center to a farthest point in an effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

2. An electronic imaging system comprising a zoom lens comprising a plurality of lens groups wherein a space between adjacent lens groups is variable during zooming or focusing, and a lens group G1 nearest to an object side of the zoom lens comprises two components consisting of a negative lens component and a positive lens component, each having an aspheric surface, and an electronic image pickup device located on an image side of the zoom lens, wherein an image formed through the zoom lens can be produced as an image data output wherein image data obtained by picking up the image at the electronic image pickup device are processed to change shape, wherein:

the zoom lens satisfies the following condition upon focusing on any object distance that is at least 50 times as long as $f_W$:

$$0.7<y_{0.8}^*/(f_W \tan \omega_{08W})<0.96 \quad (1)$$

where $y_{08}^*=0.8y_{10}^*$ provided that $y_{10}^*$ is a distance (maximum image height) from a center to a farthest point in an effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

3. The electronic imaging system according to claim 1, which further satisfies the following condition:

$$1.2<y_{10}^*/a<6.0 \quad (2)$$

where $y_{10}^*$ is the distance (maximum image height) in mm from the center to the farthest point in the effective image pickup plane (capable of picking up an image) of the electronic image pickup device, and a is a pixel-to-pixel distance in a long-side direction of the electronic image pickup device.

4. The electronic imaging system according to claim 1, which further satisfies the following condition:

$$F_W>-1.1a(\mu m) \quad (3)$$

where $F_W$ is a full-aperture F-number at the wide-angle end, a is a pixel-to-pixel distance in a long-side direction of the electronic image pickup device.

5. The electronic imaging system according to claim 1, which further satisfies the following condition with respect to an axial air separation between the negative lens component and the positive lens group in the first lens group G1 nearest to the object side of the zoom lens in the electronic imaging system:

$$0.3<d1/y_{10}^*<0.6 \quad (4)$$

where the distance (maximum image height) $y_{10}^*$ from the center to the farthest point in the effective image pickup plane (capable of picking up an image) of the electronic image pickup device is $0<y_{10}^*<6$ (mm).

6. The electronic imaging system according to claim 1, which further satisfies the following condition with respect to the negative lens component and the positive lens group in the first lens group G1 nearest to the object side of the zoom lens in the electronic imaging system:

$$0.55<R_{11R}/R_{12F}<0.95 \quad (5)$$

where $R_{11R}$ is a axial radius of curvature of an surface located in, and nearest to an image side of, the negative lens component in the lens group G1 nearest to the object side of the zoom lens, and $R_{12F}$ is an axial radius of curvature of a surface located in, and nearest to an object side of, the positive lens component in the lens group G1 nearest to the object side of the zoom lens.

7. The electronic imaging system according to claim 1, wherein the negative lens component in the lens group G1 nearest to the object side of the zoom lens in the electronic imaging system satisfies the following conditions with respect to a shape factor and a medium refractive index thereof:

$$0.0°<(R_{11F}+F_{11R})/(R_{11F}-R_{11R})<1.5 \quad (6)$$

$$1.55<n1 \quad (7)$$

where $R_{11F}$ is an axial radius of curvature of a surface located in, and nearest to an object side of, the negative lens component in the lens group G1 nearest to the object side of the zoom lens, $R_{11R}$ is an axial radius of curvature of a surface located in, and nearest to an image side of, the negative lens component in the lens group G1 nearest to the object side of the zoom lens, and n1 is a refractive index of a lens element having a greatest center thickness in the negative lens component.

8. The electronic imaging system according to claim 1, wherein the zoom lens satisfies the following condition with respect to an axial thickness t1 of the lens group G1 nearest to the object side of the zoom lens from a surface nearest to an object side thereof to a surface nearest to an image side thereof:

$$0.7<t1/y_{10}^*<1.35 \quad (8)$$

where the distance (maximum image height) $y_{10}^*$ from the center to the farthest point in the effective image pickup plane (capable of picking up an image) of the electronic image pickup device is $0<y_{10}^*<6$ (mm).

9. The electronic imaging system according to claim 1, wherein the lens group G1 nearest to the object side of the zoom lens comprises two lens elements consisting of, in order from an object side thereof, a negative lens and a positive lens.

10. The electronic imaging system according to claim 1, wherein a lens group G2 adjacent to an image side of the lens group G1 nearest to the object side of the zoom lens moves constantly toward the object side upon zooming from a wide-angle side to a telephoto side of the zoom lens, and satisfies the following condition:

$$1.3<-\beta T<2.1 \tag{9}$$

where βT is a transverse magnification of the lens group G2 at the telephoto end, provided that the distance (maximum image height) $y_{10}$* from the center to the farthest point in the effective image pickup plane (capable of picking up an image) of the electronic image pickup device is $0<y_{10}^*<6$ (mm).

11. The electronic imaging system according to claim 1, wherein a lens group G2 adjacent to an image side of the lens group G1 nearest to the object side of the zoom lens moves constantly toward the object side upon zooming from a wide-angle side to a telephoto side of the zoom lens, and satisfies the following condition:

$$0.7<t2/y_{10}^*<1.6 \tag{10}$$

where t2 is an axial distance of the lens group G2 from a surface nearest an object side thereof and a surface nearest to an image side thereof, provided that the distance (maximum image height) $y_{10}$* from the center to the farthest point in the effective image pickup plane (capable of picking up an image) of the electronic image pickup device is $0<y_{10}^*<6$ (mm).

12. The electronic imaging system according to claim 1, wherein a lens group G2 adjacent to an image side of the lens group G1 nearest to the object side of the zoom lens satisfies the following conditions:

$$0.10<D_{12T}/y_{10}^*<0.7 \tag{11}$$

$$-0.7<ds/y_{10}^*<0 \tag{12}$$

where $D_{12T}$ is an axial distance from a surface located in, and nearest to an image side of, the lens group G1 to a surface located in, and nearest to an object side of, a lens group G2 upon focusing at a telephoto end and on an infinite object point, and ds is a distance from a position of intersection of a plane including an aperture site (internal diameter portion) in an aperture stop that determines a farthest off-axis light ray with an optical axis to a vertex of a surface located in, and nearest to an object side of, the lens group G2, provided that a negative value is obtained when the latter is located nearer to the object side than the former, and that the distance (maximum image height) $y_{10}$* from the center to the farthest point in the effective image pickup plane (capable of picking up an image) of the electronic image pickup device is $0<y_{10}^*<6$ (mm).

13. The electronic imaging system according to claim 1, wherein there is an aperture stop on an image side of the lens group G1 nearest to the object side of the zoom lens, wherein the aperture stop satisfies the following condition:

$$4.0<P_W/y_{10}^*<6.5 \tag{13}$$

where $P_W$ is an axial distance from a surface nearest to the object side at the wide-angle end to an aperture stop position, provided that the distance (maximum image height) $y_{10}$* from the center to the farthest point in the effective image pickup plane (capable of picking up an image) of the electronic image pickup device is $0<y_{10}^*<6$ (mm).

14. The electronic imaging system according to claim 1, wherein a lens group G2 adjacent to the lens group G1 nearest to the object side of the zoom lens comprises two components consisting of, in order from an object side thereof, a positive lens component and a negative lens component.

15. The electronic imaging system according to claim 1, wherein a lens group G2 adjacent to the lens group G1 nearest to the object side of the zoom lens comprises two lens elements consisting of, in order from an object side thereof, a positive lens and a negative lens.

16. The electronic imaging system according to claim 1, wherein a lens group G2 adjacent to the lens group G1 nearest to the object side of the zoom lens comprises two components consisting of, in order from an object side thereof, a positive lens component and a negative lens component, wherein the negative lens component satisfies the following condition:

$$-10<(R_{22F}+F_{22R})/(R_{22F}-R_{22R})<0.5 \tag{14}$$

where $R_{22F}$ is an axial radius of curvature of an surface located in, and nearest to an object side of, the negative lens component in the lens group G2, and $R_{22R}$ is an axial radius of curvature of a surface located in, and nearest to an image side of, the negative lens component in the lens group G2.

17. A zoom lens, which comprises, in order from an object side of the zoom lens, a first lens group comprising a negative 1-1 lens component B11 and a positive 1-2 lens component B12 and having negative refracting power, and a second lens group comprising a positive 2-1 lens component B21 and a negative 2-2 lens component B22 and having positive refracting power, and satisfying the following conditions (21) and (22):

$$-1.2<f_W/r_{22R}<0.9 \tag{21}$$

$$0.17<(D_{12W}-D_{12T})/(f_W\gamma^2)<0.33 \tag{22}$$

where $r_{22R}$ is an axial radius of curvature of a lens surface located in, and nearest to an image side of, the 2-2 lens component, $D_{12W}$ is an axial distance at a wide-angle end between a vertex of a lens surface located in, and nearest to an image side of, the first lens group and a vertex of a lens surface located in, and nearest to an object side of, the second lens group, $D_{12T}$ is an axial distance at a telephoto end between the vertex of the lens surface located in, and nearest to the image side of, the first lens group and the vertex of the lens surface located in, and nearest to the object side of, the second lens group, $f_W$ is a focal length of the zoom lens system at the wide-angle end, and γ is $f_T/f_W$ where $f_T$ is a focal length of the zoom lens system at the telephoto end, provided that the "lens component" refers to a single lens, a cemented lens or a composite lens such as one wherein a resin or the like is cured on a lens surface while they are in close contact; the number of a medium boundary surface is the number of the lens plus 1.

18. The zoom lens according to claim 17, which further satisfies the following condition:

$$1.0<\Sigma D_T/f_W<2.2 \tag{23}$$

where ΣDT is a distance at the telephoto end of a vertex of a surface nearest to the object side to a vertex to a surface nearest to an image side of the zoom lens.

19. The zoom lens according to claim 17, which further satisfies the following condition:

$$0.1<f_W/f_{22}|<1 \tag{24}$$

where $f_{22}$ is a composite focal length of the 2-2 lens component.

20. The zoom lens according to claim 17, which further satisfies the following condition:

$$35<\nu_{21}-\nu_{22}<95 \quad (25)$$

where $\nu_{21}$ is an Abbe constant of the 2-1 lens component, and $\nu_{22}$ is an Abbe constant the 2-2 lens component, each on a d-line basis.

21. The zoom lens according to claim 17, which further satisfies the following condition:

$$-0.7<f_W/r_{11F}<0.2 \quad (26)$$

where $r_{11F}$ is an axial radius of curvature of a lens surface located in, and nearest to an object side of, the 1-1 lens component.

22. The zoom lens according to claim 17, which further satisfies the following condition:

$$0.6<t_1/t_2<1.4 \quad (27)$$

where $t_1$ is an axial thickness of the first lens group from a surface nearest to an object side to an image side thereof, and $t_2$ is an axial thickness of the second lens group a surface nearest to an object side to an image side thereof.

23. The zoom lens according to claim 17, which further satisfies the following condition:

$$0.1<d_{11}/f_W<0.5 \quad (27)$$

where $d_{11}$ is an axial air separation between the negative 1-1 lens component and the positive second 1-2 lens component in the first lens group.

24. The zoom lens according to claim 17, which further satisfies the following condition:

$$0.5<R_{11R}/R_{12F}<1 \quad (29)$$

where $R_{11R}$ is an axial radius of curvature of a surface located in, and nearest to an image side of, the negative 1-1 lens component in the first lens group, and $R_{12F}$ is an axial radius of curvature of a surface located in, and nearest to an object side of, the positive 1-2 lens component in the first lens group.

25. The zoom lens according to claim 17, which consists of only two lens groups defined by the first lens group and the second lens group.

26. The zoom lens according to claim 17, wherein each lens component consists of a single lens.

27. An electronic imaging system, comprising the zoom lens according to claim 17, and an electronic image pickup device located on an image side of the zoom lens, wherein an image formed through the zoom lens can be produced as an image data output wherein image data obtained by picking up the image at the electronic image pickup device are processed to change shape, wherein:

the zoom lens satisfies the following condition upon focusing on any object distance that is at least 50 times as long as $f_W$:

$$0.7<y_{0.8}^*/(f_W \tan \omega_{08W})<0.96 \quad (30)$$

where $y_{08}^*=0.8y_{10}^*$ provided that $y_{10}^*$ is a distance (maximum image height) from a center to a farthest point in an effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

28. The electronic imaging system according to claim 27, which further satisfies the following condition:

$$1.2<y_{10}^*/a<6.0 \quad (31)$$

where $y_{10}^*$ is the distance (maximum image height) in mm from the center to the farthest point in the effective image pickup plane (capable of picking up an image) of the electronic image pickup device, and a is a pixel-to-pixel distance in a long-side direction of the electronic image pickup device.

29. The electronic imaging system according to claim 27, which further satisfies the following condition:

$$F_W \geqq 1.1a(\mu m) \quad (32)$$

where $F_W$ is a full-aperture F-number at the wide-angle end, a is a pixel-to-pixel distance in a long-side direction of the electronic image pickup device.

30. An electronic imaging system comprising:

a zoom lens comprising a plurality of lens groups wherein zooming is implemented by varying a space sandwiched between the plurality of lens groups, an electronic image pickup device located on an image side of the zoom lens, and an imaging system body, wherein:

the zoom lens comprises a deflector element for deflecting an optical axis of the zoom lens, wherein the deflector element remains fixed to the imaging system body during the zooming, and a first lens group that is one lens group in the plurality of lens groups and is a transmission type lens group having no reflecting surface, and the first lens group is located on an object side with respect to the deflector element, and moves with respect to the deflector element during the zooming, and wherein:

the electronic image pickup device moves with respect to the deflector element during the zooming.

31. The electronic imaging system according to claim 30, wherein the deflector element is a plane plate type mirror.

32. The electronic imaging system according to claim 30, wherein the deflector element is a prism type mirror.

33. The electronic imaging system according to claim 30, wherein the zoom lens comprises a second lens group that is one lens group in the plurality of lens groups, and wherein the deflector element is located between the first lens group and the second lens group.

34. The electronic imaging system according to claim 30, wherein the zoom lens comprises a second lens group that is one lens group in the plurality of lens groups, and wherein the deflector element is located in the second lens group.

35. The electronic imaging system according to claim 30, wherein the zoom lens comprises a second lens group that is one lens group in the plurality of lens groups, and wherein the deflector element is located on an image side of the zoom lens with respect to the second lens group.

36. The electronic imaging system according to claim 30, wherein the zoom lens comprises a second lens group that is one lens group in the plurality of lens groups, and wherein the electronic imaging system comprises a finder wherein a position of a viewing surface of the finder relative to the second lens group remains constant during zooming.

37. The electronic imaging system according to claim 30, where the electronic imaging system comprises a processing member, wherein:

the processing member is operable to process image data obtained by taking an image formed through the zoom lens at the electronic image pickup device to produce an image data output having changed in shape, and wherein:

the zoom lens satisfies the following condition upon focusing on any object distance that is at least 50 times as long as $f_W$:

$$0.7<y_{0.8}^*/(f_W \tan \omega_{08W})<0.96 \quad (41)$$

where $f_W$ is a focal length of the zoom lens system at the wide-angle end, $y_{08}^*=0.8y_{10}^*$ provided that $y_{10}^*$ is a distance (maximum image height) from a center to a farthest point in an effective image pickup plane (capable of picking up an image) of the electronic image pickup device, and $\omega_{08W}$ is an angle at a wide-angle end of the zoom lens of an object point with respect to an optical axis of the zoom lens, wherein the object point corresponds to an image point of connecting a center on the image pickup plane with a $y_{08}^*$ position.

38. The electronic imaging system according to claim 30, which further satisfies the following condition:

$$1.2<y_{10}^*/a<6.0 \quad (42)$$

where $y_{10}^*$ is the distance (maximum image height) in mm from the center to the farthest point in the effective image pickup plane (capable of picking up an image) of the electronic image pickup device, and a is a pixel-to-pixel distance in a long-side direction of the electronic image pickup device.

39. The electronic imaging system according to claim 30, which further satisfies the following condition:

$$F_W \geqq -1.1a\ (\mu m) \quad (43)$$

where $F_W$ is a full-aperture F-number of the zoom lens at the wide-angle end, a is a pixel-to-pixel distance in a long-side direction of the electronic image pickup device.

40. The electronic imaging system according to claim 30, which further satisfies the following condition:

$$0.4<(dy^*/dy)_{y08^*}/(dy^*/dy)_{y00^*}<0.9 \quad (44)$$

where, in an actual image height y* vs. ideal image height y relation, $y_{10}^*$ the distance (maximum image height) from the center to the farthest point in the effective image pickup plane (capable of picking up an image) of the electronic image pickup device, and $(dy^*/dy)y_{08^*}$ and $(dy^*/dy)y_{00^*}$ are differential values at an image height $y_{08}^*(=0.8y_{10}^*)$ and a screen center, respectively.

41. The electronic imaging system according to claim 30, wherein:

the zoom lens comprises, in order from an object side thereof, a first lens group having negative refracting power and consisting of, in order from an object side thereof, a 1-1 lens component B11 of negative refracting power and a 1-2 lens component B12 of positive refracting power, and a second lens group having positive refracting power and consisting of, in order from an object side thereof, a 2-1 lens component B21 of positive refracting power and a 2-2 lens component B22 of negative refracting power, and wherein:

the electronic image pickup device is located near an image-formation position of the zoom lens, and during the zooming, the second lens group remains fixed to the imaging system body, the first lens group moves with a varying position relative to the second lens group, and the electronic image pickup device moves along an optical axis of the zoom lens with respect to the imaging system body, and wherein the zoom lens satisfies the following conditions:

$$-1.2<f_W/r_{22R}<0.9 \quad (45)$$

$$0.17<(D_{12W}-D_{12T})/(f_W\cdot\gamma^2)<0.33 \quad (46)$$

where $r_{22R}$ is an axial radius of curvature of a lens surface located in, and nearest to an image side of, the 2-2 lens component, $D_{12W}$ is an axial distance at a wide-angle end between a vertex of a lens surface located in, and nearest to an image side of, the first lens group and a vertex of a lens surface located in, and nearest to an object side of the second lens group, $D_{12T}$ is an axial distance at a telephoto end between the vertex of the lens surface located in, and nearest to the image side of, the first lens group and the vertex of the lens surface located in, and nearest to the object side of, the second lens group, $f_W$ is a focal length of the zoom lens system at the wide-angle end, and $\gamma$ is $f_T/f_W$ where $f_T$ is a focal length of the zoom lens system at the telephoto end.

42. The zoom lens according to claim 30, which further satisfies the following condition:

$$1.0<\Sigma D_T/f_W<2.2 \quad (47)$$

where $f_W$ is a focal length of the zoom lens system at the telephoto end, and ΣDT is a distance at the telephoto end of a vertex of a surface nearest to the object side to a vertex to a surface nearest to an image side of the zoom lens.

43. The zoom lens according to claim 41, which further satisfies the following condition:

$$0.1<f_W/f_{22}|<1 \quad (48)$$

where $f_{22}$ is a composite focal length of the 2-2 lens component.

44. The zoom lens according to claim 41, which further satisfies the following condition:

$$35<\nu_{21}-\nu_{22}<95 \quad (49)$$

where $\nu_{21}$ is an Abbe constant of the 2-1 lens component, and $\nu_{22}$ is an Abbe constant the 2-2 lens component, each on a d-line basis.

45. The zoom lens according to claim 41, which further satisfies the following condition:

$$-0.7<f_W/r_{11F}<0.2 \quad (50)$$

where $r_{11F}$ is an axial radius of curvature of a lens surface located in, and nearest to an object side of, the 1-1 lens component.

46. The zoom lens according to claim 41, which further satisfies the following condition:

$$0.6<t_1/t_2<1.4 \quad (51)$$

where $t_1$ is an axial distance of the first lens group from a surface nearest to an object side to an image side thereof, and $t_2$ is an axial thickness of the second lens group a surface nearest to an object side to an image side thereof.

47. The zoom lens according to claim 41, which further satisfies the following condition:

$$0.1<d_{11}/f_W<0.5 \quad (52)$$

where $d_{11}$ is an axial air separation between the negative 1-1 lens component and the positive second 1-2 lens component in the first lens group.

48. The zoom lens according to claim 41, which further satisfies the following condition:

$$0.5<R_{11R}/R_{12F}<1 \quad (53)$$

where $R_{11R}$ is an axial radius of curvature of a surface located in, and nearest to an image side of, the negative 1-1 lens component in the first lens group, and $R_{12F}$ is an axial radius of curvature of a surface located in, and nearest to an object side of, the positive 1-2 lens component in the first lens group.

49. An electronic imaging system, comprising:

a zoom lens system operable to form an image of a subject, a photoelectric converter device located on an image side of the zoom lens system and operable to convert an image formed through the zoom lens system to electric signals, and an imaging system body, wherein:

the zoom lens system comprises a fixed lens group wherein the fixed lens group has a finite focal length and comprises a reflecting surface remaining fixed to the imaging system body during zooming, and at least one movable lens group wherein the movable lens group is located on an entrance or exit side of the fixed lens group, has a finite focal length, and changes in a position relation relative to the fixed lens group for implementing zooming, and wherein:

the photoelectric converter device changes moves with respect to the reflecting surface in the fixed lens group in operable association with movement of an image position by zooming of the zooming lens group.

50. The electronic imaging system according to claim 49, wherein only one such movable lens group is located on the entrance side of the fixed lens group having a reflecting surface, and the movable lens group is moved to a housing position where the zoom lens is housed in the imaging system body.

51. The electronic imaging system according to claim 49, wherein the fixed lens group comprises only one such reflecting surface.

52. The electronic imaging system according to claim 49, wherein at least one lens group in the movable lens groups comprises a lens component of positive refracting power and a lens component of negative refracting power.

53. The electronic imaging system according to claim 49, wherein at least one lens group in the fixed lens groups comprises a lens component of positive refracting power and a lens component of negative refracting power.

54. The electronic imaging system according to claim 49, wherein the zoom lens system has only one such movable lens group.

* * * * *

UNITED STATES PATENT AND TRADEMARK OFFICE
CERTIFICATE OF CORRECTION

PATENT NO. : 7,209,296 B2
APPLICATION NO. : 11/186775
DATED : April 24, 2007
INVENTOR(S) : Shinichi Mihara et al.

It is certified that error appears in the above-identified patent and that said Letters Patent is hereby corrected as shown below:

Column 50, line 6, change "$F_w$ >-1.1a(μm) " to --$F_w \geq 1.1a(\mu m)$-- and

Column 50, line 43, "$0.0° < (R_{11F}+F_{11R})/(R_{11F}-R_{11R}) < 1.5$" to --$0.0 < (R_{11F}+R_{11R})/(R_{11F}-R_{11R}) < 1.5$--;

Column 52, line 21, change "$-10 < (R_{22F}+F_{22R})/(R_{22F}-R_{22R}) < 0.5$" to -- $-10 < (R_{22F}+R_{22R})/(R_{22F}-R_{22R}) < 0.5$ --;

Column 55, line 32, change "$F_w \geqq -1.1a(\mu m)$" to --$F_w \geqq 1.1a(\mu m)$--;

Column 55, line 39, change "$0.4 < (dy^*/dy)_{y08^*}/ (dy^*/dy)_{y00^*} < 0.9$" to -- $0.4 < (dy^*/dy)\ y_{08}{}^*/ (dy^*/dy)\ y_{00}{}^* < 0.9$ --;

Column 57, line 24, change "device changes moves" to --device moves-- .

Signed and Sealed this

Eighteenth Day of December, 2007

JON W. DUDAS
*Director of the United States Patent and Trademark Office*